United States Patent [19]
Maeda et al.

[11] Patent Number: 5,559,777
[45] Date of Patent: Sep. 24, 1996

[54] OPTICAL RECORDING METHOD EMPLOYING PIT EDGE RECORDING ON RECORDING MEDIUM DIVIDED INTO A PLURALITY OF ZONES WHEREIN RECORDING PARAMETERS VARY FROM ZONE TO ZONE

[75] Inventors: Takeshi Maeda, Kokubunji; Shinichi Arai; Kazuo Isaka, both of Odawara; Atsushi Saito, Ichikawa; Takuya Mizokami, Odawara; Hisataka Sugiyama, Kodaira; Satoshi Kawamura, Yokohama, all of Japan

[73] Assignee: Hitachi, Ltd., Tokyo, Japan

[21] Appl. No.: 428,057

[22] Filed: Apr. 25, 1995

Related U.S. Application Data

[63] Continuation of Ser. No. 820,593, Jan. 27, 1992, Pat. No. 5,414,689.

[30] Foreign Application Priority Data

| May 25, 1990 | [JP] | Japan | 2-133819 |
| May 25, 1990 | [JP] | Japan | 2-133820 |
| Aug. 31, 1990 | [JP] | Japan | 2-228128 |

[51] Int. Cl.⁶ .................................................. G11B 5/09
[52] U.S. Cl. ................... 369/50; 369/58; 369/116
[58] Field of Search ............................. 369/47, 48, 49, 369/50, 116, 30, 32, 33, 54, 58

[56] References Cited

U.S. PATENT DOCUMENTS

| 4,764,913 | 8/1988 | Sasaki et al. . |
| 4,804,959 | 2/1989 | Makanski et al. . |
| 4,819,218 | 4/1989 | Barnard . |
| 4,835,759 | 5/1989 | Saito et al. . |
| 4,896,311 | 1/1990 | Ishihara . |
| 4,937,809 | 6/1990 | Miyadera et al. . |
| 4,984,227 | 1/1991 | Yoshimaru . |
| 4,998,238 | 3/1991 | Mizunoe et al. ......................... 369/116 |
| 5,111,443 | 5/1992 | Yokogawa . |
| 5,249,170 | 9/1993 | Yoshimaru et al. ...................... 369/58 |
| 5,255,261 | 10/1993 | Iida et al. ............................. 369/275.3 |
| 5,343,453 | 8/1994 | Ogino .................................... 369/50 |

FOREIGN PATENT DOCUMENTS

| 0158067 | 10/1985 | European Pat. Off. . |
| 0218214 | 4/1987 | European Pat. Off. . |
| 0228646 | 7/1987 | European Pat. Off. . |
| 3622239 | 1/1987 | Germany . |
| 51-69614 | 6/1976 | Japan . |
| 59-24452 | 2/1984 | Japan . |
| 59-140634 | 8/1984 | Japan . |

(List continued on next page.)

OTHER PUBLICATIONS

Y. Tsunoda et al., "Large Capacity Optical Disk File", *Hitachi Hyoron*, vol. 65, No. 10 (Oct. 1983), pp. 23–28 (in Japanese).

*Primary Examiner*—Georgia Y. Epps
*Assistant Examiner*—P. W. Huber
*Attorney, Agent, or Firm*—Antonelli, Terry, Stout & Kraus

[57] ABSTRACT

An information recording/reproducing method is disclosed for an information recording/reproducing apparatus including a recording medium having a disk-like shape, a unit for rotating the recording medium at a constant angular velocity, a unit for recording code information so that the bit length of the code information becomes approximately constant with respect to a radial position on the recording medium, a unit for modulating the code information to be recorded to form a modulated signal, and a recording unit for forming in the recording medium a localized recording region having a different physical property with respect to an unrecorded region, the recording unit being controlled by the modulated signal so that the code information is recorded to correspond to the edge of the recording region, wherein the bit rate of the code information to be recorded changes depending on a location on the recording medium, and a part of each of a recording characteristic of the apparatus and a reproducing characteristic of the apparatus is changed in accordance with a location on the recording medium.

6 Claims, 40 Drawing Sheets

FOREIGN PATENT DOCUMENTS

| | | |
|---|---|---|
| 60-127535 | 7/1985 | Japan . |
| 60-145535 | 8/1985 | Japan . |
| 62-209701 | 9/1987 | Japan . |
| 63-4465 | 1/1988 | Japan . |
| 1-173478 | 7/1989 | Japan . |
| 1-169777 | 7/1989 | Japan . |
| 1-302537 | 12/1989 | Japan . |
| 88/04824 | 6/1988 | WIPO . |

RELATIONSHIP BETWEEN NUMBER OF DIVISIONAL ZONES AND STORAGE CAPACITY

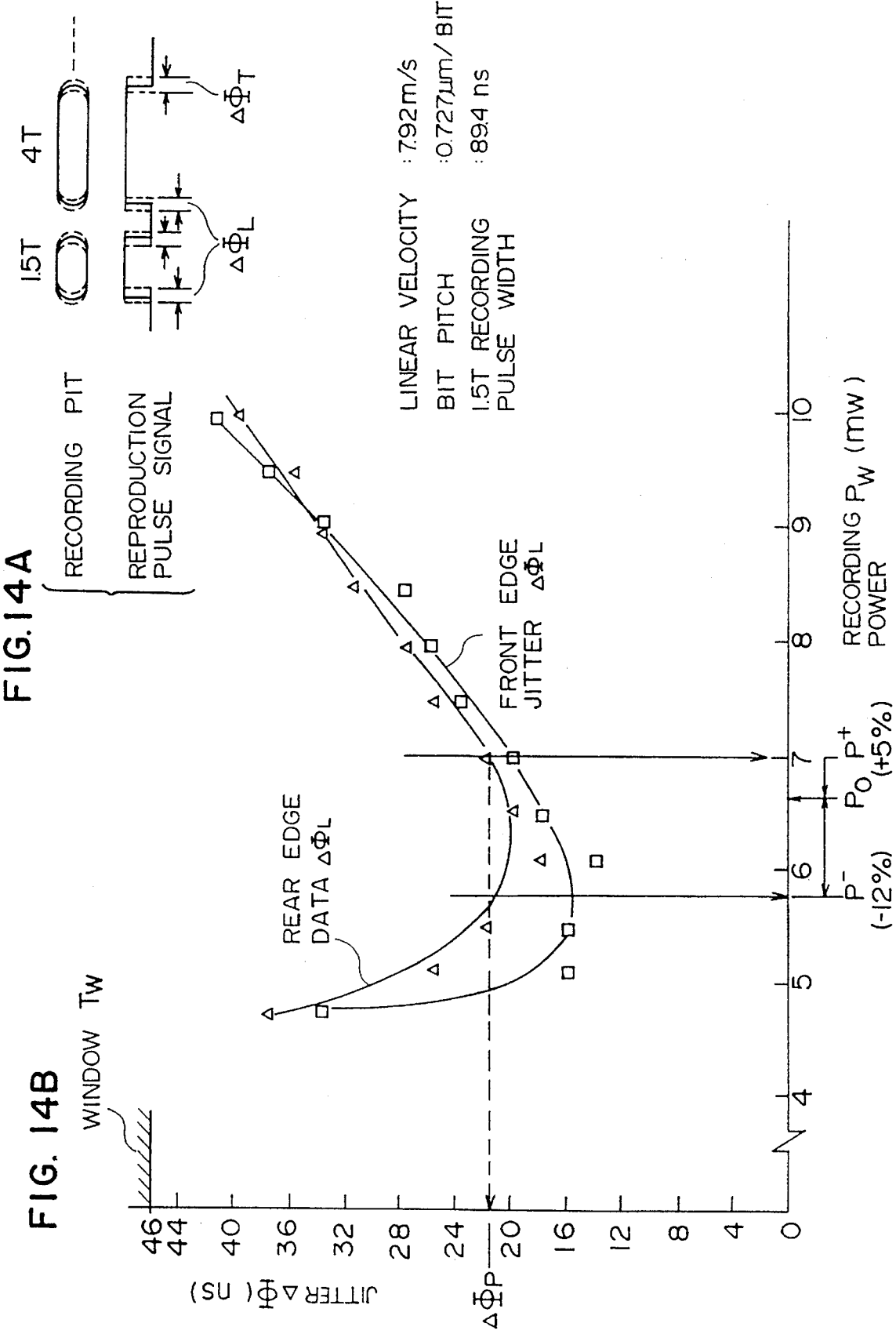

FIG. 21

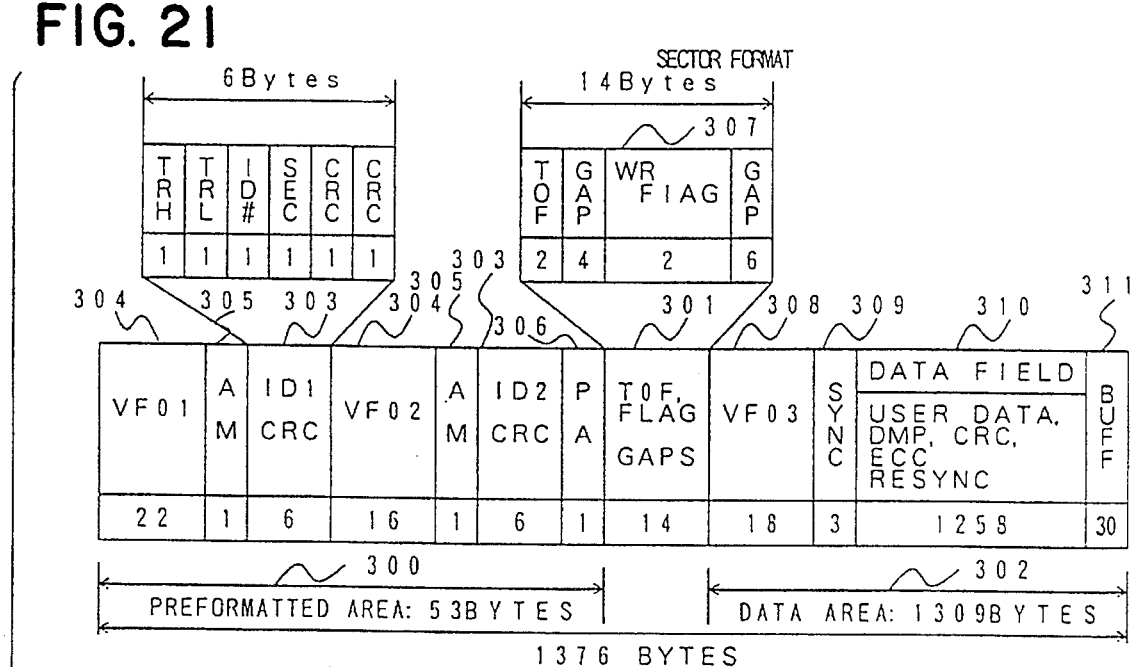

① VFO 1 (22Bytes)
0 1 0 0 0 1 0 0 0 1 0 0 0 1 ············· 0 0 1 0 0 (REPEATING PATTERN OF 2T)

② VFO 2 (16Bytes)
1 0 0 0 1 0 0 0 1 ············· 0 1 0 0 0
or
0 0 0 0 1 0 0 0 1 ············· 0 1 0 0 0
(EVEN-ODD CORRECTION IS MADE FOR UNIFYING RELATIONSHIP BETWEEN PITS AND GAPS IN AM PATTERN IMMEDIATELY SUCCEEDING VF02)

③ VFO 3 (18Bytes)
0 1 0 0 0 1 0 0 0 1 0 0 0 1 ············· 0 0 1 0 0 (REPEATING PATTERN OF 2T)

④ AM (1Byte)
0 1 0 0 0 0 0 0 0 0 1 0 0 1 0 0 (SIDE FOLLOWED BY EIGHT CONSECUTIVE "0"s IS POSITIONED TO CORRESPOND TO PIT.)

⑤ PA (1Byte)
* * * * 0 0 0 0 0 0 0 0 0 0 0 0 (LAST BIT IS NOT PIT.)
or
* * * * 0 0 0 0 1 0 0 0 0 0 0 0 (LAST BIT IS PIT.)

⑥ WRITE FLAG (2Bytes)
1 0 0 0 1 0 0 0 ············· 1 0 0 0 (REPEATING PATTERN OF 2T)

⑦ SYNC (3Bytes)
0 1 0 0 0 1 0 0 1 0 0 0 1 0 0 0 1 0 0 0 1 0 0 1 0 0 0 1 0 0 1 0 0 0
(CONFORM TO ISO)

⑧ RESYNC (2Bytes×29)
0 0 1 0 0 0 0 1 0 0 0 0 0 0 0 1 0 0 0 0 0 0 1 0 0 1 0 0 1 0 0

⑨ TOF (2Bytes)
NO GROOVE, MIRROR SURFACE PORTION. FOR CORRECTION FOR TRACK OFFSET ⑩ DMP (12Bytes)
CONFORM TO ISO ⑪ CRC OF DATA AREA (4Bytes)
CONFORM TO ISO ⑫ ECC (160Bytes)
REED-SOLOMON LDC, INTERLEAVED ⑬ DATA FIELD (1258Bytes)

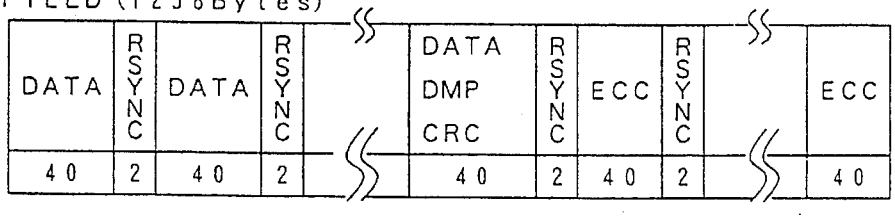

FIG. 23

| ZONE NO. | NUMBER OF SECTORS | POSITION | PIT PITCH | TRACK # | | TOTAL NUMBER OF SECTORS | VFO FREQ. | FREQUENCY RATIO |
|---|---|---|---|---|---|---|---|---|
| INNER GUARD | | 135.1330 | .1134290E-02 | -161 | 8211 | 8211 | 18.7680 | 100.0000 |
| 0 | 51 | 135.6160 | .1138344E-02 | 0 | 52224 | 52224 | 18.7136 | 100.0000 |
| 1 | 52 | 138.6880 | .1141743E-02 | 1024 | 53248 | 105472 | 19.0805 | 101.7608 |
| 2 | 53 | 141.7600 | .1145013E-02 | 2048 | 54272 | 159744 | 19.4475 | 103.9216 |
| 3 | 54 | 144.8320 | .1148163E-02 | 3072 | 55296 | 215040 | 19.8144 | 105.8824 |
| 4 | 55 | 147.9040 | .1151198E-02 | 4096 | 56320 | 271360 | 20.1813 | 107.8431 |
| 5 | 56 | 150.9760 | .1154124E-02 | 5120 | 57344 | 328704 | 20.5483 | 109.8039 |
| 6 | 57 | 154.0480 | .1156948E-02 | 6144 | 58368 | 387072 | 20.9152 | 111.7647 |
| 7 | 58 | 157.1200 | .1159675E-02 | 7168 | 59392 | 446464 | 21.2821 | 113.7255 |
| 8 | 59 | 160.1920 | .1162309E-02 | 8192 | 60416 | 506880 | 21.6491 | 115.6863 |
| 9 | 60 | 163.2640 | .1164855E-02 | 9216 | 61440 | 568320 | 22.0160 | 117.6471 |
| 10 | 61 | 166.3360 | .1167318E-02 | 10240 | 62464 | 630784 | 22.3829 | 119.6079 |
| 11 | 62 | 169.4080 | .1169701E-02 | 11264 | 63488 | 694272 | 22.7499 | 121.5686 |
| 12 | 63 | 172.4800 | .1172009E-02 | 12288 | 64512 | 758784 | 23.1168 | 123.5294 |
| 13 | 64 | 175.5520 | .1174245E-02 | 13312 | 65536 | 824320 | 23.4837 | 125.4902 |
| 14 | 65 | 178.6240 | .1176411E-02 | 14336 | 66560 | 890880 | 23.8507 | 127.4510 |
| 15 | 66 | 181.6960 | .1178512E-02 | 15360 | 67584 | 958464 | 24.2176 | 129.4118 |
| 16 | 67 | 184.7680 | .1180551E-02 | 16384 | 68608 | 1027072 | 24.5845 | 131.3725 |
| 17 | 68 | 187.8400 | .1182529E-02 | 17408 | 69632 | 1096704 | 24.9515 | 133.3333 |
| 18 | 69 | 190.9120 | .1184450E-02 | 18432 | 70656 | 1167360 | 25.3184 | 135.2941 |
| 19 | 70 | 193.9840 | .1186317E-02 | 19456 | 71680 | 1239040 | 25.6853 | 137.2549 |
| 20 | 71 | 197.0560 | .1188130E-02 | 20480 | 72704 | 1311744 | 26.0523 | 139.2157 |
| 21 | 72 | 200.1280 | .1189894E-02 | 21504 | 73728 | 1385472 | 26.4192 | 141.1765 |
| 22 | 73 | 203.2000 | .1191608E-02 | 22528 | 74752 | 1460224 | 26.7861 | 143.1373 |
| 23 | 74 | 206.2720 | .1193277E-02 | 23552 | 75776 | 1536000 | 27.1531 | 145.0980 |
| 24 | 75 | 209.3440 | .1194901E-02 | 24576 | 76800 | 1612800 | 27.5200 | 147.0588 |
| 25 | 76 | 212.4160 | .1196483E-02 | 25600 | 77824 | 1690624 | 27.8869 | 149.0196 |
| 26 | 77 | 215.4880 | .1198023E-02 | 26624 | 78848 | 1769472 | 28.2539 | 150.9804 |
| 27 | 78 | 218.5600 | .1199524E-02 | 27648 | 79872 | 1849344 | 28.6208 | 152.9412 |
| 28 | 79 | 221.6320 | .1200986E-02 | 28672 | 80896 | 1930240 | 28.9877 | 154.9020 |
| 29 | 80 | 224.7040 | .1202413E-02 | 29696 | 81920 | 2012160 | 29.3547 | 156.8628 |
| 30 | 81 | 227.7760 | .1203804E-02 | 30720 | 82944 | 2095104 | 29.7216 | 158.8235 |
| 31 | 82 | 230.8480 | .1205161E-02 | 31744 | 83968 | 2179072 | 30.0885 | 160.7843 |
| 32 | 83 | 233.9200 | .1206485E-02 | 32768 | 84992 | 2264064 | 30.4555 | 162.7451 |
| 33 | 84 | 236.9920 | .1207778E-02 | 33792 | 86016 | 2350080 | 30.8224 | 164.7059 |
| 34 | 85 | 240.0640 | .1209040E-02 | 34816 | 87040 | 2437120 | 31.1893 | 166.6667 |
| 35 | 86 | 243.1360 | .1210274E-02 | 35840 | 88064 | 2525184 | 31.5563 | 168.6275 |
| 36 | 87 | 246.2080 | .1211478E-02 | 36864 | 89088 | 2614272 | 31.9232 | 170.5883 |
| 37 | 88 | 249.2800 | .1212656E-02 | 37888 | 90112 | 2704384 | 32.2901 | 172.5490 |
| 38 | 89 | 252.3520 | .1213806E-02 | 38912 | 91136 | 2795520 | 32.6571 | 174.5098 |
| 39 | 90 | 255.4240 | .1214932E-02 | 39936 | 92160 | 2887680 | 33.0240 | 176.4706 |
| 40 | 91 | 258.4960 | .1216032E-02 | 40960 | 93184 | 2980864 | 33.3909 | 178.4314 |
| 41 | 92 | 261.5680 | .1217109E-02 | 41984 | 94208 | 3075072 | 33.7579 | 180.3922 |
| 42 | 93 | 264.6400 | .1218163E-02 | 43008 | 95232 | 3170304 | 34.1248 | 182.3530 |
| 43 | 94 | 267.7120 | .1219194E-02 | 44032 | 96256 | 3266560 | 34.4917 | 184.3137 |
| 44 | 95 | 270.7840 | .1220203E-02 | 45056 | 97280 | 3363840 | 34.8587 | 186.2745 |
| 45 | 96 | 273.8560 | .1221192E-02 | 46080 | 98304 | 3462144 | 35.2256 | 188.2353 |
| 46 | 97 | 276.9280 | .1222159E-02 | 47104 | 99328 | 3561472 | 35.5925 | 190.1961 |
| OUTER GUARD | | 280.0000 | .1235717E-02 | 48128 | 49664 | 49664 | 35.5925 | 190.1961 |

<<INPUT PARAMETER>>
INNER CIRCUMFERENCE [mm]         135.616
OUTER CIRCUMFERENCE [mm]         280
BYTE/SECTOR      (Byte)          1376
USER BYTE        (Byte)          1024
TRACK PITCH      (mm)            .0015
NUMBER OF SECTORS ON INNERMOST CIRCUMFERENCE    51
ROTATING SPEED                   1000
DIVISION                         1024
INCREMENT IN NUMBER OF SECTORS   1
<<OUTPUT PARAMETER>>
NUMBER OF SECTORS ON OUTERMOST CIRCUMFERENCE    97
NUMBER OF ZONES                  47
TOTAL NUMBER OF SECTORS          3561472
TOTAL STORAGE CAPACITY [MB]      3646
USER CAPACITY                    3532         3548
TRANSFER RATE [MB/s]             1.1696       2.224533
PPmin=1.138344E-03
PPmax=1.235717E-03
(PPmax)=1.222159E-03

VFO1 (22Bytes)

01000100010001000⋯⋯⋯⋯⋯⋯01000100

(REPEATING PATTERN OF 2T)

AM (1Byte)

0100000000100100

(SIDE FOLLOWED BY EIGHT CONSECUTIVE "0's" IS POSITIONED TO CORRESPOND TO PIT.)

VFO2 (16Bytes)

0100010001000100⋯⋯⋯⋯⋯⋯01000100 (CASE1)

OR

0100000001000100⋯⋯⋯⋯⋯⋯01000100 (CASE2)

PA (1Byte)

0000000000000000 (CASE1)

OR 0000010000000000 (CASE2)

ID# (1Byte)

TOF (2Bytes) NO GROOVE, FOR CORRECTION FOR TRACK OFFSET
WR FLAG (2Bytes)
    1000100010001000100010001000
      (REPEATING PATTERN OF 2T)
VFO3 (18Bytes)
    01000100010001 00     01000100
SYNC (3Bytes)
    010001001000100010001001000100100000100 1001000
RESYNC (2Bytes×29)
    001000010000000100000010 0100100
DMP (12Bytes)
  ORIGINAL SECTOR

| C1 | C2 | C3 | C4 |
|---|---|---|---|
| SELF TRACK NUMBER | SELF TRACK NUMBER | SELF SECTOR NUMBER | ALL "1's" |
| ALTERNATE TRACK NUMBER | ALTERNATE TRACK NUMBER | ALTERNATE TRACK NUMBER | ALL "1's" |
| ALTERNATE TRACK NUMBER | ALTERNATE TRACK NUMBER | ALTERNATE TRACK NUMBER | ALL "1's" |

ALTERNATE SECTOR

| C1 | C2 | C3 | C4 |
|---|---|---|---|
| SELF TRACK NUMBER | SELF TRACK NUMBER | SELF SECTOR NUMBER | ALL "1's" |
| ORIGINAL TRACK NUMBER | ORIGINAL TRACK NUMBER | ORIGINAL SECTOR NUMBER | ALL "1's" |
| ORIGINAL TRACK NUMBER | ORIGINAL TRACK NUMBER | ORIGINAL SECTOR NUMBER | ALL "1's" |

FIG. 46

| CONTENTS | $2^7$ | $2^6$ | $2^5$ | $2^4$ | $2^3$ | $2^2$ | $2^1$ | $2^0$ |
|---|---|---|---|---|---|---|---|---|
| SETTING OF RECORDING POWER | \multicolumn{8}{c}{LASER CURRENT SELECTION} |
| SETTING OF RECORDING PULSE WIDTH | \multicolumn{8}{c}{CORRECTION AMOUNT SELECTION} |
| SETTING OF RECORDING CLOCKS | \multicolumn{8}{c}{CLOCK DIVISION RATIO SELECTION} |
| SETTING OF FILTER/VFO FREQUENCY | \multicolumn{4}{c}{LPF SELECTION} | \multicolumn{4}{c}{VFO FILTER, SELF-RUNNING FREQUENCY SELECTION} |
| SETTING OF ADVANCED DETECTION WINDOW WIDTH | \multicolumn{4}{c}{FOR VFO1} | \multicolumn{4}{c}{FOR VFO2} |
| SETTING OF DELAYED DETECTION WINDOW WIDTH | \multicolumn{4}{c}{FOR VFO1} | \multicolumn{4}{c}{FOR VFO2} |
| SETTING OF VFO1 DETECTION WINDOW WIDTH | \multicolumn{8}{c}{FOR VFO1} |
| SETTING OF VFO2 DETECTION WINDOW WIDTH | \multicolumn{8}{c}{FOR VFO2} |

OPTICAL RECORDING METHOD EMPLOYING PIT EDGE RECORDING ON RECORDING MEDIUM DIVIDED INTO A PLURALITY OF ZONES WHEREIN RECORDING PARAMETERS VARY FROM ZONE TO ZONE

This is a continuation of application Ser. No. 820,593 filed on Jan. 27, 1992, now U.S. Pat. No. 5,414,689, which is based on International application No. PCT/JP91/00697 filed on May 24, 1991.

TECHNICAL FIELD

The present invention relates to an optical information processing apparatus, and more particularly to a large-capacity high-speed optical disk device. The present invention further relates to a track/sector format suitable for such an optical disk device.

BACKGROUND ART

As for the prior art, one can refer to, for example, HITACHI HYORON, Vol. 65, No. 10 (October 1983), pp. 23–28. In a device disclosed by this reference, a disk is rotated at a constant angular velocity and there is used, as a data recording system, a pit position recording system in which "1" of code information after modification corresponds to the center of a pit. Also, the device employs a CAV (constant angular velocity) system in which the recording bit rate is constant over all circumferences of the disk. Accordingly, a bit length on the disk is different between inner and outer circumferences. For example, if the radius of the outermost circumference is twice as long as that of the innermost circumference, the bit length on the outermost circumference becomes twice as long as that on the innermost circumference. In the CAV system, the characteristic of a recording/reproducing system may be constant since the recording bit rate is the same over all circumferences. Also, the number of sectors per one track may be the same irrespective of the inner and outer circumferences of the disk.

In the case where it is desired to obtain a higher density than that in the CAV system, there can be considered systems as follows. A recording system as means for improving the linear recording density includes a pit edge recording system in which "1" of code information corresponds to the edge portion of an elongated hole or pit. In this system, it is possible to detect an edge position from a reproduced waveform even in the case where the linear recording density is made high as compared with that in the pit position recording system even if the characteristic of an optical system is the same. Further, if the pit edge recording system is used in combination with an MCAV (modified CAV) system in which the linear recording density is substantially constant over all circumferences of the disk and the rotating speed of the disk is made constant, it is possible not only to improve the linear recording density by virtue of the pit edge recording but also to attain a large capacity without bringing about the lowering of an access speed. When the radius of the outermost circumference is twice as long as that of the innermost circumference, the use of the MCAV system makes it possible to improve the capacity up to about 1.5 times as large as that in the CAV system. In order to use the pit edge recording system and the MCAV system in combination, there is required a track/sector format which is different from the conventional format used in the combination of the pit position recording system and the CAV system.

DISCLOSURE OF INVENTION

An object of the present invention is to provide an information recording/reproducing apparatus which is capable of attaining a high recording density and a high transfer rate by the combined use of a pit edge recording system and an MCAV recording system and to provide a format which is suitable for such an apparatus. According to the present invention, a capacity of at least 3.0 GB per one surface and a transfer rate of at least 1 MB/sec can be realized for a disk-like recording medium having a diameter of about 300 mm.

The pit edge recording system makes it possible to improve the recording bit density as compared with the pit position recording system even if an optical resolution is the same. FIG. 2 shows a comparison of the pit position recording system which is the conventional recording system and the pit edge recording system which is used in the present invention.

In the pit position recording system, if the interval between pits is shortened in order to improve the recording density, the level of a reproduced waveform 4 at a portion thereof including no pit is deteriorated due to an interference between pits, which makes it difficult to discriminately between pits. However, if data is defined to correspond to the edge of a variable-length pit, it is possible to stably detect the edges of pits from a reproduced waveform 5 even if the recording density is increased under the condition that the characteristic of an optical system is the same.

Such a recording manner is employed in optical disks, or more particularly, video disks exclusively for reproduction and digital audio disks. However, according to the recording manner employed in the disk exclusively for reproduction, stampers are produced from an original disk subjected to accurate edge recording with photoresist being used as a recording film and thereafter subjected to a processing for development, and disks are produced by stamping with such stampers. When this method is applied to a data-recordable/reproducible disk, there is the following problem. The principle of recording in a data-recordable optical disk lies in that information is recorded by changing the irradiation energy of a small focused spot 3 to cause a localized change of the temperature distribution on a recording medium, thereby changing an optical characteristic of the recording medium, thereby forming a localized recording region having a different physical property than the recording medium. As apparent from this principle of recording, the shape of a pit changes depending on the shape of a light spot, an intensity modulated light pulse waveform, a recording characteristic of the recording medium (determined by the composition and thickness of a recording film, an underlayer and a substrate), a linear velocity upon recording, and so on. Therefore, the conventional recording system must employ a pit position system in which the information is defined not by the shape of a pit but by a position where a pit exists (or the center position of a pit). In the present invention, means for controlling a recording condition is provided in order to control the shape of a pit. Thereby, factors which determine the above-mentioned recording characteristic are controlled. As it will be mentioned later on, the present invention particularly uses an MCAV recording system in which a recording area is divided into zones each including a plurality of tracks and respective recording clocks or the zones are changed so that the length of a recording pit becomes approximately constant over all the zones even if a disk is rotated at a constant angular velocity, and a control for a recording condition is changed at every zone. Thereby, it is possible to stably form a variable-length pit the edge of which corresponds to data.

Even if the above recording control is made, variations exist in factors which determine a recording condition or a reproducing condition between apparatuses or mediums. Observing the changing characteristics of those factors, it is seen that the change is not a variation which appears at every pit but a variation which is very low in frequency as compared with a modulation frequency and can therefore be regarded as being substantially static. Also, paying attention to the edges of pits, each of a positional relationship between front edges and a positional relationship between rear edges almost does not change though the shapes of pits change. Accordingly, in order to stably reproduce data even if the above-mentioned variations exist, the front and rear edges are detected independently of each other to discriminate data for each front edge and for each rear edge, and the front edge data and the rear edge data are thereafter synthesized to demodulate recording information. Thereby, data can be reproduced accurately even if there are variations in pit shapes.

As mentioned above, there is used the MCAV recording system in which a recording area is divided into zones each including a plurality of tracks and recording clocks are changed at every zone so that the length of a recording pit becomes approximately constant even if a disk is rotated at a constant angular velocity. Therefore, the capacity can be improved effectively as compared with a CAV system in which recording is made with recording clocks being kept constant irrespective of radial positions on the disk. Namely, as shown in FIG. 3, the recording capacity gradually approaches 1.5 times of the capacity of the CAV system as the number of zones is increased.

In the present invention, the recording condition and the reproducing condition are controlled at every zone in order to apply the MCAV recording system to pit edge recording. Thereby, the MCAV recording system and the pit edge recording system can stand together and recording/reproduction of information with a high density becomes possible.

Next, explanation will be made of the format of a recording medium in the present invention. In order to control the recording condition in accordance with a position on a disk, as mentioned above, address information for indicating a radial position on the disk is recorded on the disk. In operation, this address is detected to recognize the radial position on the disk and a recording condition or a reproducing condition is controlled on the basis of the recognized information.

The recording medium is constructed such that a recording area is divided into zones each of which includes a plurality of tracks and a recording/reproducing condition is changed at every zone or at every block. The recording condition may include the frequency of recording clocks for modulation, a recording power, a recording pulse width, and so on. The reproducing condition may include the characteristic of a signal processing circuit (including a differentiating circuit and an LPF circuit), the characteristic of generation of reproducing clocks by a PLL, a data detection window width upon RAW (read after write), and so on. Thereby, even in the case where the bit rate is different at different radial positions on the disk, the optimum condition can be established at all radial positions.

In the case where the pit edge recording system and the MCAV recording system are used in combination, the bit rate changes in accordance with a radial position on the disk since the rotating speed of the disk is constant. In the MCAV system, it is necessary to change the number of sectors per one track in accordance with a radial position on the disk in order to keep the interval between bits substantially constant over all circumferences of the disk. Also, in the case where the pit edge recording system is used, an elongated pit is generally formed. Therefore, it is necessary that the configurations of pit patterns of specified data in a preformatted area are made coincident with each other and the last bit in each of a preformatted area and a data area is the rear edge of a recording mark (or pit). Thus, in order to obtain a large capacity by using the pit edge recording system and the MCAV system in combination, it is necessary to use an optimum track/sector format.

In an optical disk of the present invention, a recording area is divided into a plurality of zones in a radial direction of the disk. Each zone includes a plurality of tracks. The number of sectors per one track in a zone is increased with the progression from an inner circumference to an outer circumference. Thereby, the interval between bits can be made substantially the same over all circumferences of the disk. Further, such a construction is convenient with respect to the management of tracks and sectors. Also, guard regions having no recorded data are respectively provided on the outermost and innermost circumferences with a user data recording region being interposed therebetween. The guard region is provided as a region for absorbing the variation in the mechanical precision of positioning of a disk driving device and the eccentricity of the disk. Further, a manufacture region for checking various characteristic data of the disk and the recording characteristic thereof is provided between each guard region and the user region. By providing those regions, the management of the characteristic of the disk is facilitated and the reliability of data can be improved. On the other hand, a redundant bit is added so that each of a preformatted area and a data area in each sector is terminated by the rear edge of a recording mark, and data is always completed by an unrecorded condition. Thereby, it is possible to complete data within each area and to prevent erroneous recording onto the succeeding area. Further, a preferable format can be provided by optimizing a pattern in each area.

A recording area is divided with respect to a radial direction of the disk into zones each of which includes a plurality of tracks. The number of sectors per one track is set for each zone and the number of sectors per one track in a zone is increased (for example, by one at a time) with the progression from a zone on the inner circumference side of the disk to a zone on the outer circumference side thereof. With such a construction, it is possible to make the bit interval substantially the same over all circumferences of the disk and to realize a characteristic having a storage capacity equivalent to that in a CLV (constant linear velocity) system and an access speed equivalent to that in the CAV system. In the case where the number of tracks per one zone is made constant, it is preferable that the number is an n-th power of 2, though no limitation to this value is intended. In that case, a control in a host preformat controller is facilitated. In employing the pit edge recording system, a redundant bit region is provided in each of a preformatted area and a data area in each sector so that the last bit of each area corresponds to the rear edge of a recording mark. Thereby, it is possible to prevent erroneous recording onto the succeeding area from occurring due to the fact that there generally results in the formation of an elongated pit. Further, the management of a format in units of one byte is facilitated by completing a pit pattern of a certain area, for example, a VFO (variable frequency oscillator) field for generation of reproducing clocks and pull-in synchronization in units of one byte.

BRIEF DESCRIPTION OF DRAWINGS

FIGS. 14A and 14B are diagrams showing a relationship between the recording power and the phase jitter;

FIG. 21 is a diagram showing the construction of a sector format;

FIG. 23 is a diagram for explaining a format of 3.5 GB;

FIG. 31 shows the construction of a pattern in each field of a flag area and a data area shown in FIG. 29;

BEST MODE FOR CARRYING OUT THE INVENTION

Figure 1:
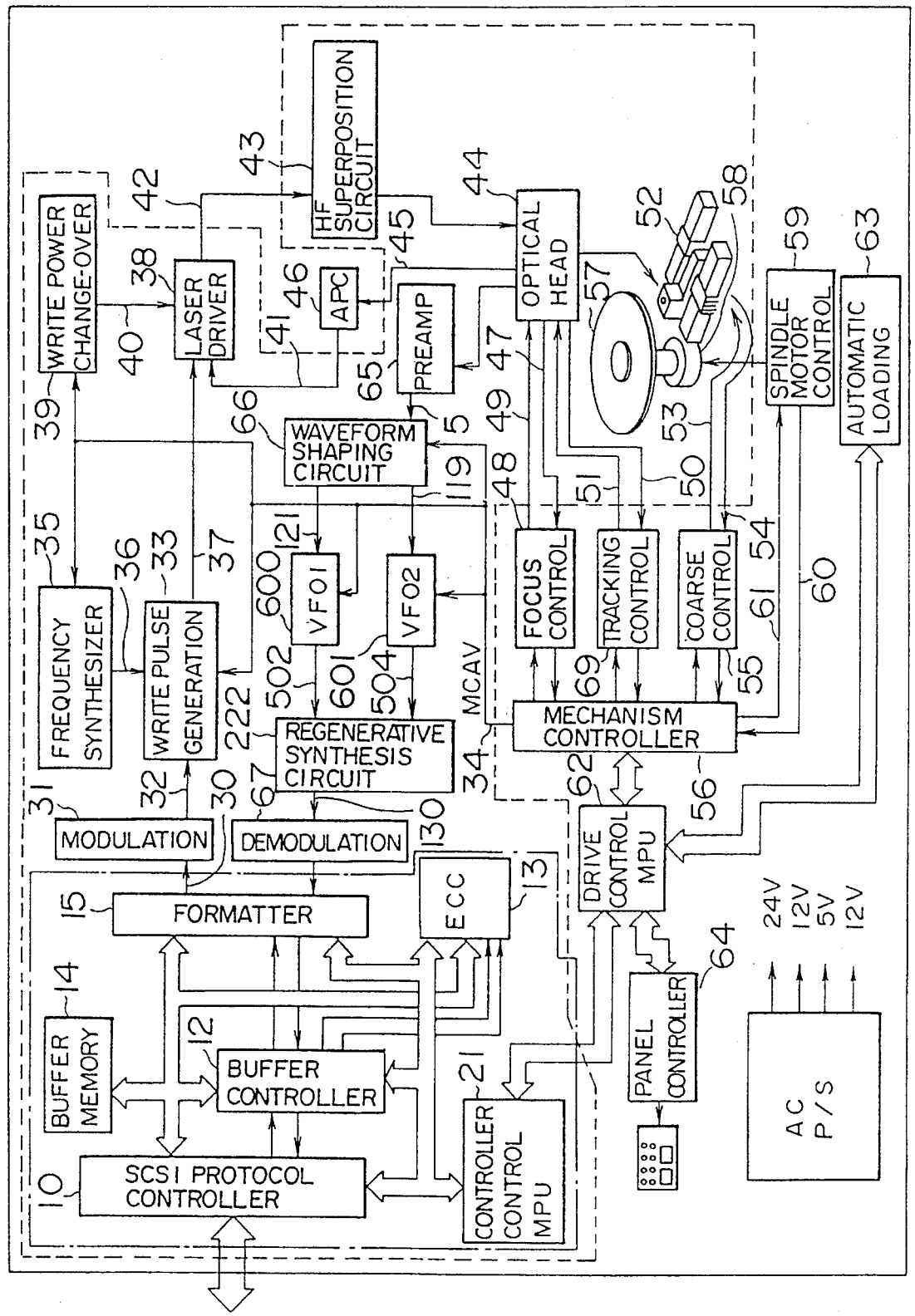
FIG. 1 is a block diagram showing the overall construction of an embodiment of the present invention.
Figure 4:
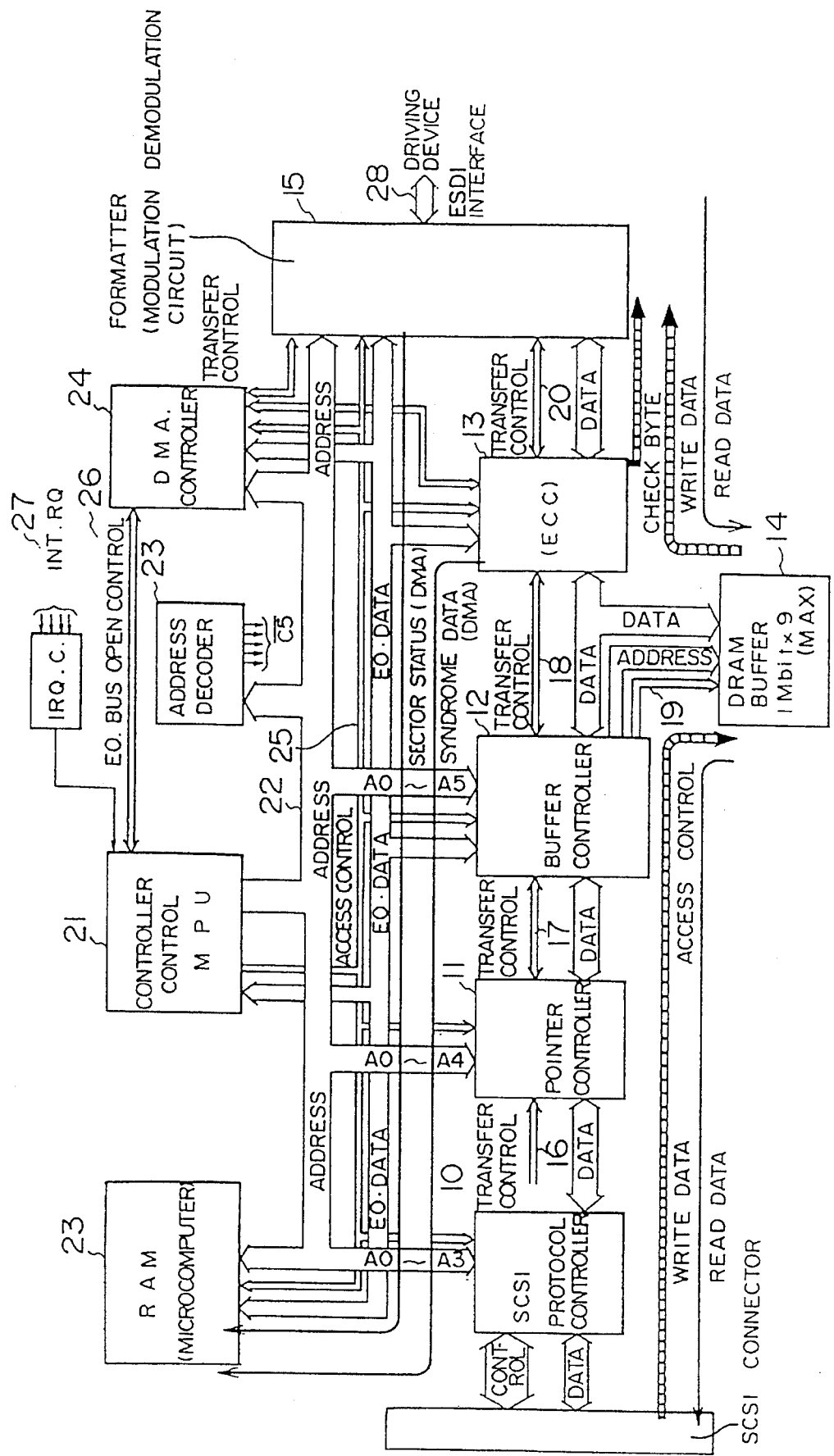
FIG. 4 is a block diagram of a controller section according to an embodiment of the present invention.

FIG. 1 shows a block diagram of a recording/reproducing apparatus which is an embodiment of the present invention. A driving device is connected to a host CPU (not shown) by an SCSI interface which sends data, instructions, etc., from the host to the driving device and sends reproduction data and information indicative of the operating condition of the driving device from the driving device to the host. The SCSI interface is connected to an SCSI protocol controller 10 so that the sending/reception of signals via the interface is controlled. Firstly, the construction of a controller section will be explained in reference to FIG. 4. Data inputted to and outputted from the SCSI protocol controller 10 is connected to an ECC circuit 13 and a buffer memory 14 through a pointer controller 11 and a buffer controller 12 and is further connected to a formatter 15 through the ECC circuit 13.

A control instruction 16 inputted to and outputted from the SCSI protocol controller 10 is connected to the pointer controller 11. Control instructions 16, 17, 18, 19 and 20 for data transfer are connected between the SCSI protocol controller 10 and the pointer controller 11, between the pointer controller 11 and the buffer controller 12, between the buffer controller 12 and the ECC 13, between the buffer controller 12 and the buffer memory 14 and between the ECC 13 and the formatter 15, respectively. Address information 22 generated from a controller control MPU 21 is inputted to an address decoder 23 which in turn outputs an instruction CS for chip selection. This address information 22 is further connected to a RAM 23, a DMA controller 24, the formatter 15, the SCSI controller 10, the pointer controller 11, the buffer controller 12 and the ECC 13 to designate the address of each data. Control information for controlling data is communicated through a common bus between the controller control MPU 21, the RAM 23, the DMA controller 24, the formatter 15, the SCSI controller 10, the pointer controller 11, the buffer controller 12 and the ECC 13. Between the controller control MPU 21 and the DMA controller 24 is connected a signal 26 for open control of the common bus. Access control information 25 is inputted to the RAM 23, the DMA controller 24, the formatter 15, the SCSI controller 10, the pointer controller 11, the buffer controller 12 and the ECC 13. This access control information 25 is used for access to data. The address information 22 and the access control information 25 are further inputted from the buffer controller 12 to the buffer memory 14. Various interruption control signals 27 are inputted to the controller control MPU 21. The formatter 15 is coupled to the driving device by an ESDI interface 28. Through the interface 28 are communicated recording/reproduction data, various information for controlling the operation of the driving device and information indicative of the operating condition of the driving device.

Returning to FIG. 1, recording data 30 from the formatter 15 is converted into a modulated signal 32 i.e. code information by a modulation circuit 31 and then inputted to a write pulse generation circuit 33. The write pulse generation circuit 33 controls the modulated signal 32 by use of control information 34 corresponding to each MCAV zone and a recording clock 36 generated from a frequency synthesizer 35 so as to have a recording pulse width corresponding to the MCAV zone, thereby generating a recording pulse 37 which is in turn sent to a laser driver 38. The frequency synthesizer 35 is inputted with the control information 34 corresponding to the MCAV zone and generates the recording clock 36. The control information 34 is further inputted to a write power change-over circuit 39 which in turn supplies the set value of a recording power 40 corresponding to the MCAV zone to the laser driver 38. The laser driver 38 produces a laser driving pulse waveform 42 in accordance with the set recording power value 40, the recording pulse 37 and an APC control signal 41 to drive through a high-frequency superposition circuit 43 a laser which is a light source for an optical head 44.

The optical head 44 outputs a signal 45 from a detector to receive light emitted from the laser and supplies it to an APC circuit 46. Thereby, the edge recording data modulated corresponding to the MCAV zone can be recorded in accordance with a linear velocity and stably with no influence of a variation in a characteristic of the laser or the like.

Control information for a light spot (for example, focus control information and tracking control information) is inputted to the optical head 44. The optical head 44 outputs a focus error signal 47 to a focus control circuit 48 which in turn outputs a control signal 49 for drive of a focus actuator to the focus actuator, thereby effecting a focus servo to keep a focal plane of the light spot on the disk surface. The optical head 44 further outputs a tracking error signal 50 to a tracking control circuit 69 which in turn outputs, a control signal 51 for causing a small movement of the light spot in a radial direction to the optical head 44 to drive a fine actuator, thereby effecting a tracking servo operation to position the light spot along the track.

The optical head 44 is driven as a whole by using the fine actuator when the movement of the light spot over a small range is to be made and using a coarse actuator 52 when the movement thereof over a wide range is to be made. A coarse control signal 53 is inputted to the coarse actuator 52. Upon tracking, too, the fine actuator and the coarse actuator 52 operate in an interlocking manner so that the light spot follows the track eccentricity. Thereby, the light spot is stably controlled so that data is accurately recorded and reproduced. In the case where random access is to be made, a signal 54 from an external scale attached to the optical head 44 is inputted to a coarse control circuit 55 which in turn generates the coarse control signal 53 for controlling the coarse actuator 52 by use of the signal 54 from the external scale representative of a position of the head, thereby firstly causing a large movement of the whole of the head 44 to the vicinity of a target track. Thereafter, the fine actuator and the coarse actuator 52 are interlocked with each other to move the light spot so that the spot is positioned onto the target track. A series of operations of the light spot as mentioned above are realized by controlling the actuators by a mechanism controller 56 through communication between the mechanism controller 56, the focus control circuit 48, the tracking control circuit 69 and the coarse control circuit 55. Control information is communicated between the mechanism controller 56 and a spindle motor control circuit 59 which controls a spindle motor 58 for rotating a disk 57. The spindle motor control circuit 59 supplies information 60 indicative of the condition of rotation of the spindle motor 58, and the mechanism controller 56 supplies information 61 for controlling the spindle motor 58. The spindle motor control circuit 59 drives the spindle motor 58 to stably rotate it at a constant rotating speed.

The operation of the whole of the optical disk driving device is controlled by a drive control MPU 62. The drive control MPU 62 communicates via signals with an automatic loading mechanism 63, the mechanism controller 56, the controller control MPU 21 and a panel controller 64. The drive control MPU 62 performs a series of controls of the operation of the optical disk driving device which include controlling the automatic loading mechanism 63 to attach or detach the disk 57 to or from the spindle, controlling the controller control MPU 21 to perform a signal processing for recording/reproduction, controlling the mechanism controller 56 to perform the positioning of a light spot for recording/reproduction, and controlling the panel controller 64 to obtain information for maintenance.

A signal detected by the optical head 44 is received by a light detector, is converted thereby into an electric signal, and is thereafter amplified by a preamplifier 65. An output signal from the preamplifier 65 is inputted to a waveform shaping circuit 66 which in turn outputs pulses 121 and 119 corresponding to the front edge and the rear edge of a pit, respectively. The front edge pulse 121 and the rear edge pulse 119 are inputted to VFO's 600 and 601 which in turn produce reproducing clocks 501 and 503, respectively (see FIG. 9). The VFO's 600 and 601 perform a conventional data discrimination by use of the clocks 501 and 503 and the edge pulses 121 and 119 to detect front edge data 502 and rear edge data 504, respectively. The front edge data 502 and the rear edge data 504 are inputted to a regenerative synthesis circuit 222 and synthesized thereby. The synthesized data 130 is inputted to a demodulation circuit 67 to obtain reproduction data. The details of the recording/reproducing system will be explained later on.

As will be apparent to one of ordinary skill in the art from the preceding discussion and from the remainder of the specification, the frequency synthesizer 35 in FIG. 1 constitutes bit rate changing means for changing a bit rate of code information to be recorded, and the write pulse generation circuit 33, the write power change-over circuit 39, the waveform shaping circuit 66, the VFO 600, and the VFO 601 in FIG. 1 constitute characteristic changing means for changing a recording characteristic and a reproducing characteristic of the recording/reproducing apparatus in FIG. 1.

The above is the outline of the construction of the optical disk device according to the present embodiment. In the following, a more detailed explanation of the present embodiment will be made in the sequence of the explanation of an edge recording characteristic and a recording control system determined therefrom, the explanation of a reproduction control system for detecting reproduction data from recorded pits, and the explanation of a specific format for MCAV and the flow of signals over the whole of recording/reproduction.

Figure 5A:
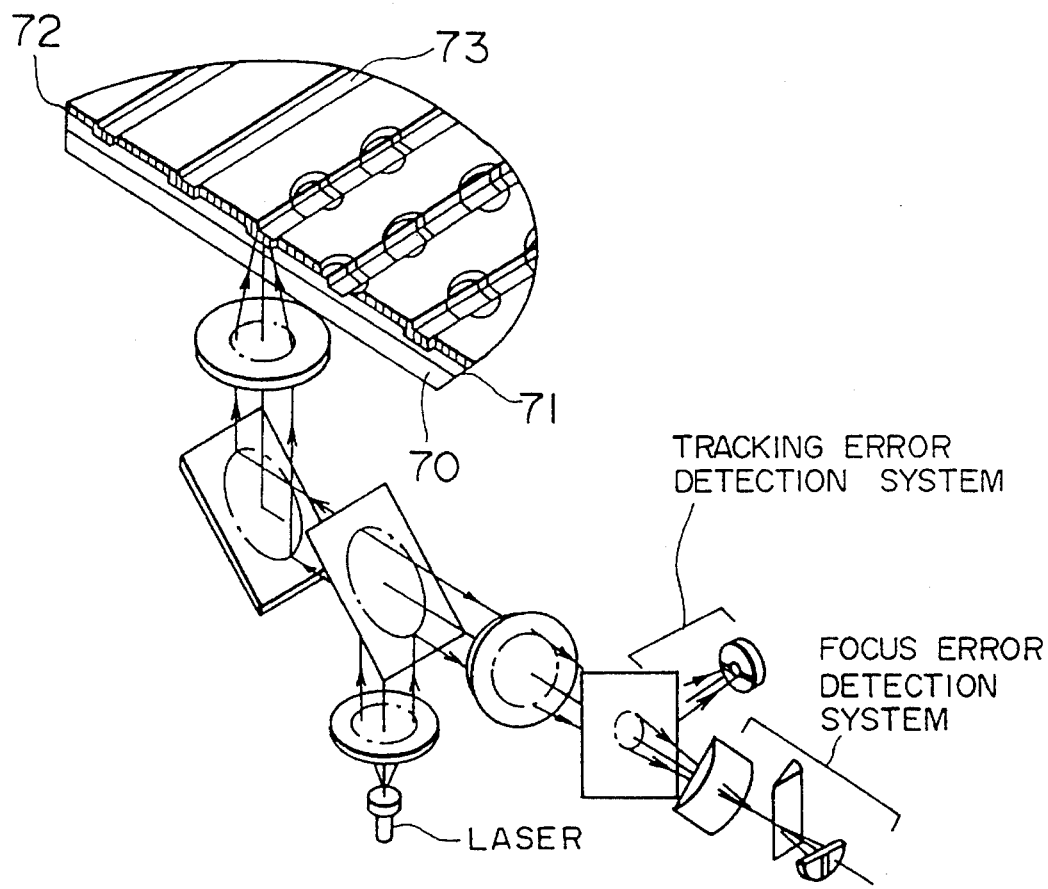
FIGS. 5A and 5B are perspective views of an optical disk device according to an embodiment of the present invention.
Figure 5B:
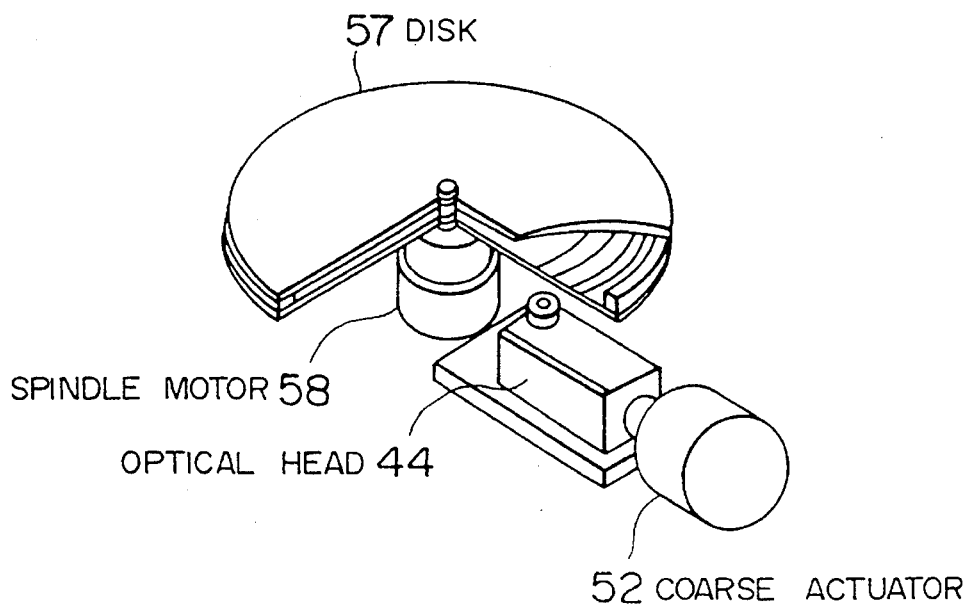
Figure 6:
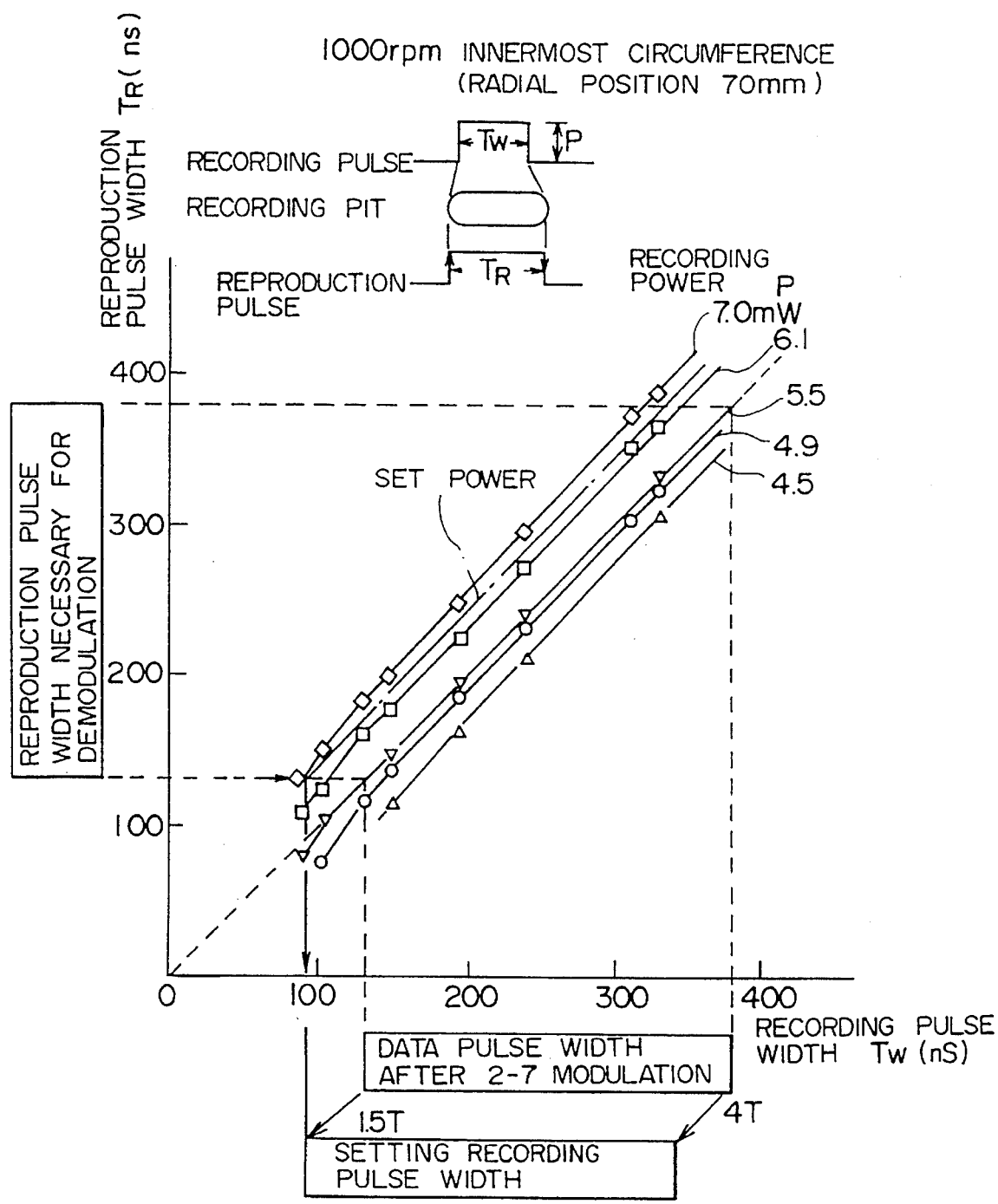
FIGS. 6 and 7 each shows a relationship between the recording pulse width and the reproduction pulse width.

A recording medium of the optical disk 57 used in the present embodiment includes a glass substrate 70, an UV film 71 provided on the glass substrate 70 and a recording film 72 provided on the UV film 71, as shown in FIG. 5(A). It is preferable that a ternary metal film (PbTeSe) of a Te series be used for the recording film 72. Guide grooves 73 for positioning light spots are formed in the UV film 71. The disk 57 includes a sandwiched lamination structure of two plates, as shown in FIG. 5(B). Using such a recording medium, the formation of elongated pits was made by use of a light spot of 1.3 μm diameter at a radial recording position of 70 mm and at a rotating speed of 1000 rpm. FIG. 6 shows a relationship between a recording pulse width $T_W$ and a reproduction pulse width $T_R$ when a recording power P is taken as a parameter. The abscissa represents the recording pulse width $T_W$ and the ordinate represents the reproduction pulse width $T_R$. In a region where the recording pulse width $T_W$ is large, the reproduction pulse width $T_R$ has a substantially linear relation with the recording pulse width $T_W$ having the amount of offset with respect to the recording pulse width $T_W$. As the recording pulse width $T_W$ becomes shorter, the reproduction pulse width $T_R$ becomes abruptly short, deviating from the linearity. When the recording power P is made large, the amount of offset becomes large with the linear relation between the reproduction pulse width $T_R$ and the recording pulse width $T_W$ being substantially maintained. Observing this characteristic in more detail, it is seen that when the recording power P is large, the gradient of the linear relation becomes large with a small change and the recording pulse width $T_W$ at which the linearity of the reproduction pulse width $T_R$ begins to deviate is shifted to a longer side.

Figure 7:
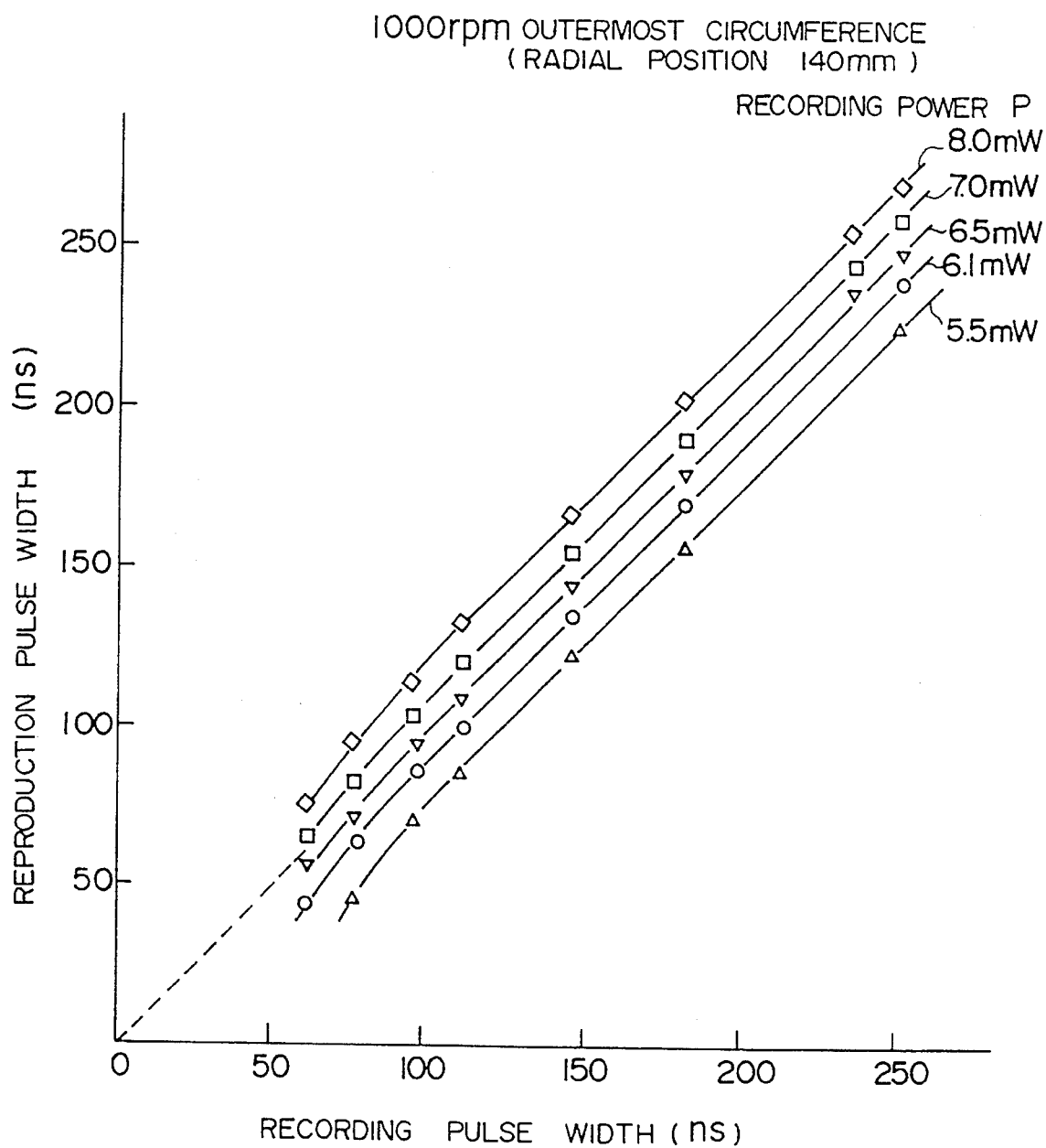

As shown in FIG. 7, the above tendency in characteristic has no change even if the radial recording position is located at a twice distance or 140 mm with the rotating speed being the same (1000 rpm).

Figure 8:
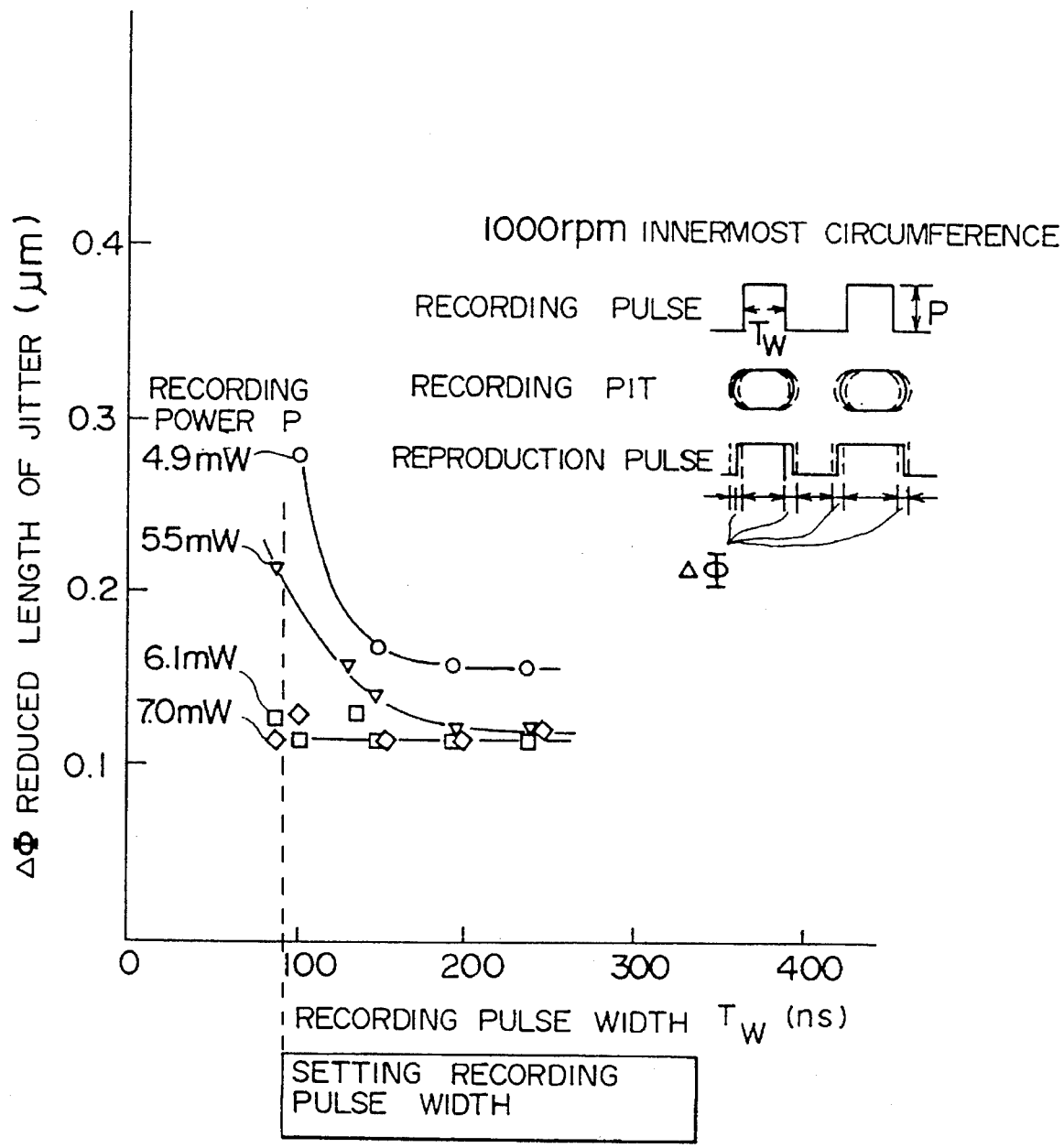
FIG. 8 shows a relationship between the recording power and the temporal fluctuations of a reproduction signal.

In a pit edge recording system in which data corresponds to the edge of an elongated pit, it is preferable that the recording pulse width $T_W$ and the reproduction pulse width $T_R$ become equal to each other. However, in the case where the linear velocity is slow, the reproduction pulse width $T_R$ has large fluctuations if the recording power P is set so that the recording pulse width $T_W$ and the reproduction pulse width $T_R$ become equal to each other. This is shown in FIG. 8. In the figure, a relationship between the recording power P and the fluctuations of the reproduction pulse width $T_R$ is shown with the recording pulse width $T_W$ being taken as a parameter. In the case where the linear velocity is slow, the increase in temperature on the recording film becomes large and the reproduction pulse width $T_R$ has a tendency to expand with respect to the recording pulse width $T_W$. If the recording power P is therefore lowered, the gradient of a temperature distribution on the recording film surface upon irradiation with a light spot becomes small with an increased sensitivity to the variation in sensitivity of the recording film and the variation of the recording power. As a result, the variation the edge position of a recording pit becomes large. From the above, the optimum recording power to stabilize the edge position has a value larger than a recording power P1 which makes the recording pulse width $T_W$ and the reproduction pulse width $T_R$ equal to each other. On the other hand, if a recording bit pitch and a modulation system are determined, a range which the reproducing pulse width $T_R$ can take is uniquely determined, as shown in FIG. 6. Thus a recording pulse width $T_W$ is determined from the above-mentioned recording power P and the above-mentioned reproduction pulse width $T_R$. This recording pulse width $T_W$ becomes short as compared with the reproduction pulse width $T_R$. Namely, a setting range of the recording pulse width $T_W$ is a setting recording pulse width region, as shown in FIG. 6 in which the possible range of the reproduction pulse width (or a reproduction pulse width necessary for demodulation) is shifted by a fixed time from the linear relation between the recording pulse width and the reproduction pulse width.

Figure 9:
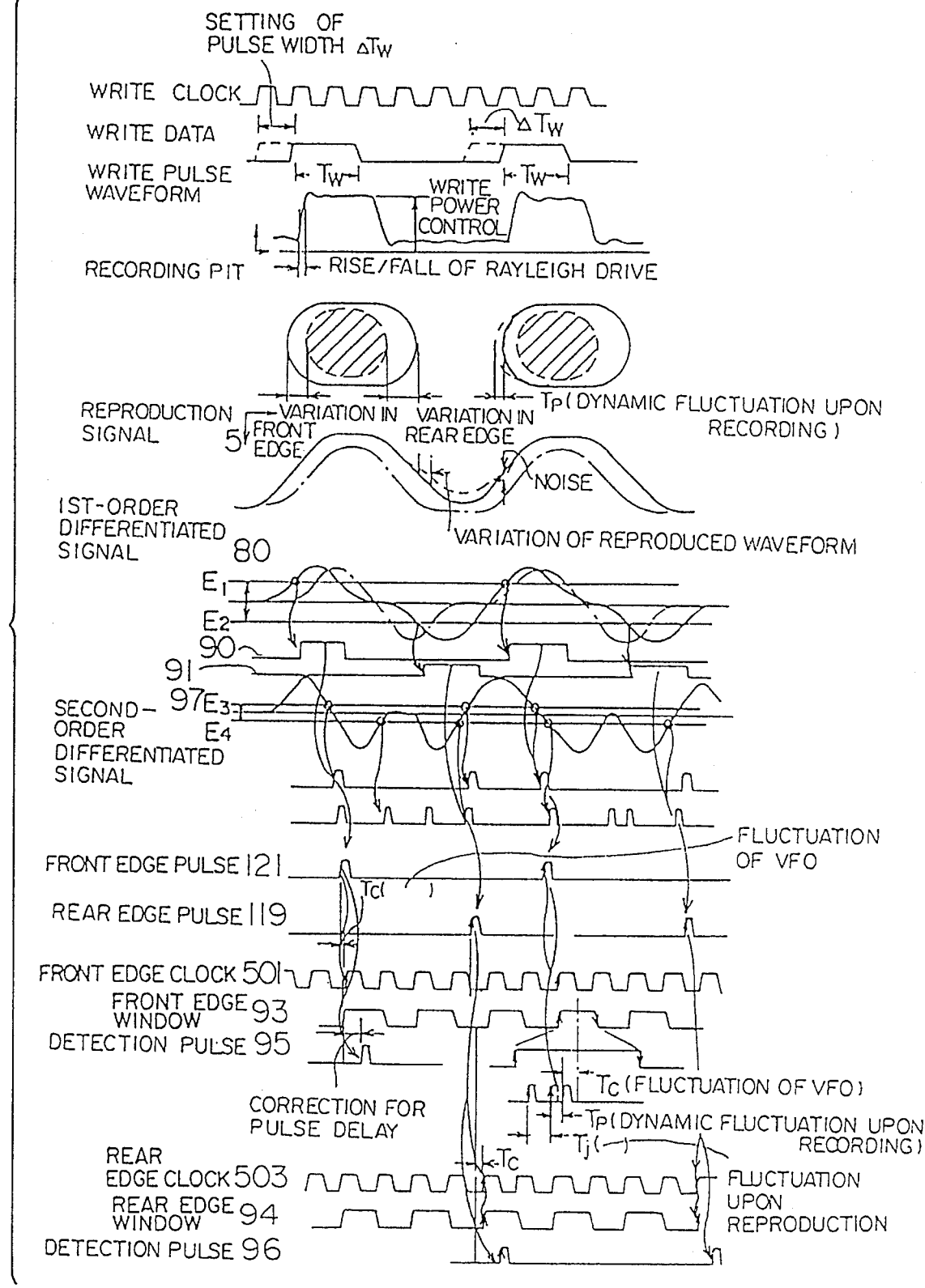
FIG. 9 is a time chart of an edge recording/reproducing control.

From the above considerations, the recording pulse width $T_W$ is controlled upon recording so that it is corrected from a pulse width to be originally recorded by a fixed time (or the amount of correction for pulse width) which is determined in accordance with a linear velocity (see FIG. 9). This control is performed by the write pulse generation circuit (or write pulse width control circuit) 33. Also, the recording power P is controlled by the write power change-over circuit (or WRT current control circuit) 39 in accordance with the linear velocity so that it becomes the optimum recording power which minimizes the variation of the edge. The above recording control makes it possible to form stable pits corresponding to data to be recorded. In the present embodiment, since the MCAV recording system is used, both of the recording power P and the amount $\Delta T_W$ for pulse width correction are controlled for each zone such that they are constant in a zone.

A modulation system used for pit edge recording should be a system adapted to the recording characteristic of the optical disk. Taking the above-mentioned recording characteristic into consideration it is advantages, that the shortest pulse width to be recorded longer than a pulse width determined from a bit pitch is used as a pulse width after modulation, since a region exhibiting a linearity between the reproduction pulse and the recording pulse can be used effectively. Further, taking the reproducing characteristic into consideration, the detection of elongated pits, if the same optical system is used or the resolution is the same, is preferable since a signal level is enhanced and an interference between pits becomes small. From the above point of view, if the representation for modulation systems used in magnetic disks is used, it is preferable that the shortest magnetization reversal time is at least T where T is a bit interval time. A 1.33 T series or 1.5 T series among existing modulation systems is more preferable.

As a specific example, a modulation system called (1, 7, 2, 3) 1 to 7 modulation or (2, 7, 2, 4) 2 to 7 modulation is preferable. In the present embodiment, the 2 to 7 modulation is used. In those modulation systems, however, since a detection window width for discriminating data becomes narrow though the shortest pit length becomes large, it is necessary to suppress the fluctuations of the edge position. Especially, a pit formation type of recording film among recording mediums for optical disks is suitable for such a modulation system since the measurement of disk noise corresponding to the variation of the shape of a pit provides a very small value.

Figure 2:
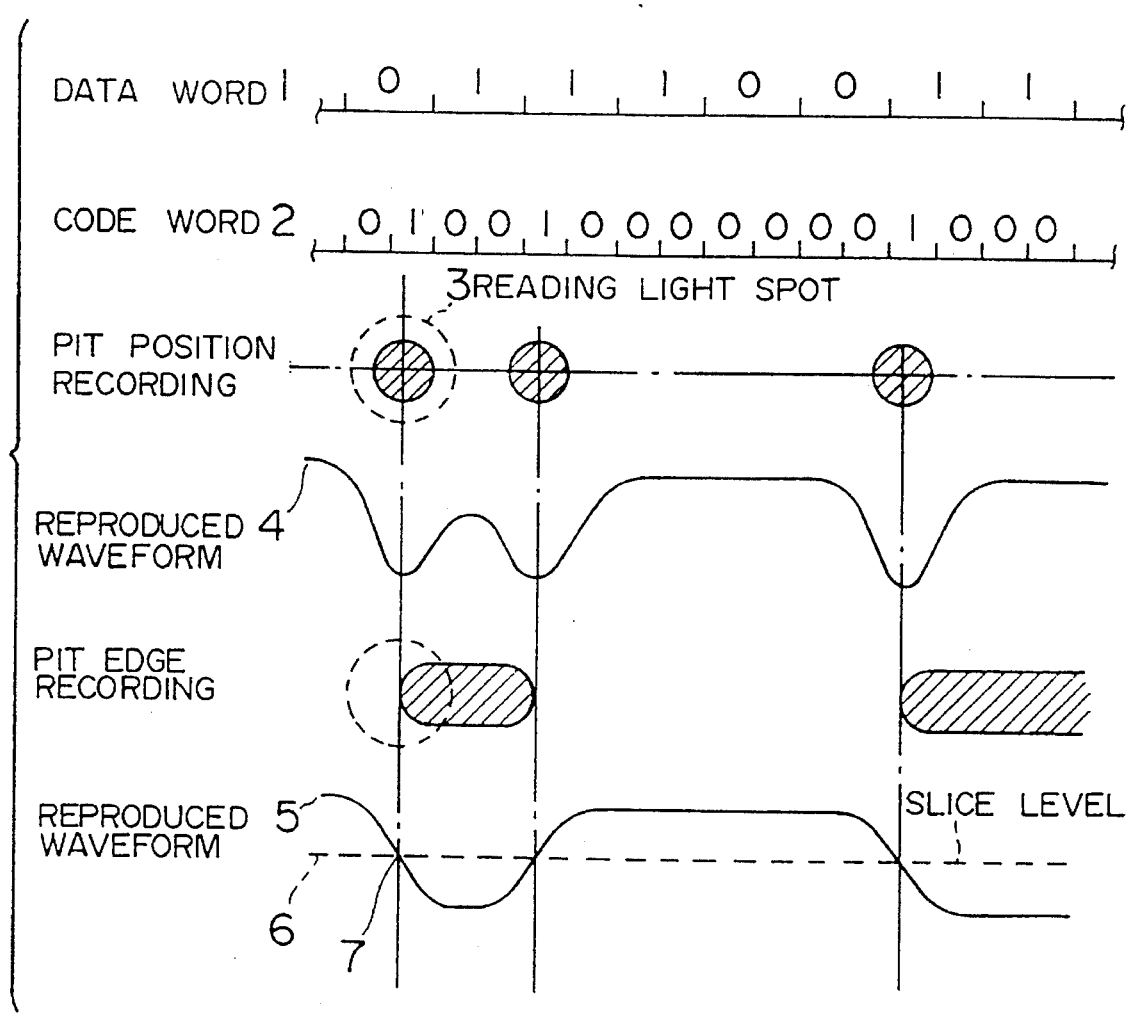
FIG. 2 is a diagram showing the comparison of a pit position recording system and a pit edge recording system.

In the case where this modulation system is used for edge recording, various problems arise when a signal corresponding to the edge is detected from a reproduction signal. Namely, in the above-mentioned modulation system, a signal occupation band includes signal components extending from DC to a low frequency region. Therefore, when the signal corresponding to the edge is detected as the intersection 7 of a certain fixed slicing level 6 and a level converting portion of a reproduction signal 5 as shown in FIG. 2, a signal extending from DC to a high frequency region should be amplified and transmitted as the reproduction signal 5. In general, however, due to the problem of dynamic range and the problems of offset and drift, it is usually impossible to deal with a signal extending from DC to a high frequency region. Therefore, an attempt to detect a point change in level conversion of the reproduction signal 5 as the signal corresponding to the edge is made as will be described later on.

If the above attempt is made, the amplification and transmission of only signal components representative of the changing points suffice. As a result, components extending from DC to a low frequency region become needless.

Figure 10:
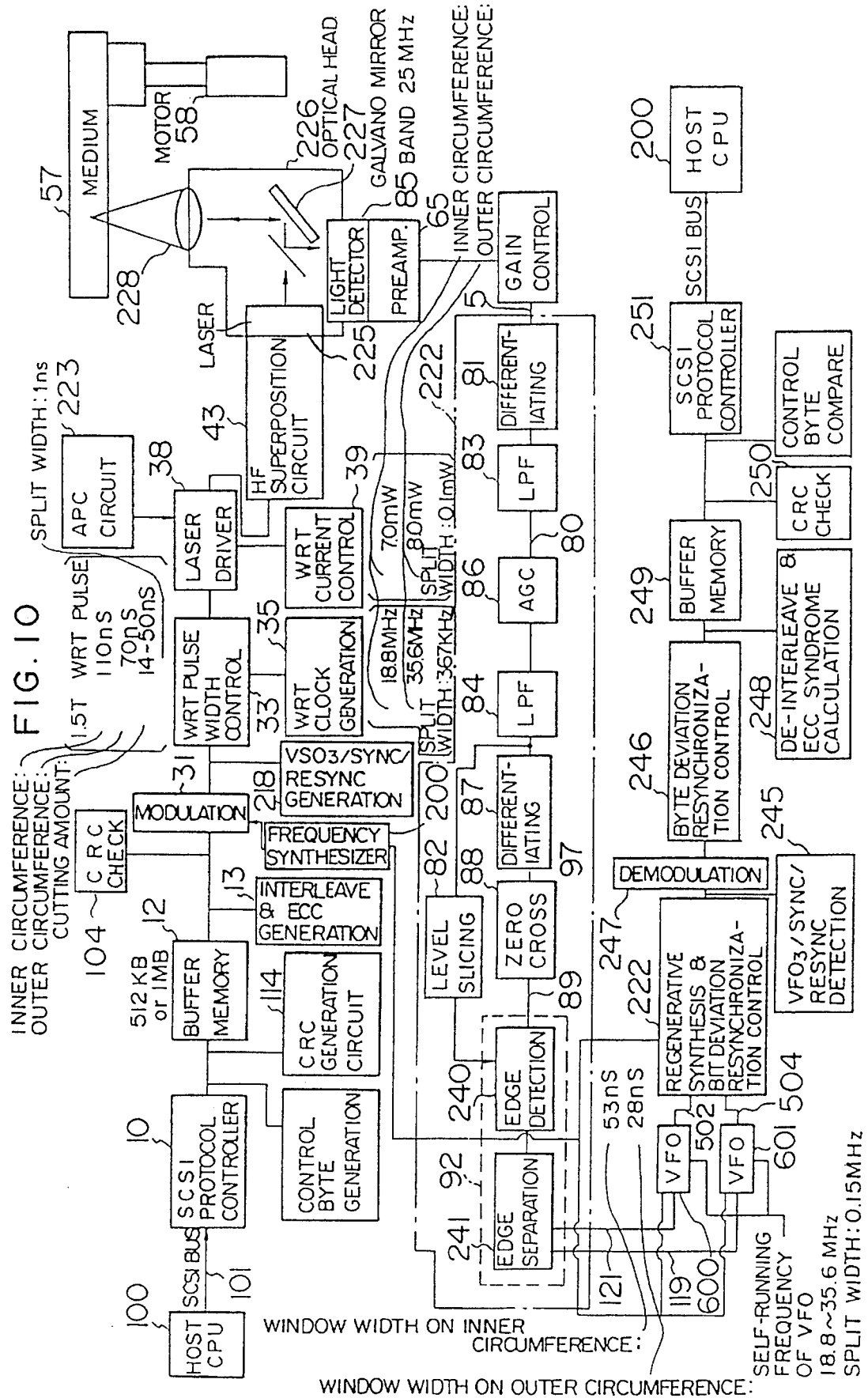
FIG. 10 is a block diagram of a recording/reproducing system according to an embodiment of the present invention.

In the following, a time chart of the operations for processing of a recording signal and a reproduction signal is shown in FIG. 9 and a block diagram of an embodiment of a recording/reproducing apparatus as an optical disk device of the present invention is shown in FIG. 10. An optical disk driving device is connected to a host CPU (central processing unit) 100 by an SCSI (small computer system interface) bus 101 so that data, instructions, etc., from the host are sent to the driving device through the SCSI bus 101 and reproduction data and information indicative of the operating condition, etc., are sent from the driving device to the host through the SCSI bus 101. The SCSI bus 101 is connected to an SCSI protocol controller 10 so that the sending/reception of signals on the bus is controlled. FIG. 10 shows the flow of recording/reproduction data.

Recording data is inputted from the CPU 100 to a buffer memory 12 through the SCSI bus 101 and the SCSI protocol controller 10. In storing the recording data into the memory 12, an error check code corresponding to the recording data is added by a CRC (cyclic redundancy check) generation circuit 114. Further, after the interleaving of the recording data and the addition of an error correction code have been made by an interleave and ECC (error correction code) generation circuit 13 and the added CRC code has been confirmed by a CRC check circuit 104, the conversion into a modulated code is made by a modulation circuit 31. Recording clocks necessary for the modulation are generated by a frequency synthesizer 200 and the frequency of the recording clocks is changed at every zone by a control signal. Various patterns to be used upon reproduction are added to the modulated code by a VFO (variable frequency oscillator)/SYNC/RESYNC generation circuit 218 and the code is thereafter inputted to a recording pulse width control circuit 33. The control circuit 33 controls the recording pulse width in accordance with each zone. The controlled recording pulse is inputted to a laser driver 38 to drive a laser 225 by a current which is set by a recording current control circuit 39. A driving current upon recording, that is, a recording power, is also changed at every zone or for each block. An APC (automatic power control) circuit 223 is provided for keeping a laser light output upon reproduction constant and controls the laser driving current so that a detection current of a laser light output intensity monitor becomes constant. The laser driving current is applied to the laser 225 through a high-frequency superposition circuit 43. Laser light passes through an optical system in an optical head 226, is reflected by a galvano mirror 227 for effecting a tracking control, and is focused onto a recording film of a disk 57 by a lens 228 which is movable up and down for a focus control. Upon recording of data, the light intensity is increased by the recording pulse current to a value higher than the intensity upon reproduction so that as a recording mark (or pit) corresponding to data is formed on the recording film.

In the pit edge recording system, the modulated code is NRZ (non-return to zero) converted so that "1" of the modulated code corresponds to a front end and a rear end of the recording data pulse. The disk 57 is rotated by a motor 58 at a constant angular velocity. In the MCAV system, it is necessary to increase the recording clock frequency with the progression from an inner circumference of the disk to an outer circumference thereof in order that the bit rate or the track recording density becomes approximately the same with respect to radial positions of the disk. The foregoing is the explanation of main constituent components of the recording system and the operation thereof.

Next, explanation will be made of main constituent components of a reproducing system and the operation thereof. A reflection coefficient at a recording mark portion (or pit portion) formed on the recording film of the disk 57 is different from that at an unrecorded portion. Therefore, the presence/absence of a recording mark (or pit) can be detected by a change in a level of light reflected from the disk. The reflected light is received by a light detector 85, is converted thereby into an electric signal and is thereafter amplified by a preamplifier 65. In the present embodiment, there is used a system in which the edge of a pit is detected from a zero cross point of a second-order differentiated signal. Also, considering the characteristic of the medium that each of a positional relationship between front edges of pits and a positional relation between rear edges thereof has almost no change though the shapes of pits have a change, there is used a system in which the front and rear edges are detected independently from each other and subjected to data discrimination and the front edge data and the rear edge data are thereafter synthesized by use of a known pattern portion to demodulate recording information (referred to as a regenerative synthesis system).

The signal amplified by the preamplifier 65 is transmitted through a first differentiating circuit 81, a first LPF (low-pass filter) circuit 83, an AGC (automatic gain control) circuit 86 and a second LPF circuit 84 in the mentioned order. The first-order differentiated signal is inputted to a level slicing circuit 82 on one hand for edge polarity determination and to a second differentiating circuit 87 on the other hand for edge detection. An output of the second differentiating circuit 87 is inputted to a zero cross detection circuit 88. Edge pulses from the detection circuit 88 are passed through an edge detection circuit 240 and are separated by an edge separation circuit 241 into a front edge signal and a rear edge signal which are in turn inputted to a VFO 600 and a VFO 601, respectively. Each VFO generates reproducing clocks on the basis of the edge signal and makes data discrimination by use of the reproducing clocks and the edge signal to detect front edge data or rear edge data independently from each other. The front edge data and the rear edge data are synthesized by a regenerative synthesis circuit 222 and the synthesized data is inputted to a demodulation circuit 247 to obtain reproduction data. The start of demodulation is made referring to a SYNC pattern detected by a SYNC/RESYNC detection circuit 245. In the case where byte deviation occurs during demodulation, the recovery from the byte deviation is made through a resynchronization processing by a resynchronizing circuit 246. Thereafter, in contrast with the recording process, de-interleave and ECC calculation 248 are performed and the reproduction data is once stored in a buffer memory 249. The data is subjected to error check by a CRC check circuit 250 and is thereafter sent to a host CPU 200 through an SCSI protocol controller 251. In FIG. 10, the protocol controller 251 for recording control and the protocol controller 10 for reproduction control are provided separately from each other. However, they may be unified for common use.

The detection of the changing point of the reproduction signal 5 is made as follows. The differentiated detection signal 80 of the reproduction signal 5 has a large signal level at a level converting portion of the reproduction signal 5 as shown in FIG. 9, and hence is is possible to decide either a front edge portion or a rear edge portion from the polarity of the differentiated detection signal 80. Therefore, the reproduction signal 5 is inputted to the differentiating circuit 81 and the level of an output of the differentiating circuit 81 or the differentiated detection signal 80 of the reproduction signal is decided by the level slicing circuit 82 to detect each edge position. Since a point where the differentiated detection signal 80 of the reproduction signal 5 takes the maximum value is the changing point of the reproduction signal 5, the differentiated detection signal 80 of the reproduction signal is further differentiated and a zero cross point of this second-order differentiated signal and the above-mentioned edge position detection signal are used to detect a signal corresponding to each edge. In this manner, signals corresponding to edges can be detected stably by use of a conventional signal processing circuit. In this signal detection system including the differentiation, since high frequency components are amplified each time the differentiation processing is performed, the low-pass filters 83 and 84 are providing for making a limitation to a necessary band. Namely, along the general signal flow shown in FIG. 10, the signal photoelectrically converted by the light detector 85 is passed through the differentiating circuit 81 and the low-pass filter 83, is then inputted to the AGC (automatic gain control) circuit 81 for adjustment of the gain to a constant level so as to make the amplitude of the signal constant, and is thereafter inputted through the low-pass filter 84 to the level slicing circuit 82 and the differentiating circuit 87. The band of the low-pass filter 84 is variable. A signal 97 differentiated by the differentiating circuit 87 enters the zero cross detection circuit 88. The zero cross detection circuit 88 has two slicing levels $E_3$ and $E_4$. When the second-order differentiated signal 97 successively intersects the levels $E_3$ and $E_4$, the zero cross detection circuit 88 generates intersection pulses indicative of intersecting periods. In the zero cross detection circuit 88, zero cross pulses generated upon zero crossing of the second-order differentiated signal 97 are gated by use of the intersection pulses to generate a zero cross signal 89 indicative of the changing points of the production signal. The level slicing circuit 82 slices the first-order differentiated signal 80 by means of two slicing levels $E_1$ and $E_2$ to generate a front edge position signal 90 indicative of locations of front edges and a rear edge position signal 91 indicative of locations of rear edges. The edge detection circuit 92 receives the edge position signals 90 and 91 outputted from the level slicing circuit 82 and the zero cross signal 89 outputted from the zero cross detection circuit 88 to generate front edge pulses 121 and rear edge pulses 119 corresponding to edges.

Taking the combined use of the MCAV recording system and the above reproducing system into consideration, a signal band gradually increases with the progression from an inner zone to an outer zone on the radius of the disk since the recording pit length is substantially the same over all zones and the rotating speed is constant. If the value of the filter 84 is fixed, the value of noise at the outer circumference generally becomes twice as large as that at the inner circumference since the signal band at the outer circumference is twice that at the inner circumference. Accordingly, there is a need to change a constant(s) for signal processing at every zone. But, as the number of zones increases, the circuit becomes complicated. The dominant noise to be considered in the case of a pit formation type of medium for optical disks is disk noise. Unlike white noise, the disk noise has a property that even if a signal band is increased, the noise power is uniform over the whole of that signal band. When this property is taken into consideration, the number of steps for change-over of band of the filter 84 can be reduced or may be about one tenth of the number of zones.

The front edge pulses 121 and the rear edge pulses 119 are respectively inputted to separate PLL's (phased locked loops) to generate reproducing clock signals 501 and 503.

Window pulses 93 and 94 for detecting data are produced from the reproducing clock signals 501 and 503. On the other hand, front and rear edge detection pulses 95 and 96 corrected for delays in PLL's, circuits, etc. are generated from the front and rear edge pulses 121 and 119. Discrimination of data is made in accordance with whether or not the edge detection pulse 95 or 96 falls within the duration of the window pulse 93 or 94. Accordingly, in order to correctly detect data, it is required that the temporal variation of the edge pulse 121 or 119 falls within the width of the window pulse 93 or 94.

Factors of the temporal variation of the edge pulse include the following: $T_c$: fluctuation of reproducing clocks, $T_P$: dynamic fluctuation upon recording, $T_j$: fluctuation upon reproduction.

Edge data 502 and 504 outputted from the data discrimination circuit are inputted to the regenerative synthesis circuit 222. In the regenerative synthesis circuit 222, the edge data 502 and 504 are sequentially stored into memories 606 and 607, respectively, in accordance with the reproducing clocks 501 and 503 produced by the PLL's in connection with the front and rear edges. Edge data stored in each memory is read in accordance with another clock signal 514. Upon reading, the sequencing of data to be fetched from the memories is made. For the data sequencing, recording data having a known time interval between front and rear edges is used. This recording data is detected and data corresponding to the rear edge of the detected recording data is read from the memory while being shifted by clocks corresponding to the above-mentioned time interval with respect to data which corresponds to the front edge of the detected recording data. In the optical disk, there may be the case where the PLL operation is disturbed due to defects or the like, thereby causing the temporal shifting of each edge data. Therefore, the above-mentioned recording data is recorded at a certain interval and a resynchronization operation for re-sequencing is performed each time the above temporal shifting is detected. With such a construction, the variations of edge positions, which may necessarily occur from the recording principle of an optical disk, are absorbed, thereby making it possible to stably reproduce data.

Figure 11:
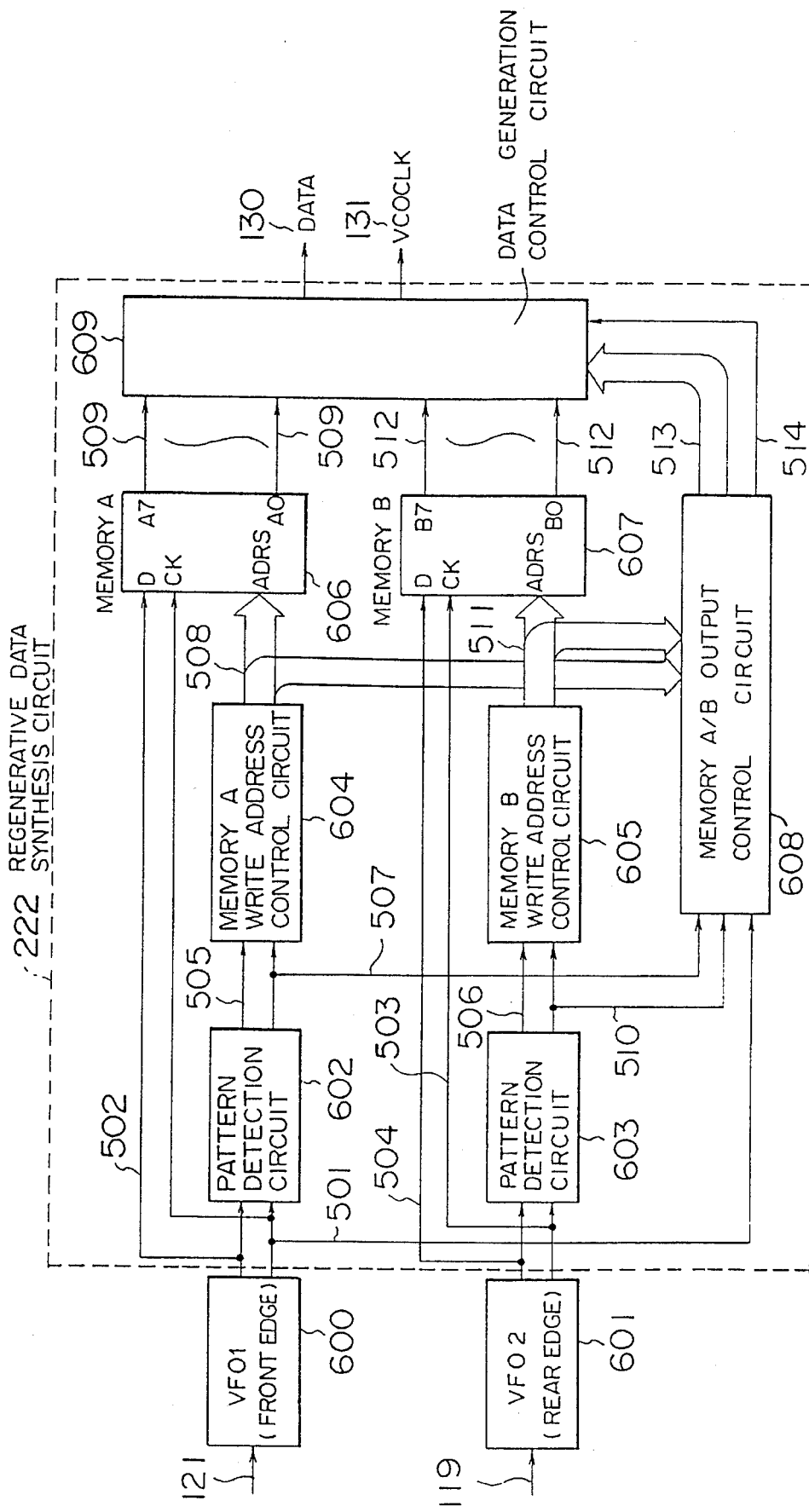
FIG. 11 is a block diagram of a regenerative synthesis circuit.
Figure 12:
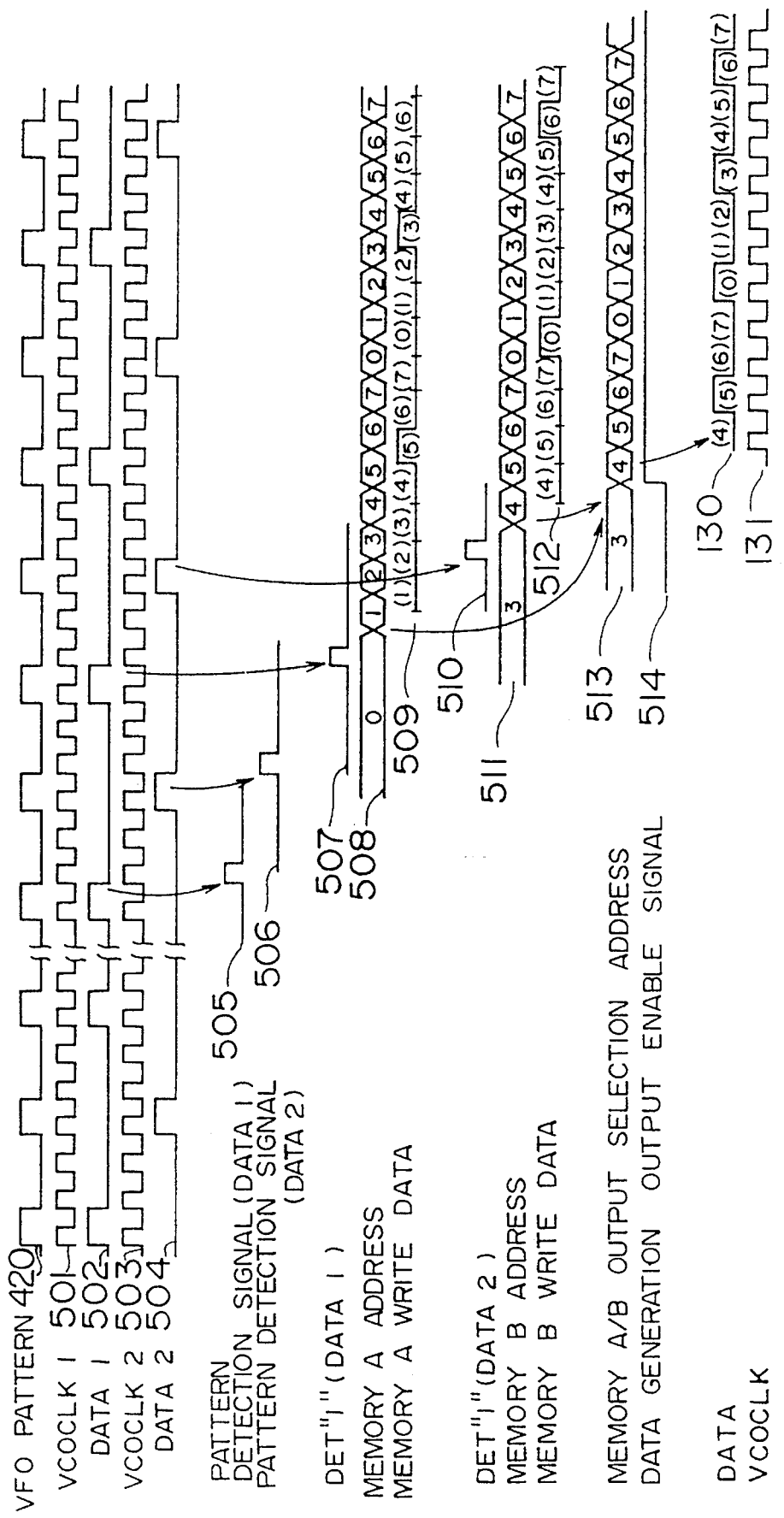
FIG. 12 is a time chart of the regenerative synthesis circuit.

Next, an example of the construction of the regenerative synthesis circuit 222 and the operation thereof will be explained by use of FIGS. 11 and 12. The synthesis circuit 222 includes pattern detection circuits 602 and 603, address control circuits 604 and 605 for control of write addresses of the memory A 606 and the memory B 607, a memory output control circuit 608, and a data generation control circuit 609. FIG. 12 is a time chart showing the operation of the circuit shown in FIG. 11. The following explanation will be made using FIGS. 11 and 12 together. As has been explained in conjunction with FIG. 9, the front edge data pulses 121 are inputted to the VFO1 circuit 600 to obtain VCO clocks (VCOCKL1) 501 and data (DATA1) 502 synchronized therewith. The VFO1 circuit may take a conventionally known construction. Similarly, VCO clocks (VCOCKL2) 503 and data (DATA2) 504 are obtained by the VFO2 circuit 601 from the rear edge data pulses 119. In FIG. 12, the data is shown such that it becomes valid at the rise of the corresponding clock. The data and the clocks are inputted to the pattern detection circuits 602 and 603 which in turn generate pattern detection signals 505 and 506 corresponding to the front and rear edges, respectively. Each of the pattern detection circuits 602 and 603 can be constructed by a shift register and a gate circuit for decision of coincidence between patterns. The construction itself may be similar to the conventional system used for detection of a demodulation synchronizing pattern, for example, a system represented by the 5-¼" ISO format. The pattern detection circuits 602 and 603 further generate, as detection pulses 507 and 510, data "1" immediately following the outputting of the pattern detection signals 505 and 506. A circuit construction for that purpose can use, for example, a D flip-flop which is set by the detection signal 505 and outputs as the detection pulse 507 the data 502 immediately following the transition of the Q output of the flip-flop to "H" when the data 502 becomes "H". Similarly, the detection pulse 510 can be outputted. The address 508 of the memory A 606 starts to be counted up from at the point of time when the detection pulse 507 is inputted. Similarly, the address 511 of the memory B 607 starts to be counted up immediately after the detection pulse 510 has been inputted. Each of the memory A 606 and the memory B 607 is a serial-input and parallel-output memory. The data 502 is written into the memory A 606 by the clocks 501 in accordance with the write address 508 of the memory A 606. Similarly, the data 504 is written into the memory B 607 by the clocks 503 in accordance with the write address 511 of the memory B 607. The write address 511 of the memory B 607 starts from "3□. This is because a VFO pattern 420 uses a repeating pattern of 1.5 T, that is, a pattern in which one data "1" exists for three clocks. Namely, it is assumed that in the case where "1" of the front edge data is written at an address "0", "1" of the rear edge data should be written at an address "3" in order to provide a normal position. In the time chart of the operation shown in FIG. 12, since the repeating pattern of 1.5 T is used as a reference pattern for regenerative synthesis, the address 508 of the memory A starts from "0" and the address 511 of the memory B starts from "3". For example, if the repeating pattern of 2.0 T is used as the reference pattern, the address 511 of the memory B will start from "4". If the data thus written in the memories A and B is read by a common address signal, there results accurate regenerative synthesis. At the point of time when the memory B address 511 started by the detection pulse 510 has been counted up to "4", the output control circuit 608 generates a data generation enable signal 514 to indicate the completion of regeneration of the succeeding data string. Then, outputs 509 and 512 of the memories A and B are successively read by a common address 513 to obtain DATA 130. The clocks 501 can be used to obtain the clock 131. Alternatively, the clocks 503 may be used or the recording clocks used for pit recording may be used so long as the frequency is the same. The above can be realized by using an FIFO (first-in first-out) memory for each of the memories A and B with input and output sides thereof being controlled by separate clocks. In the circuit construction shown in FIG. 11, an 8-bit length memory is used as each of the memories A and B. However, there is no limitation to the bit length. For example, a memory having a data bit length for one sector may be used in such a manner that the reading from the memory is made after data of the entire sector has been stored in the memory. However, in the case where continuous reading of sectors is made, it is preferable from an aspect of the improvement of throughput that a proper bit length is selected. Preferably, the bit length is several times as long as a repetition interval of specified recording patterns used for resynchronization control.

In the foregoing, the edge recording characteristic, the recording control determined therefrom, and the reproduction control for detection of reproduction data from recorded pits have been mentioned in conjunction with the present embodiment. Next, in order to examine specific formats for MCAV recording, specific examples will be shown as to an edge recording/reproducing characteristic when a Te series ternary metal film (PbTeSe) is used and a recording control and a reproduction control which are to be performed for this recording film. Thereafter, the general signal flow in recording/reproduction will be mentioned.

In order to examine the edge recording/reproducing characteristic, the following conditions are employed:
As systems, (1) detection system: detection system with two-stage differentiation, (2) recording system: correction for pulse width correction by constant time width, (3) reproducing system: independent edge detection system, and (4) modulation system: 2–7 modulation, and, as elements to be controlled, (1) optical system: 0.77 µm (half-value width) spot diameter, 0.83 µm wavelength, (2) recording power variation width: +5%—-12% of a set value (3) recording light pulse waveform: rise/fall is 6 ns, and (4) signal detector: light transmitted through a lens is detected by one light receiving surface.

Figure 13:
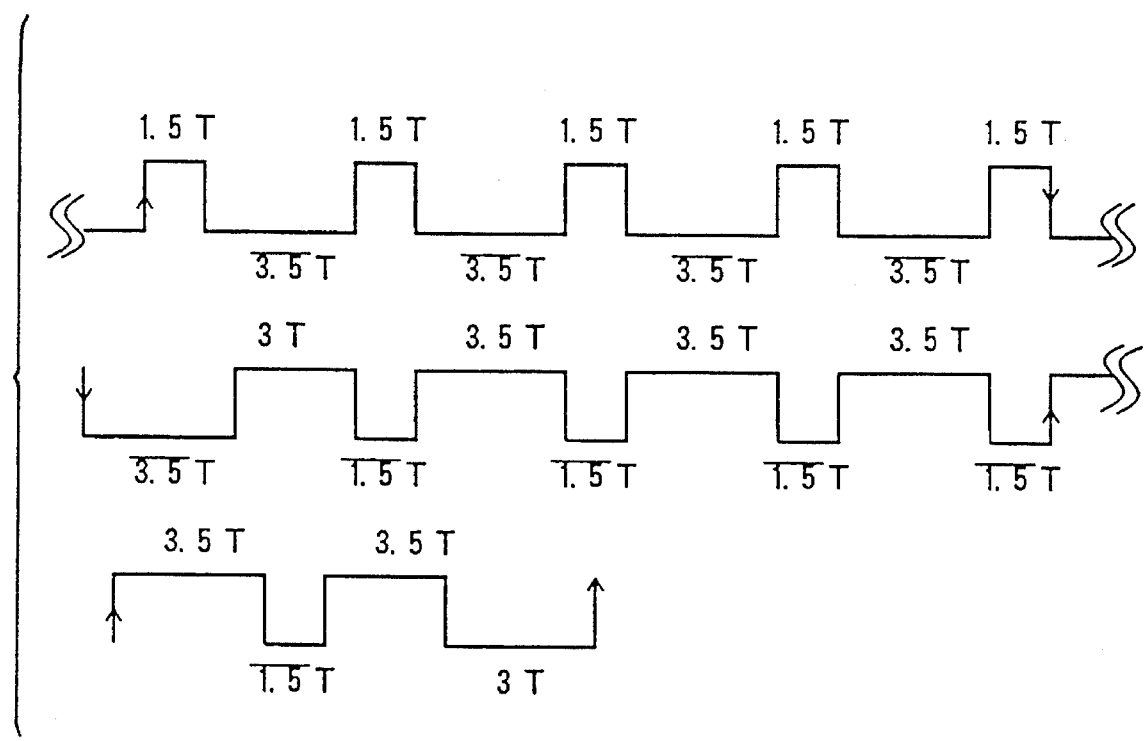
FIG. 13 is a diagram for explaining a recording pattern for evaluation of recording.

Under these conditions, the following measurement is made with the rotating speed and the linear recording density being changed. Namely, phase jitter is measured with the recording power being changed for each amount of correction for the recording pulse width. The jitter is measured for both the front and rear edges independently from each other. A recording pattern used for the measurement is the worst pattern, as shown in FIG. 13, which may occur in the 2–7 modulation. One example of the results of measurement is shown in FIG. 14. Since a set recording power has a variation width of +5%——12%, it is required to find out a setting power value at which the phase jitter values for powers at both the extremes of variation width become equal to each other.

One setting power value and the worst value of phase jitter are determined for each amount of correction for the recording pulse width.

Figure 15A:
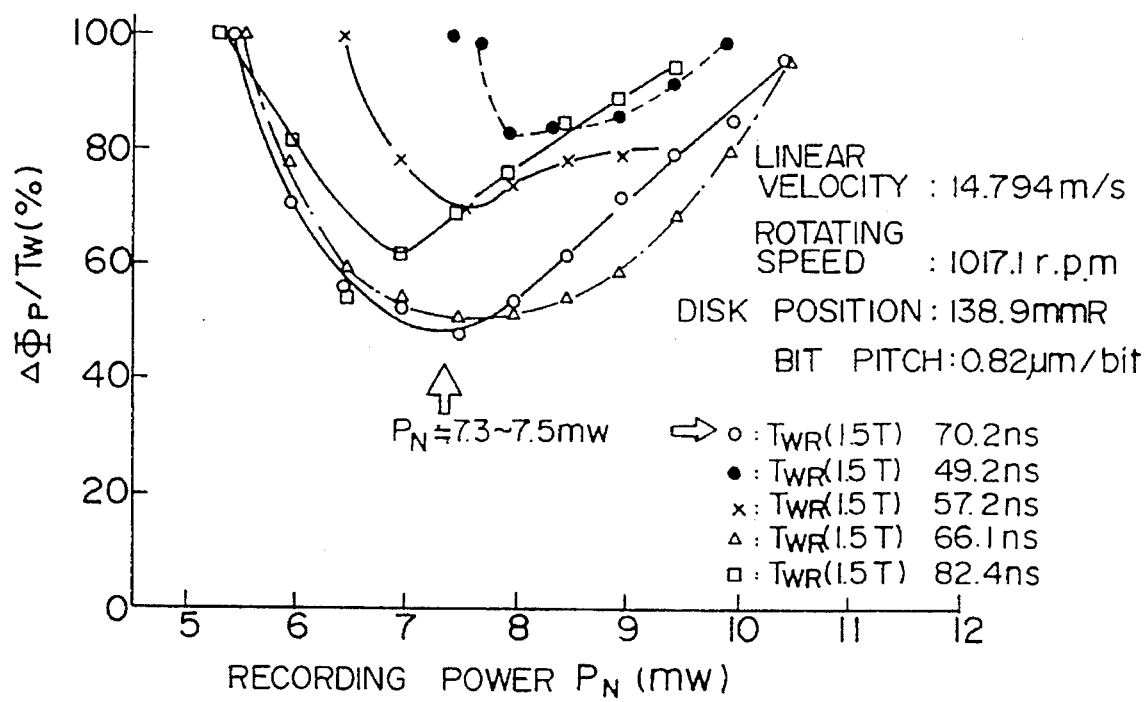
FIGS. 15A and 15B are diagrams showing a relationship between the recording pulse width and the phase jitter.
Figure 15B:
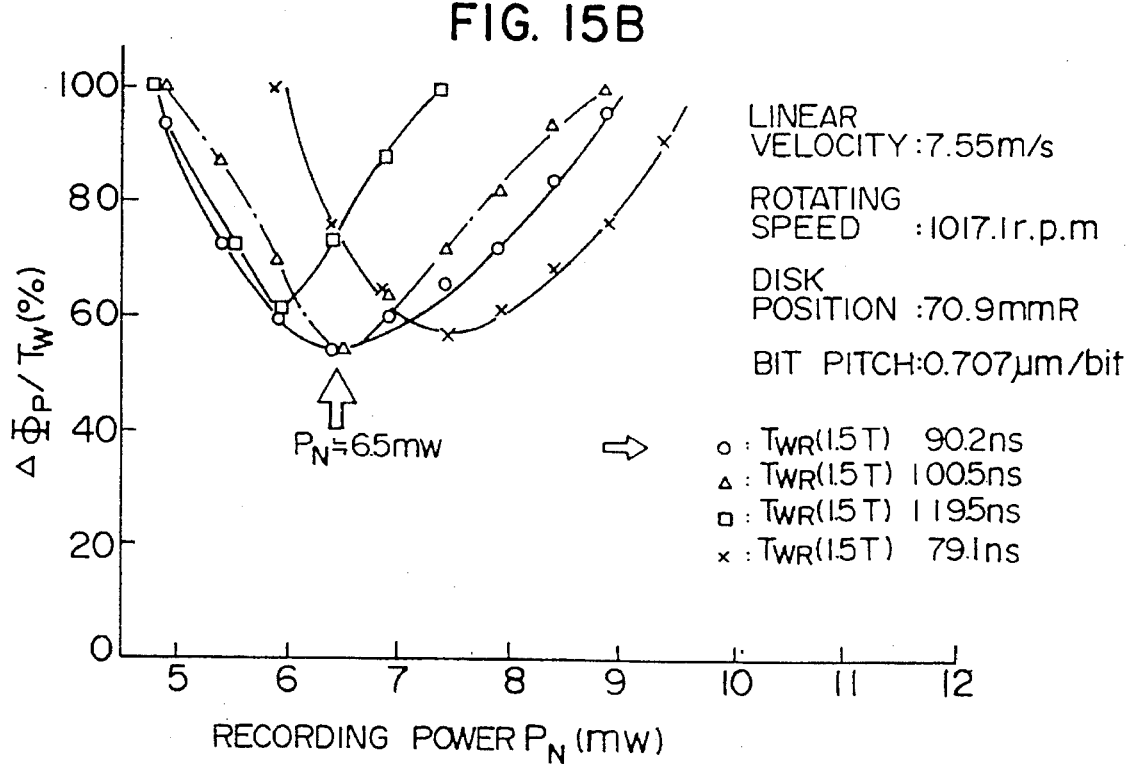

Next, FIGS. 15A and 15B are obtained by determining the worst values of phase jitter for different amounts of correction for the recording pulse width. From FIGS. 15A and 15B is determined the amount of correction for the recording pulse width at which the worst value becomes the minimum.

Figure 16:
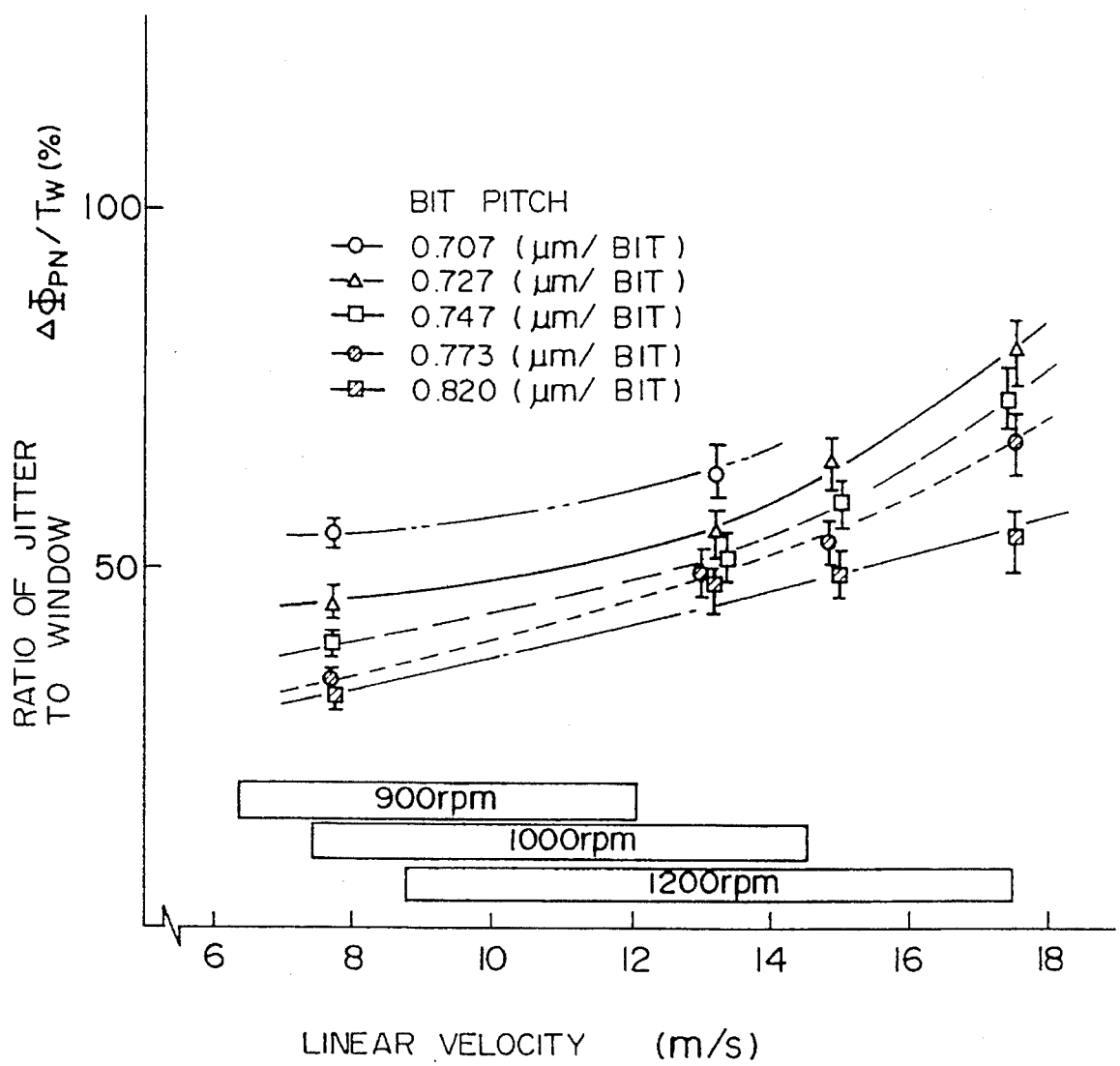
FIG. 16 is a diagram showing a relationship between the linear density and the phase jitter.

From the above, a setting recording power, a recording pulse width (or the amount of correction therefor) and the worst phase jitter are determined for one rotating speed and one linear density. By conducting the similar measurement with the rotating speed and the linear density being changed, there is obtained the linear velocity dependency of phase jitter, as shown in FIG. 16, in which the linear density is taken as a parameter. The jitter shown in FIG. 16 is the ratio of jitter to a detection window width determined from the linear density.

From the characteristic it is seen that the jitter begins to abruptly increase as the linear velocity is increased. The reason for this can be considered to be that when the linear velocity is large, the amount of irradiation energy sinking into the substrate becomes large and hence the gradient of the distribution of temperatures on the recording film becomes small, thereby increasing the fluctuations of recording edges caused by the variation in sensitivity of the recording film and the variation of a laser power.

Looking at such a characteristic, it is preferable that the magnitude of phase jitter is the same over the disk from the inner circumference to the outer circumference thereof in order to record and reproduce data with a high reliability while increasing the capacity in a recording system such as MCAV in which a radial recording position is changed with a rotating speed being kept constant and recording is made while changing the linear velocity. This can be attained by controlling the linear recording density for each changed linear velocity in conformity with the recording characteristic, as is apparent from FIG. 16. Preferably, the linear recording density is controlled such that it becomes constant irrespective of the linear velocity or it is decreased with the increase in linear velocity since the other jitters increase as the linear velocity is increased. If this is done, there is no possibility that the capacity is determined with a restriction by the recording characteristic at a specified radial position and no possibility that the detection characteristic becomes especially severe at a specified radial position.

Figure 17:
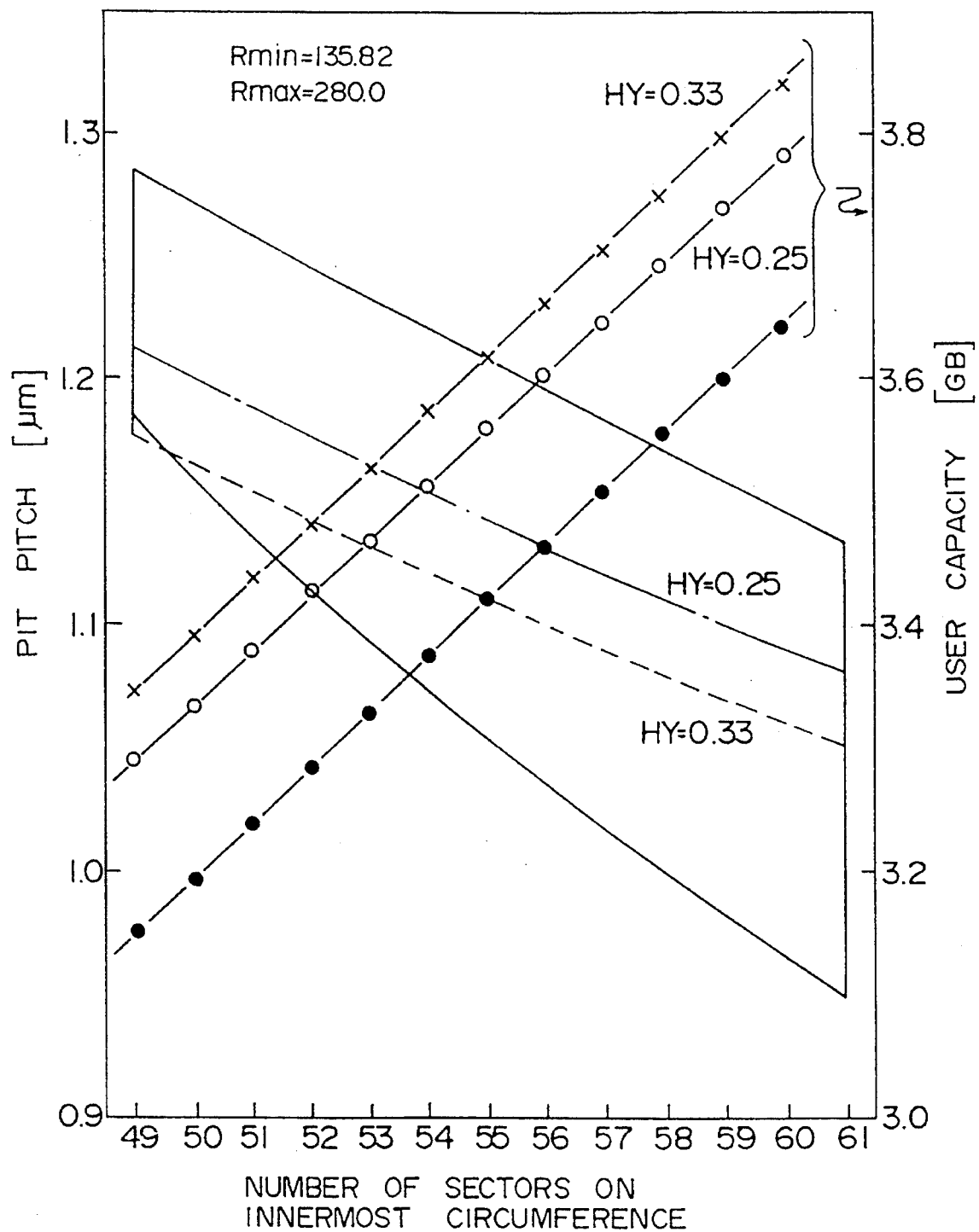
FIG. 17 is a diagram showing the construction of a format according to an embodiment of the present invention.
Figure 18:
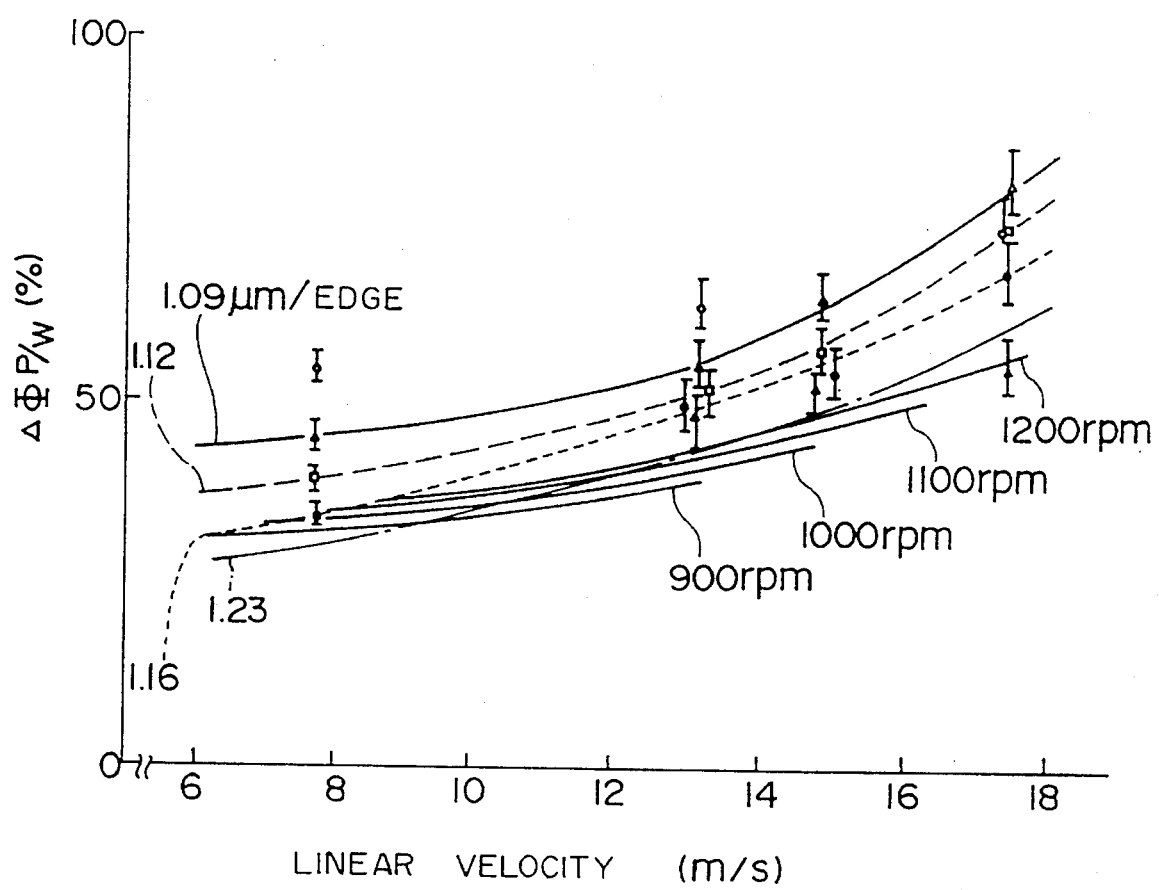
FIG. 18 is a diagram showing a format of 3.2 GB per one surface.
Figure 19:
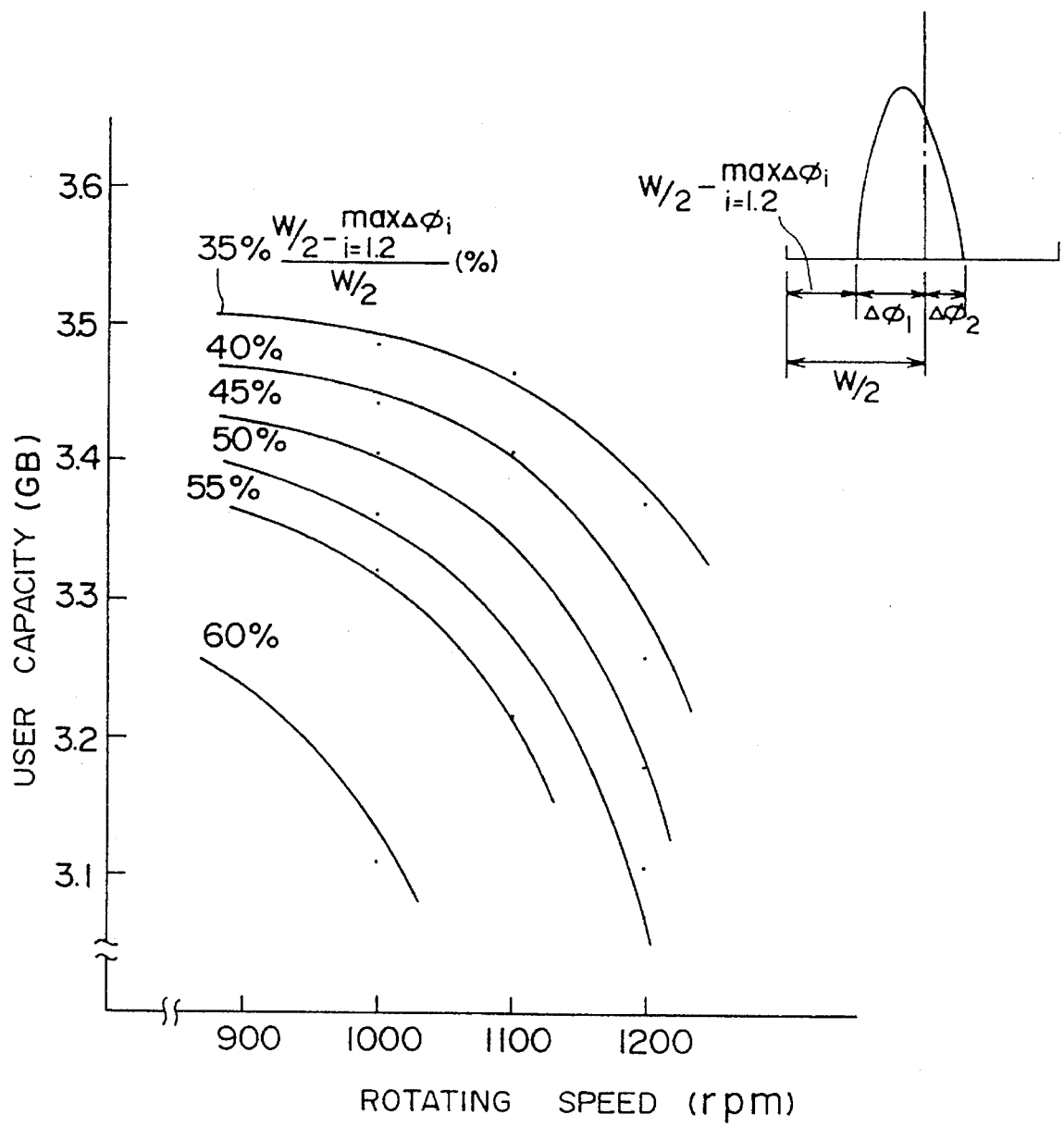
FIG. 19 is a diagram showing a relationship between the rotating speed and the storage capacity.

As such a recording format can be considered a format in which the number of sectors is determined from the recording radius $R_{min}$ of the innermost circumference, the linear density and the sector capacity and is increased by one at every MCAV zone. In this format, when the track pitch, the format efficiency and the sector capacity are selected to be, for example, 1.6 μm, 72% and 1024 B, respectively, there is obtained a relationship between the number of sectors on the innermost circumference and the storage capacity and a relationship between the former and the recording pit pitches on the inner and outer circumferences of the disk at that time as shown in FIG. 17. In this format, it is possible to make the pit pitch on the innermost circumference of the disk smaller than that on the outermost circumference thereof. The jitter, when this format to provide the storage capacity of 3.2 GB is used with different rotating speeds in a range from 900 to 1200 rpm, is determined as FIG. 18 from FIGS. 16 and 17. The worst phase jitter at a radial position can be determined from FIG. 18. By determining the worst jitter at each rotating speed with the capacity being changed, there is a relationship as shown in FIG. 19. In this figure, the proportion of the residue of the whole detection window width from which the worst jitter is subtracted is taken as a parameter. The storage capacity depends on the value of the proportion of the residue. This value is determined, from an aspect of device design, by the jitter caused by the variation of the other element to be controlled and is usually about 30% to 60%. Accordingly, the rotating speed of at least 900 rpm and the storage capacity of at least 3 GB can be realized from the result shown in FIG. 19. From the lowest rotating speed of 900 rpm and the linear density of 1.3 μm on the innermost circumference at the smallest capacity, the minimum value of the transfer rate is determined as being at least 1 MB/s.

Figure 20:
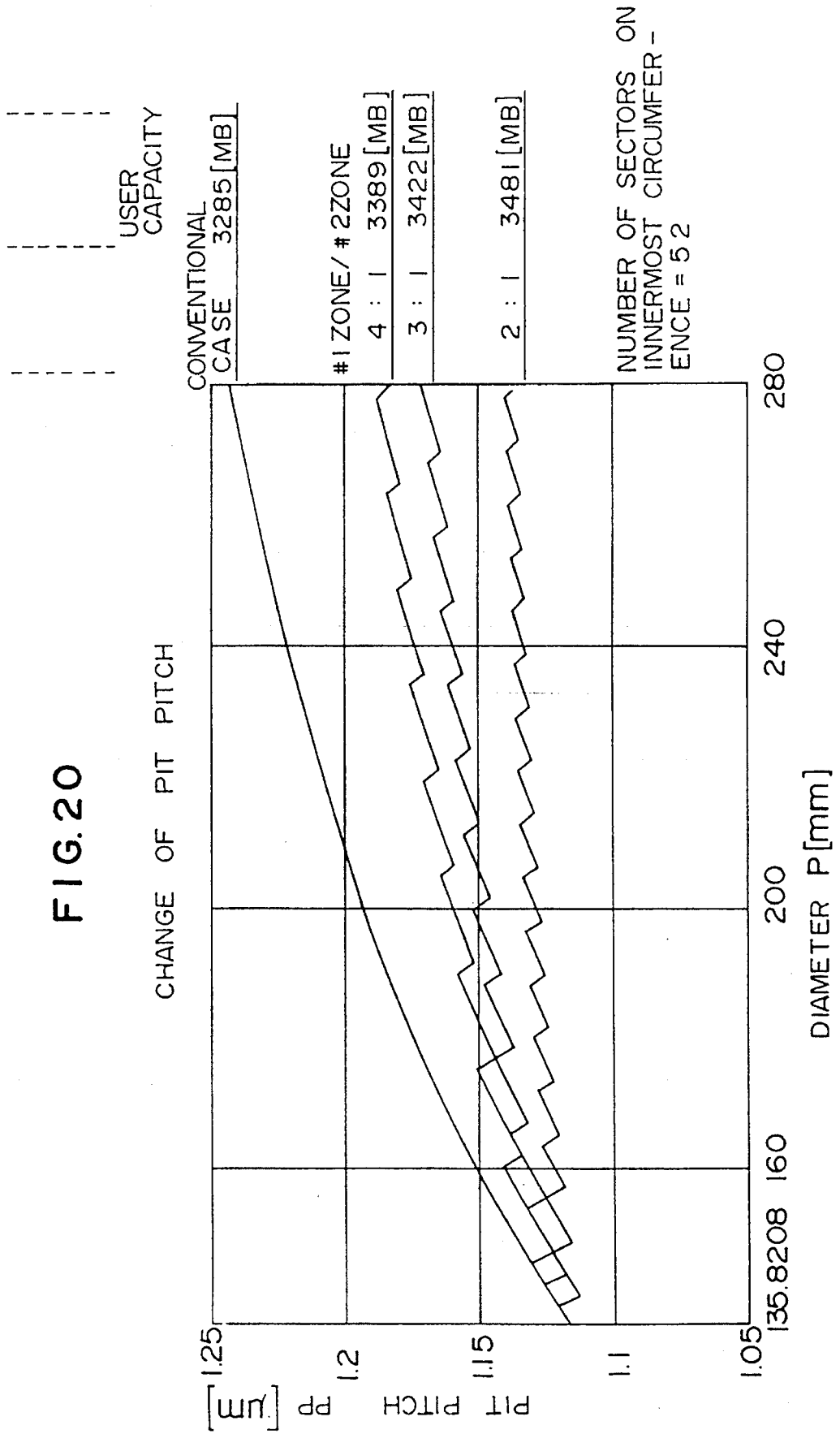
FIG. 20 is a diagram for explaining a method of controlling the linear density in accordance with a radial recording position.

The above format is one for the case where the number of tracks in a zone is 1024. In this case, if the linear density on the inner circumference of the disk is determined, the linear density on the outer circumference thereof is limited at a certain degree from a relation with the capacity. In order to select the linear densities on the inner and outer circumferences freely at a certain degree, plural kinds of zones having different numbers of tracks can be provided in such a manner that they are combined to control the linear density at any radial position to a desired value, as will shown just below. Namely, when the number of sectors is increased one by one at every zone with the progression from the inner circumference toward the outer circumference, the linear recording density can be changed at a monotonically increasing or decreasing rate, from a relation in magnitude between N×n×p and $R_{min}$ where $R_{min}$ is the radius of the innermost circumference, N is the number of tracks in a zone, p is the track pitch and n is the number of sectors on the innermost circumference. For example, consider the case where two kinds of zones #1 and #2, which include 1024 tracks and 512 tracks and in which the rates of change of the linear density are positive and negative, are used so that they are successively arranged with the ratio of the zones #1 to the zones #2 being selected to be 4:1, 3:1 and 2:1. In this case, even if the linear density on the radius of the innermost circumference of the disk is determined, the linear density at each radial position can be controlled, as shown in FIG. 20, in contrast with the case where the area is constructed by only the zones #1.

Figure 22:
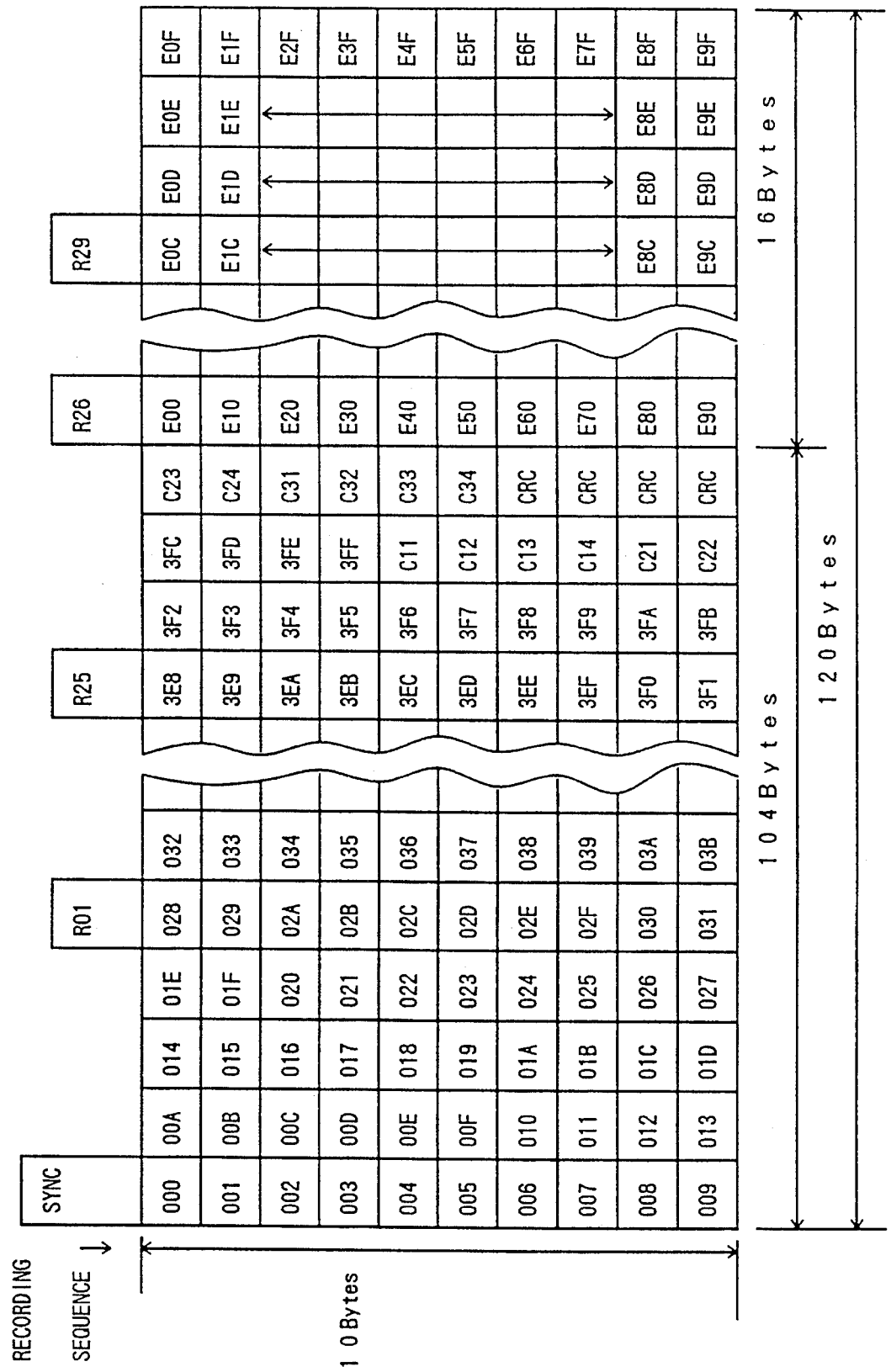
FIG. 22 is a diagram for explaining the construction of a data area.

In the above, the format concerning the arrangement of tracks has been mentioned. Next, a format in the sector will be mentioned on the basis of FIG. 21. The sector format includes a beforehand prepared preformatted area 300 of 53 bytes, a flag area 301 of 14 bytes and a data area 302 of 1309 bytes. The preformatted area 300 includes double recorded address information 303 representative of the position of a sector, synchronizing signals 304 for the VFO's which produce clocks necessary for reading the address information, and synchronizing marks 305 indicative of the beginning of the address information. The address information 303 is composed of tracks numbers TRH and TRL, a sector number SEC, a number ID# indicative of either one of the double address information, and error check codes CRC used when error check is made in detecting these signals. Since the 2–7 modulation is used as the modulation system, the preformatted area 300 further includes a field 306 for absorbing excess bits which may be produced after modulation. The flag area 301 includes a field TOF made flat with no guide groove for correcting a light spot tracking error detection signal, buffer fields GAP having no information, and a field 307 representative of a recording state of the sector under consideration. The data area 302 includes a signal 308 for activating the VFO which produces clocks for reproducing data, a synchronizing signal 309 for synchronizing the phase of the clocks, a data field 310 concerning user information, and a buffer field 311 between the sector under consideration and the next sector. The data field 310 concerning user information contains user data, control information DMP for recording data, error correction codes CRC added for reading these signals with a high reliability, error check codes ECC, and a plurality of repeating patterns Resymi RESYNC of recording data used for resynchronization in the regenerative synthesis mentioned above. The user data and the error correction code are constructed in accordance with a construction method for LDC's (long distance codes) which have been determined for standardization of optical disks. The total 1040 bytes of the user data, the control information DMP and the error check codes CRC is divided into 10 blocks, as shown in FIG. 22. A Reed-Solomon error correction code of 16 bytes is added to each block. Recording on the disk is made sequentially in a direction of the arrow shown in FIG. 22. The above-mentioned resynchronization data pattern RESYNC is inserted at every 40 bytes of recording data.

In the above-mentioned recording characteristic, the laser wavelength of 830 nm is used. If a laser of 780 nm is used, the resolution can be improved by the laser wavelength ratio. Correspondingly, the track pitch can be improved from 1.6 to 1.5 μm and the linear density can be improved by the wavelength ratio. In the jitter characteristic at 830 nm, 60% can be taken for the remaining jitter and the capacity, at which the remaining jitter becomes substantially equal over the whole of radial positions is 3.2 GB. Considering the improvement of resolution at 780 nm, a track format as shown in FIG. 23 is obtained. The storage capacity is 3.5 GB, and the transfer rate is 1.17 MB/s at the inner circumference and 2.22 MB/s at the outer circumference.

Figure 24:
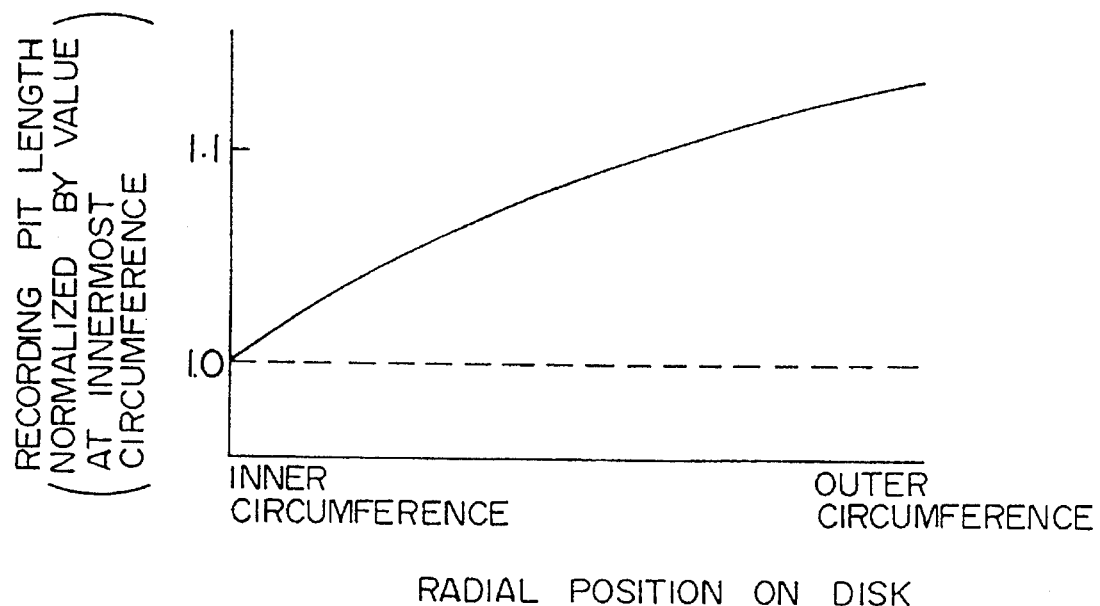
FIG. 24 is a diagram showing a relationship between the radial position and the recording bit length.

FIG. 24 shows the relation of the recording pit length with a radial position on the disk which pit length is normalized by a value on the innermost circumference. Originally, in the MCAV system, the bit length is made constant over all circumferences of the disk. However, in thermal recording, a recording medium may have a characteristic that the jitter relative to the detection window width increases with an increase in linear velocity. The reason for this can be considered to be that when the linear velocity is large, the amount of irradiation energy sinking into a substrate becomes large and hence the gradient of the distribution of temperatures on a recording film becomes small, thereby increasing the fluctuations of recording pit edge positions caused by the variation in recording sensitivity of the recording film, the variation in power of a laser, and so on. Therefore, as compared with the case where the bit length is made constant over the disk from the inner circumference to the outer circumference, as shown by the dashed line in FIG. 24, it is preferable that the bit length is gradually increased with the progression from the inner circumference to the outer circumference so that the phase jitter becomes constant. For example, in the case of the used recording medium (PbTeSe), when the bit length is selected to be 0.758 μm at the innermost circumference and 0.815 μm at the outermost circumference, the jitters relative to the detection window width at the inner and outer circumferences become substantially equal to each other. With such a construction, there is no possibility that the capacity is determined with a restriction by the recording characteristic at a specified radial position and no possibility that the detection characteristic becomes especially severe at a specified radial position. As one example of the zoning method in MCAV, there is a dividing method in which the number of sectors per one track is increased one by one with the progression from the innermost zone and the number of tracks in each zone is selected to be the n-th power of 2 (for example, 1024). The bit length values exemplified above are set using this dividing method.

Figure 25:
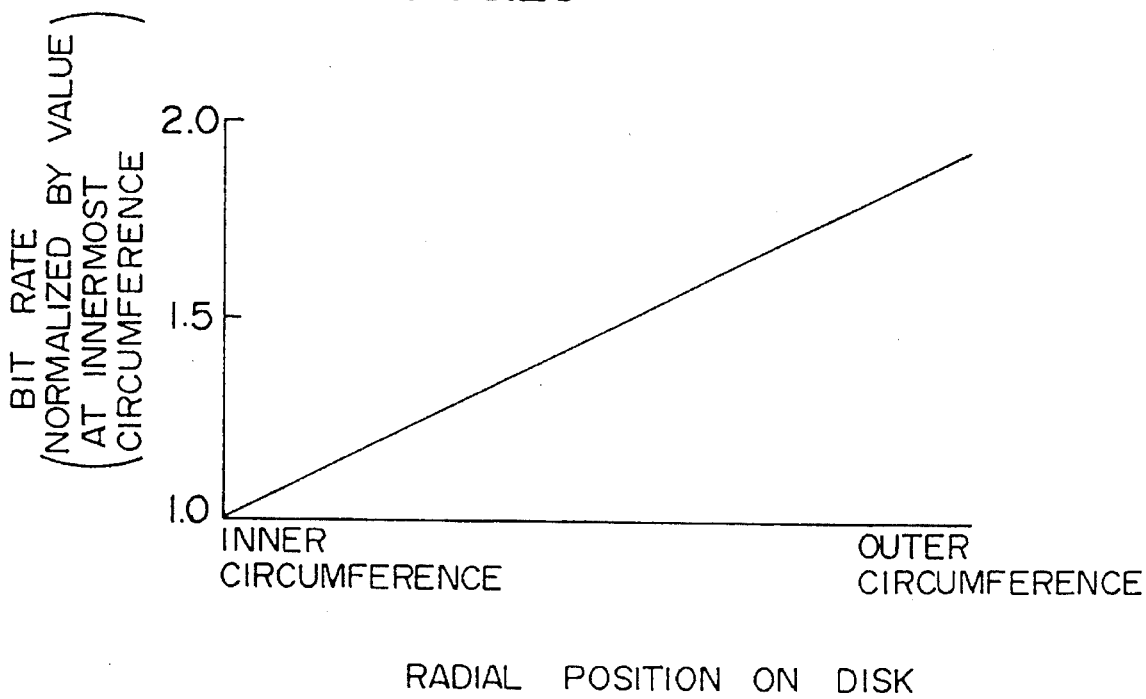
FIG. 25 is a diagram showing a relationship between the radial position and the bit rate.

FIG. 25 shows the bit rate for a radial position on the disk which bit rate is normalized by a value on the innermost circumference. In the case where the radius of the outermost circumference of the disk is twice as large as that of the innermost circumference thereof, the bit rate at the outermost circumference becomes twice as high as that at the innermost circumference. FIG. 25 corresponds to the case where the bit length is one shown in FIG. 23. In the case where the above-mentioned MCAV system is used in the used recording medium (PbTeSe), the bit rate at the rotating speed of 1000 rpm becomes 9.35 Mbit/s at the innermost circumference and 17.80 Mbit/s at the outermost circumference, and the ratio of the latter to the former is 1.90.

Figure 26:
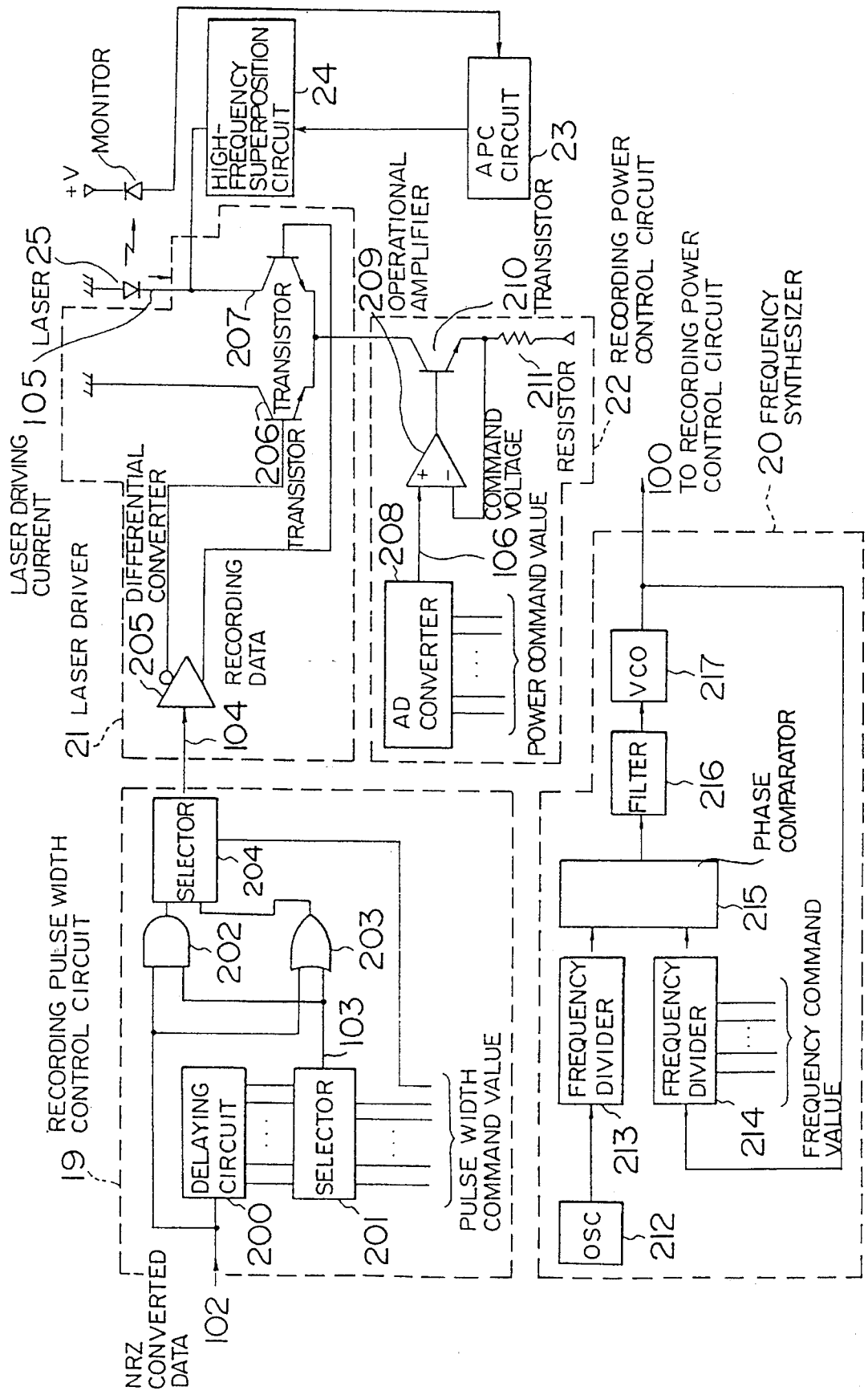
FIG. 26 is a block diagram of a recording system.
Figure 27:
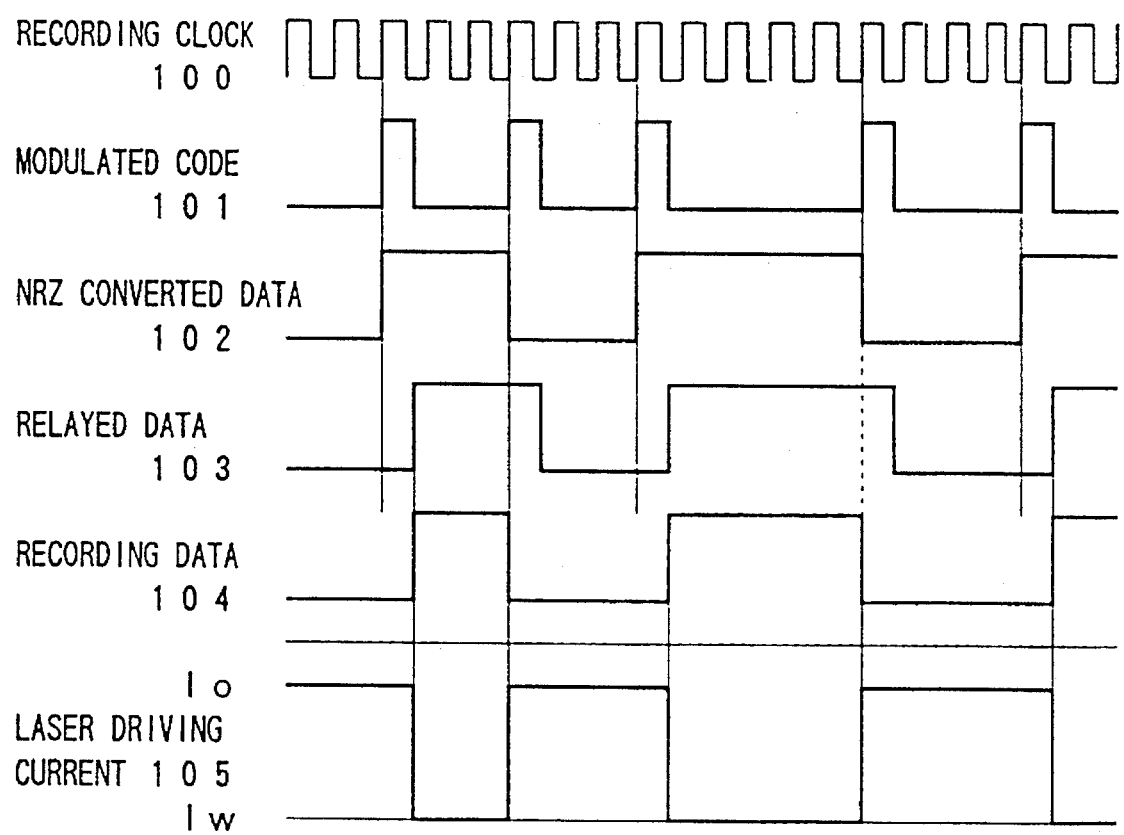
FIG. 27 is a time chart of the recording system.

In the following, an embodiment of a recording system will be shown and explained. FIG. 26 is a block diagram of the recording system and FIG. 27 is a time chart of the operation of the recording system. In a modulation circuit 17, a modulated code 101 is generated by use of recording clocks 100 from a frequency synthesizer 20 corresponding to each zone and an NRZ converted data 102 is outputted by inverting a logical level each time "1" of the modulated code 101 appears. The data 102 is inputted to a recording pulse width control circuit 19. One of delayed outputs of a delaying circuit 200 is selected by a selector 201 to produce delayed data 103. In the case where recording data 104 is to be corrected so that it becomes shorter than the original NRZ converted data 102, a pulse signal obtained by producing a logical product of the delayed data 103 and the NRZ converted data 102 by an AND circuit 202 is selected as recording data 104 by a selector 204. On the other hand, in the case where recording data 104 is to be corrected so that it becomes longer than the original NRZ converted data 102, a pulse signal obtained by producing a logical sum of the delayed data 103 and the NRZ converted data 102 by an OR circuit 203 is selected as recording data 104 by the selector 204. The recording data 104 is converted by a differential converter 205 into pulses of P/N polarities and is then inputted to a current switch circuit composed of transistors 206 and 207. In the shown circuit, when the recording data 104 is "H", the transistor 207 is turned on so that a recording current $(I_W-I_R)$ is applied to a laser 25. Upon reproduction, a reproducing current $I_R$ is applied to the laser 25 through a high-frequency superposition circuit 24 by an APC circuit 23. Upon recording, the superposition of a recording current and the reproducing current IR becomes a laser driving current 105. The recording current is controlled by a recording power control circuit 22. Corresponding to a power command value inputted to an AD (analog/digital) converter 208, a command voltage 106 is applied to an operational amplifier 209 so that a current value based on the division of a voltage across a resistor 211 by its resistance value is generated by a current source including the resistor 211 and a transistor 210.

An example of the construction of the frequency synthesizer 20 will be explained. An OSC (oscillator) 212 generally includes as a reference clock an element such as a crystal oscillator in which an oscillation frequency is stable. A phase comparator 215 compares the phases of two clock signals inputted from frequency dividers 213 and 214. If there is a difference in phase between the clock signals, the phase comparator 215 applies the difference as an error signal to a filter 216 and then to a VCO 217 to change the oscillation frequency, thereby generating the recording clocks 100 for each zone. The frequency of the recording clocks can be changed by setting the division ratio of the frequency divider 214 as a frequency command value at every zone. The recording clocks 100 are applied to places inclusive of the modulation circuit 17 where the clock frequency should be changed corresponding to each zone.

Now, explanation will be made of track and sector formats of the disk used in the present embodiment.

Figure 28:
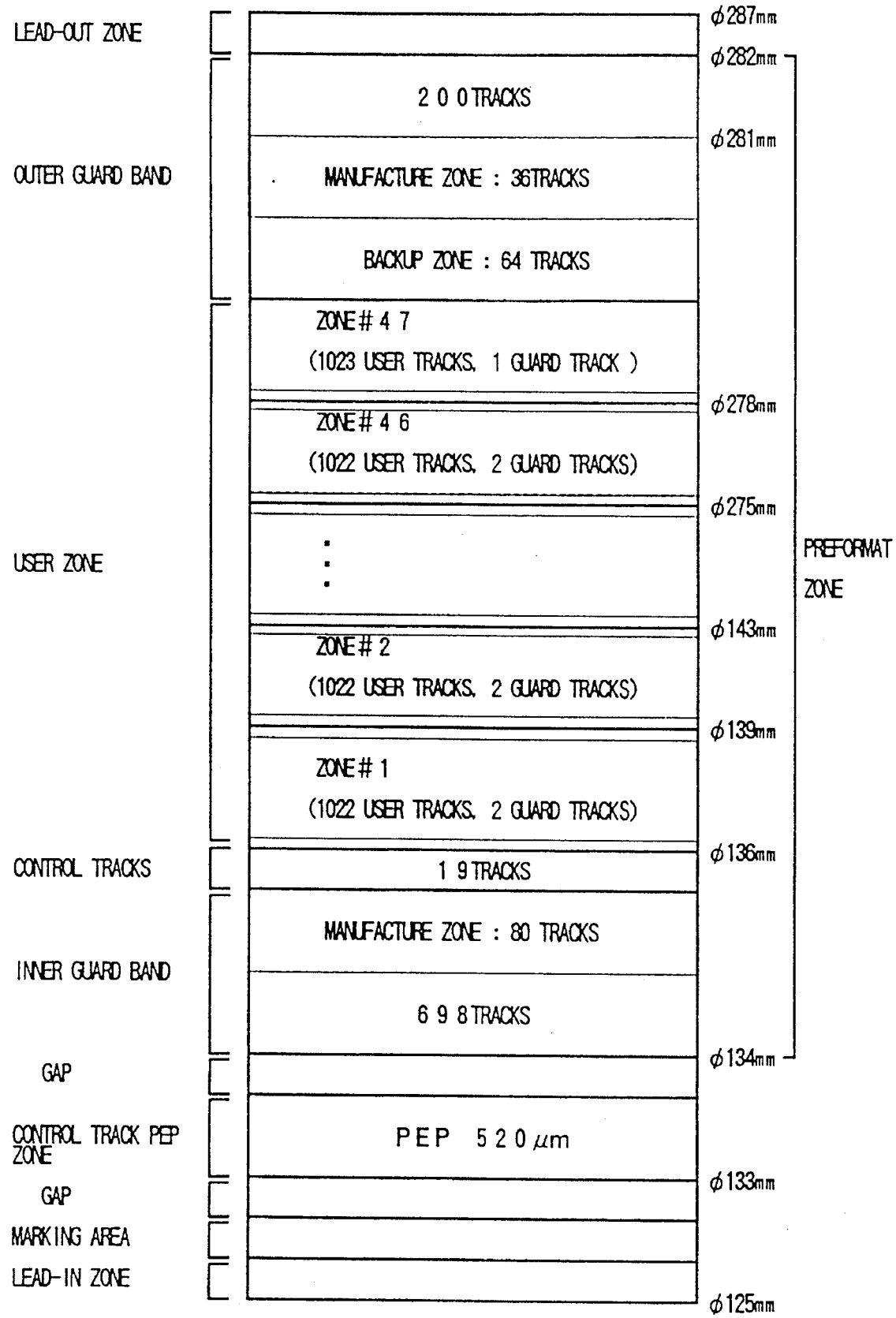
FIG. 28 is a diagram showing the construction of a track format which illustrates the division into MCAV zones in the present invention.

FIG. 28 is a diagram showing the construction of a track format which is an embodiment of the present invention. FIG. 28 shows an example of a track format over a disk from the innermost circumference to the outermost circumference for using the MCAV system. Track guide grooves of the disk are arranged at a constant pitch of 1.5 μm and each thereof has a reversed triangle shape. When the disk is fabricated, preformat pits are beforehand formed in a flat inter-groove area sandwiched between the guide grooves. Similarly, data pits are also in the inter-groove area. Since it is hard to influence, the inter-groove area by the disk fabrication process, the disk surface has less microscopic unevenness and the disk noise is small. Therefore, the reliability in signal read-out can be improved. The area of the disk covers a range from the inner diameter of 125 mm to the outer diameter of 287 mm and is roughly divided into a region used by a user, a region used by a maker upon delivery of the device, and inner and outer guard regions for absorbing the variation in mechanical precision of a driving device. The diameter of the disk is about 300 mm. The outermost circumferential region of 13 mm width is a region for assembling the disk into a sandwiched lamination structure. Further, the width of about 5 mm is estimated for the variation of a recording characteristic such as the composition of a recording film in the disk fabrication process and this width region is prepared as a lead-out zone on the outer circumference side. Accordingly, the tracking guide grooves are provided in an area inside the circumference of about 282 mm diameter.

Similarly, also on the inner circumference side, the tracking guide grooves are provided in an area outside the circumference of about 134 mm diameter, taking the precision of positioning of an optical head relative to the inner circumference and the eccentricity of the disk into consideration. Inside this area, a PEP (phase encoding pattern) readable by only a focus servo is provided over an about 520 μm width region in order to identify the format construction, the recording characteristic and the kind of the disk. This PEP region width value is set on the basis of the eccentricity of the disk (about 120 μm at the largest) and the mechanical precision of positioning of the optical head (including the precision of the attachment position of a limit sensor on the inner circumference side). A marking area inside the PEP area is a region for beforehand printing marks, for example, the name of a disk maker or manufacturer and a manufacturer's serial number.

In the following, explanation will be made of the diameter range from about 134 mm to 282 mm where the track guide grooves are provided. A guard band of about 2 mm width is provided on each of the inner and outer circumference sides. Six hundred and ninety eight (698) tracks (over about 1 mm width) in the inner guard band and on the inner circumference side are used for absorbing the variation of the mechanical precision of positioning. But they may be used for another purpose, for example, the extension of a manufacture zone, within a range which is allowed by the precision of positioning. The manufacture zone is a region to be used mainly for the confirmation of a recording characteristic of the disk upon delivery of the disk and is allotted 80 tracks in the present embodiment. Nineteen (19) control tracks are provided outside the inner guard band. When the disk is used, information concerning the kind of the disk and information for format management are recorded on the control tracks by a host controller.

Figure 3:
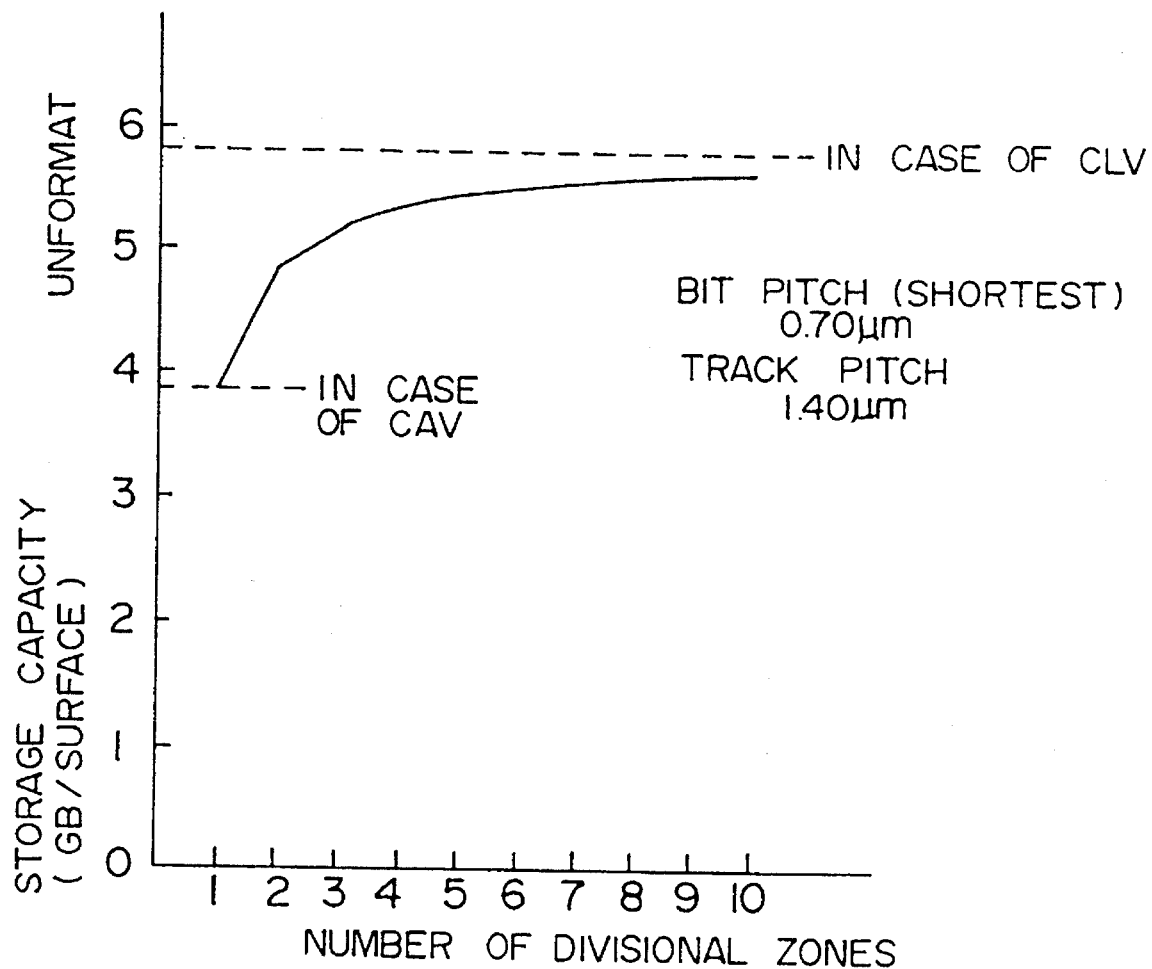
FIG. 3 is a diagram showing a relationship between the number of zones and the storage capacity in an MCAV recording system.

The guard band on the outer circumference side, that is, the outer guard band, includes 300 tracks. In the example shown in FIG. 8, the outer guard band is provided as the extension of a #47 zone which is the outermost zone of a total of 48 zones each including 1024 tracks. Accordingly, the number of sectors per one track in the outer guard band is the same as that in the zone #47. The number of sectors per one track is determined from the bit pitch at the innermost circumference, a condition under which stable formation of pits and stable edge position detection from the pits are possible in the modulation system used, and so on. For example, in the case where the bit pitch in the innermost zone is about 0.76 μm, the above condition can be realized by selecting the number of sectors per one track to be 51. In this case, the number of sectors per one track in the #47 zone is 97. The bit length as shown in FIG. 3 can be established by thus increasing the number of sectors with the progression toward the outer circumference. Sixty four (64) tracks in the outer guard band on the inner circumference side are used as alternate tracks (or a backup zone) and 36 tracks outside the alternate tracks are allotted as a manufacture zone. The backup zone is used in the case where alternate sectors in each user track are filled up or a history of alternating processes is managed. The number of tracks in the backup zone is determined by the alternation management system, defects of the disk, and so on.

A diameter area from about 136 mm to about 278 mm is used as a user zone. The user zone includes 47 zones in total and each zone is composed of 1024 tracks. The number of tracks in each zone is determined from an aspect of a host software processing and the jitter characteristic of data and may be other than the n-th power of 2. In the zone #1, the number of sectors in one track is 51. The number of sectors per one track is increased by one each time the zone number is increased by one. Accordingly, the number of sectors per one track in the zone #47 is 97, as mentioned above. Adjacent tracks at the boundary of zones have different numbers of sectors per one track. Therefore, each of those tracks is not opened to the user for consideration of sector management, etc., and is handled as a track from which only a track number and sector numbers (ID) are read. Accordingly, in the zones #1 to #46, two tracks in each zone on opposite sides thereof serve as guard tracks. In the zone #47, one track serves as a guard track. The number of alternate sectors in each zone may be the same over all of the zones. However, when the length occupied by one sector relative to one circumferential length is taken into consideration, for example, two sectors per one track in the zones #1 to #14 and three sectors per one track in the zones #15 to #47 can be allotted as alternate tracks. As for the track format in the present embodiment, an example of the format construction and the sequence of a data read/write operation are disclosed in JP-A-01-245836.

Figures 29, 30:
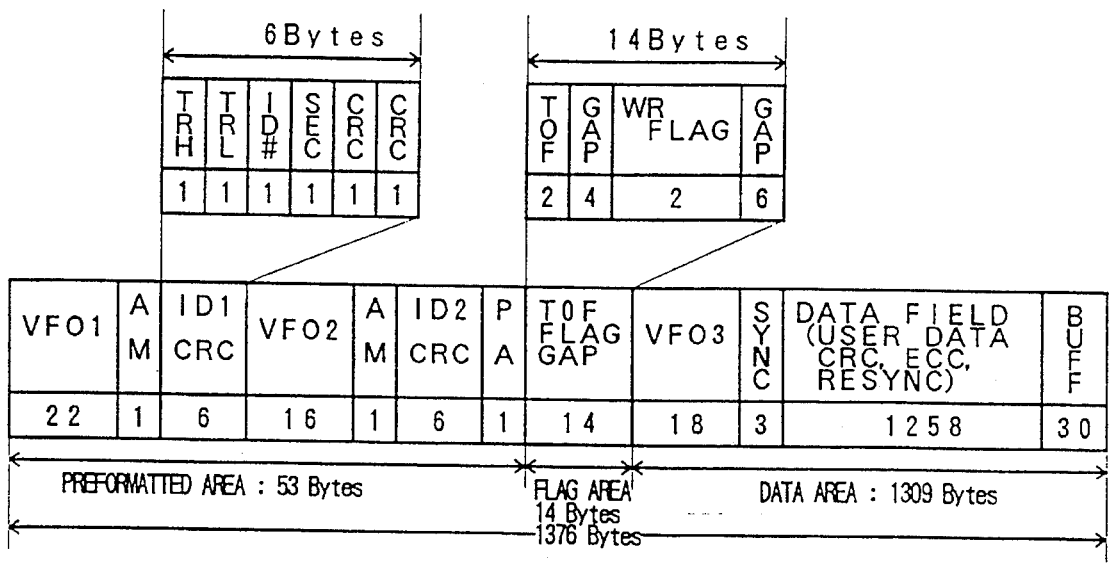
FIG. 29 is a diagram showing the construction of each sector format.
FIG. 30 shows the construction of a pattern in each field of a preformatted area shown in FIG. 29.

Next, the format construction of each sector in FIG. 28 will be explained. FIG. 29 shows the construction of a sector format. One sector is composed of 1376 bytes. A modulation system used in a pre-pit area (or preformatted area) and a data area is 2–7 RLL (run length limit) modulation. Pits are formed by mark length recording based on the NRZ (non-return to zero) conversion of a modulated code. A detection pulse position corresponding to the edge position of a pit corresponds to a code word "1".

The preformatted area is composed of 53 bytes. The preformatted area includes four functional elements, that is, (1) a VFO pull-in pattern field for a pull-in operation upon generation of reproducing clocks and for use as a reference pattern when front edge detection pulses and rear edge detection pulses are processed by independent reproducing clock generation systems and are then synthesized as a string of consecutive data, (2) an AM (address mark) field for generating the start timing for demodulation of data, (3) an ID (identify) field in which a track number and a sector number are recorded, and (4) a PA (post amble) field for the termination of an RLL code and for return to the unrecorded state by completing the preformatted area with the rear edge of a pit.

In the present embodiment, the ID is double written. This is done in order to assure the recognition rate since there is a fear that the recognition of the ID may result in complete failure due to defects or the like in the case where only a single written ID is included in each sector. Provided that the error rate of recognition for one ID is $10^{-4}$ and the recognition rates for two ID's are independent of each other, the error rate can be reduced down to $10^{-8}$ when the ID is double written. The ID can also be triple written. In this case, however, the overhead may be increased since in the format of the present embodiment a relatively long VFO pattern in lieu of a special mark, for example, a SM (sector mark), is used for indicating the head of each sector. The double written ID is used in order to avoid the increase in overhead which may occur in the case of a triple written ID since the defect rate of the disk is low.

A main function of VFO1 is the recognition of the head of a sector, PLL (phase locked loop) pull-in, PLL phase synchronization, and the synthesis processing upon reproduction of front and rear pit edges. A VFO1 pattern field is composed of 22 bytes. The allotment of the number of bytes to each function is as follows. In recognizing the head of a sector, a binary digitalization processing is performed after the amplitude of a reproduction signal has been made approximately constant by use of an AGC (automatic gain control) amplifier in order to absorb the variation in reflection coefficient of the disk, the variation in detection resolution of the optical system, and so on. Four bytes at the head of the VBFO1 pattern field are a region for the AGC pull-in and the sector head recognition. Though the length of a region necessary for PLL pull-in is different depending on the band of a PPL circuit used and the characteristics thereof such as a damping factor, a little less than about 6 bytes is required for the completion of pull-in, for example, when the PLL band in a high gain period for pull-in is about 1 MHz. In the present embodiment, 6 bytes are allotted for the PLL pull-in. Also, in the case where ID of the immediately preceding sector cannot be recognized, a PLL pull-in gate is generated by counting reference clocks from the ID position of a sector which further precedes the above-mentioned sector. Therefore, ±5 bytes at the largest are estimated for the deviation of high gain position for PLL pull-in. Further, at least 2 bytes are allotted for a period of time until a steady phase error of PLL becomes small to a certain degree and a period of time which is required for the regenerative synthesis of front and rear edge detection pulses. From the above, the VFO1 pattern field includes 22 bytes in total.

The function of VFO2 is equivalent to that of VFO1. The VFO2 pattern field has a 16-byte length since 4 bytes for sector head recognition and 2 bytes for regenerative synthesis are basically not required.

VFO3 is written at the head of the data area upon recording of user data and has an 18-byte length.

Each VFO pattern uses the repeating pattern of 2 T ("1000" in a code word representation) in the 2–7 modulation. When considering only the PLL pull-in, the closest pattern possible in a modulation system used or the repeating pattern of 1.5 ("100" in a coder word representation) in the 2–7 modulation is preferable in an aspect of the frequency of occurrence of edge detection pulses. However, in the case where the recording characteristic of a recording medium is taken into consideration, there may be a fear that when a recording power is lowered, the shape of a pit formed becomes unstable, and a fear that when the recording power is increased, a gap between pits become small, thereby making stable detection impossible due to the lowering of optical detection resolution. Further, the shift of edge positions may occur due to a difference in extension between pit lengths caused by a difference between pattern lengths. Therefore, not the repeating pattern of 1.5 T but the repeating pattern of 2 T is used. The reason for use of the repeating pattern of 2 T from another aspect lies in that the repeating pattern of 2 T is convenient in mark length recording (or pit edge recording). Namely, one byte is accomplished by two pits and two gaps. In the 2–7 modulation, "1000100010001000" corresponds to one byte. Therefore, in the case where the processing in units of one byte is started from the front edge of a pit, the processing is necessarily finished at the rear edge of a pit.

AM is a mark of 1-byte length and is the same as a pattern used in the standardized format for optical disks of 130 mm (5.44 inch) diameter. Namely, there is a pattern which has a 1-byte length but violates the 2–7 modulation rule. This irregularity is realized by inserting eight "0's" between code word bits "1's". In connection therewith, it should be noted that a side followed by eight consecutive "0's" is positioned to correspond to a pit in conjunction with the use of the mark length recording. This is because a short gap including only two "0's" appears immediately after or the insurance of the amplitude of a reproduction signal and the prevention of erroneous recognition due to defects are intended. In the first AM pattern, the side followed by eight consecutive "0's" automatically results in a pit since the VFO1 field is finished at the rear edge of a pit. However, in the second AM pattern, whether or not the side followed by eight consecutive "0's" results in a pit depends on whether the number of bits of ID1 is even or odd. Therefore, a relationship between pits and gaps in the AM pattern is unified by correcting the sixth code word bit "1" in the VFO2 pattern so that it is changed to "0" in the case where the number of "1's" in the immediately preceding ID1 field is odd and it is left as "1" in the case where the number of "1's" is even. An example of a specific processing for such unification of the relationship between pits and gaps is disclosed in JP-A-01-300429.

Each of the ID1 field and the ID2 field has a 16-byte length which is allotted with two bytes for a track number, one byte for an ID#, one byte for a sector number, and two bytes for CRC (cyclic redundancy check) for decision of correction of those data. Since one byte is allotted for the sector number, it is possible to meet a format in which 256 sectors at the most are included in one track. The ID# is a portion for indicating whether the corresponding ID is the first ID or the second ID in the preformatted area. For example, the ID#1 of the ID1 field includes "0" at all bit positions of data before modulation and the ID#2 of the ID2 field includes "1" at only the last bit position of data before modulation.

PA is a portion provided for completing data upon demodulation since the 2–7 modulation is a variable-length RLL code and for terminating the preformatted area by the rear edge of a pit. In the present embodiment, the above purpose is attained by setting the sixth code word bit so that it is left as "0" in the case where the end of the immediately preceding ID2 field is the rear edge of a pit and it is changed to "1" in the case where the end of the ID2 field is the front edge of a pit.

The construction of each pattern in the preformatted area is shown in FIG. 30. Since the function of each pattern field has already been mentioned in detail, only the number of bytes and the pattern of each field are confirmed here. VFO1 is the repeating pattern of 2 T in the 2–7 modulation and is composed of 22 bytes. AM is a pattern of one byte which is irregular with respect to the 2–7 modulation or includes a portion including eight consecutive "0's". ID1 is composed of six bytes in total which include two bytes for a track number, one byte for ID#, one byte for a sector number and two bytes for CRC. VFO2 is primarily the repeating pattern of 2 T having a 16-byte length in total but selectively takes either a pattern of Case 1 or a pattern of Case 2 in accordance with whether the number of "1's" in the immediately preceding ID1 field is even or odd. Namely, the pattern of Case 1 is selected in the case where the last "1" of the immediately preceding ID1 field corresponds to the rear edge of a pit and the pattern of Case 2 is selected in the case where it corresponds to the front edge of a pit. Thereby, the relationship between pits and gaps in the AM pattern immediately succeeding the VFO2 field is made coincident with that in the first AM pattern. ID2 has the same content as the ID# but is different in ID#1 and hence the CRC pattern from ID1. PA is composed of one byte.

Next, explanation will be made of a flag area of 14 bytes succeeding the preformatted area. Two beginning bits of the flag area is a TOF (track offset) field which includes no track guide groove. At the TOF field, the offset of a tracking error signal can be detected with no influence of diffraction since there is no track guide groove. Thereby, it is possible to electrically cancel the offset. GAP (gap) fields are provided before and after a WR FLAG (write flag) field with four bytes and six bytes being allotted to the former and latter GAP fields, respectively, taking a variation in the precision of write position of the write flag into consideration. The allotment of more bits to the later GAP field is made in order to prevent erroneous writing into a VFO3 pattern due to any cause. After the recording of data (or the formation of pits) into the data area has been completed, a flag indicating that the corresponding sector is a write-settled sector, is recorded into the WR FLAG field in order to indicate the write-settled sector upon the succeeding rotation. In a write once read many type of optical disk in which double writing or overwriting is not allowed, the WR FLAG field is important from an aspect of the prevention of data destruction. In an erasable type of optical disk, for example, an opto-magnetic disk or a phase change disk, there may be the case where the WR FLAG becomes needless from an aspect of the possibility of overwriting. With the same concept as that in the VFO pattern, the repeating pattern of 2 T having a 2-byte length is used in the WR FLAG field. Accordingly, four pits exist. The indication of a write-settled sector is written in not only the WR FLAG field but also a certain sector in a directory area. In many cases, therefore, it is only required that the presence of four pits in the flag field is detectable from a reproduction signal waveform.

A VFO3 pattern of 18 bytes exists at the head of the data area. The repeating pattern of 2 T is used as the VFO3 pattern, like the VFO1 and VFO2 patterns. The reason why the number of bytes is 18 has already been mentioned. A SYNC pattern of 3 bytes is provided following the VFO3. In the present example, a pattern equivalent to that defined by the 130 mm diameter ISO standardization is used and code word bits are united at every four or eight bits so that the decision of a SYNC pattern is made by the majority of such units. For example, in the case where the code word bits are united at every eight bits, the SYNC pattern having a data length of 3 bytes is divided into six elements. When at least four elements among the six elements are detected, this pattern is decided as being a SYNC pattern. Such a detection based on the majority decision is made in order to make the detection of a SYNC pattern possible even when edge detection pulses in certain portions are not recognizable due to defects, alien noises upon reproduction, and so on. When there is employed a method in which front and rear edges are detected independently from each other and are thereafter synthesized, there may be the case where the recognition as to whether or not the pattern is a SYNC pattern is possible only after the synthesis. In this case, there may be considered the addition of a pattern such as a later-mentioned RESYNC pattern which can be recognized as a specified pattern even from only a one-sided edge detection pulse train of either front edges or rear edges. For example, the same pattern of 2 bytes as the RESYNC pattern is added immediately preceding the SYNC pattern to provide a new SYNC pattern of 5 bytes in total. In the present embodiment, the SYNC pattern of only 3 bytes is used from the point of view that the defect rate of the disk is sufficiently low. However, the above-mentioned SYNC pattern with RESYNC can be used.

RESYNC is a specified pattern inserted in the data field at certain byte intervals for detecting and correcting bit deviation which is caused during the reading of data. In the present embodiment, a RESYNC pattern of 2-byte length is inserted after every 40 data bytes. Only main features of the RESYNC pattern will be shown thereinafter. A specific pattern construction of each field in the flag area and the data area is shown in FIG. 31.

A first feature of the RESYNC pattern lies in that it is a pattern which is irregular with respect to the 2–7 modulation. Namely, the pattern includes a portion having eight consecutive "0's". Therefore, this pattern can be detected separately from another data pattern. A second feature of the RESYNC pattern lies in that it can be recognized as a RESYNC pattern even from only a one-sided edge detection pulse train of either front edges or rear edges. In the case where both the front edges and the rear edges are equally handled, it is possible to construct a pattern of 1-byte length which is irregular with respect to the 2–7 modulation, for example, as in the AM pattern. However, in order to make the recognition even from only one-sided edge detection pulses, not a RESYNC pattern of 1-byte length but a RESYNC patter of 2-byte length is used since at least a 2-byte length is required to make the pattern have the irregularity. A third feature of the RESYNC pattern lies in that there is not used a pattern in which two "0's" (1.5 T) (the number 2 of which is the smallest number of consecutive "0's" allowed in the 2–7 modulation) follow immediately after 4 T shown RESYNC pattern contains a pattern in which two consecutive "0's" (1.5 T) appear after six consecutive "0's" (3.5 T) but does not contain the above pattern (in which 1.5 T appears immediately after 4 T). In general, as a pattern becomes longer, the extension length of a pit is increased. In the case where the length of a gap immediately succeeding the longer pattern is short, the gap length becomes extremely short. Therefore, the use of the pattern in which 1.5 T appears immediately after 4 T, is disadvantageous from an aspect of the resolution of edge detection. In the case of the RESYNC pattern, the even-odd correction for unification of a relationship between pits and gaps as in the AM pattern is difficult since the RESYNC patterns are inserted in the data area. Accordingly, at a stage of time when the original pattern is formed, consideration is made so that a short gap (1.5 T) does not succeed a longer pit (4 T).

Figure 32:
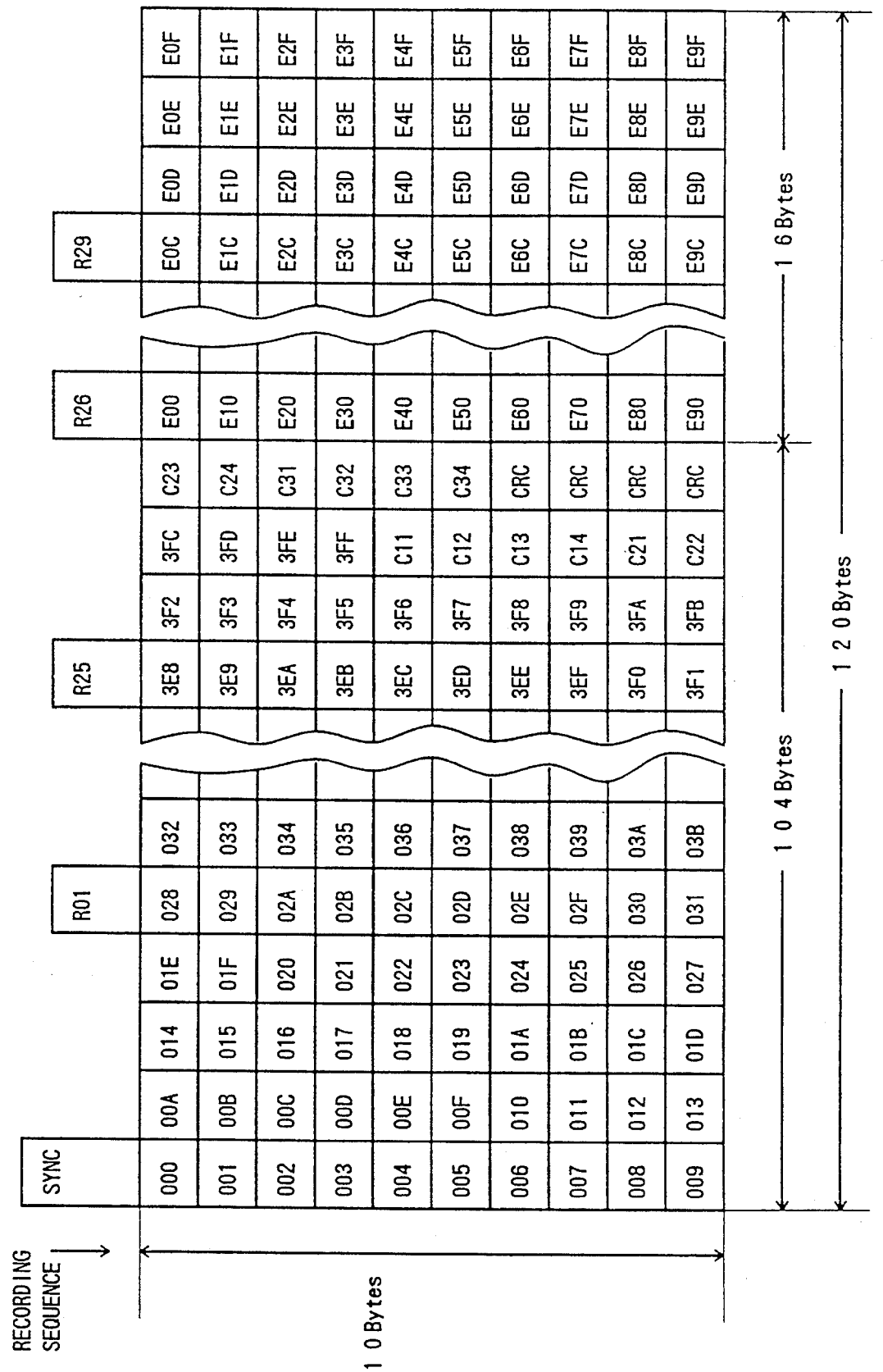
FIG. 32 is a diagram showing the interleaved construction and LDC (long distance code) construction of the data area.

FIG. 32 shows the construction of a data field of 1258 bytes in the data area of 1309 bytes excepting the VFO3 field (18 bytes), the SYNC field (3 bytes) and a BUFF (buffer)

field (30 bytes) as the last field of the data area. An interleaved 10-byte LDC (long distance code) construction is used in the data field. A 16-byte ECC (error correction code) is added for a data string of 104 bytes. This format construction is basically equivalent to the 130 mm diameter standardized format. Differences lie in that RESYNC itself has a 2-byte length and that RESYNC is inserted after every 40 data bytes. In FIG. 32, the user data is one kilobyte from "$000_{16}$" to "$3FF_{16}$" and is followed by DMP's (defect management pointers) from "C11" to "C34" and CRC's. The DMP's are regions in which, when there is a transfer from the sector under consideration to another or alternate sector for writing due to defects or the like, a self track number, a self sector number, an original track number, an original sector number, an alternate track number, an alternate sector number, and so on are written as shown in FIG. 31. For example, assume the case where the present position is a sector "$12_{16}$" of a track "$ABCD_{16}$" and the writing into a sector "$23_{16}$" of an alternate track "$BCDE_{16}$" is performed for any reason. At this time, in the original sector are written "$ABCD_{16}$" as a self track number, "$12_{16}$" as a self sector number, "$BCDE_{16}$" as an alternate track number and "$23_{16}$" as an alternate sector number. On the other hand, in the alternate sector are written "$BCDE_{16}$" as a self track number, "$23_{16}$" as a self sector number, "$ABCD_{16}$" as an original track number and "$12_{16}$" as an original track number. If the writing of data is normally completed within the sector under consideration without needing an alternate sector processing, the original track number and the original sector number are respectively written into the self and alternate track number fields and the self and alternate sector number fields of the original sector or the sector under consideration.

The RESYNC is inserted after every 40 data bytes. On the other hand, the LDC data construction has a data correction ability for continuous defects of an 80-byte length at the longest. Accordingly, one RESYNC error can be restored to normal data without any problem. If RESYNC of one byte is used and is inserted after every twenty data bytes, data correction is possible for two continuous RESYNC errors at the most. However, in the case where the distribution of defects is uniform both possibilities are substantially equivalent to each other in probability. Therefore, the format in the present embodiment is employed which makes pattern recognition possible even from a one-sided edge detection pulse train.

Figure 33:
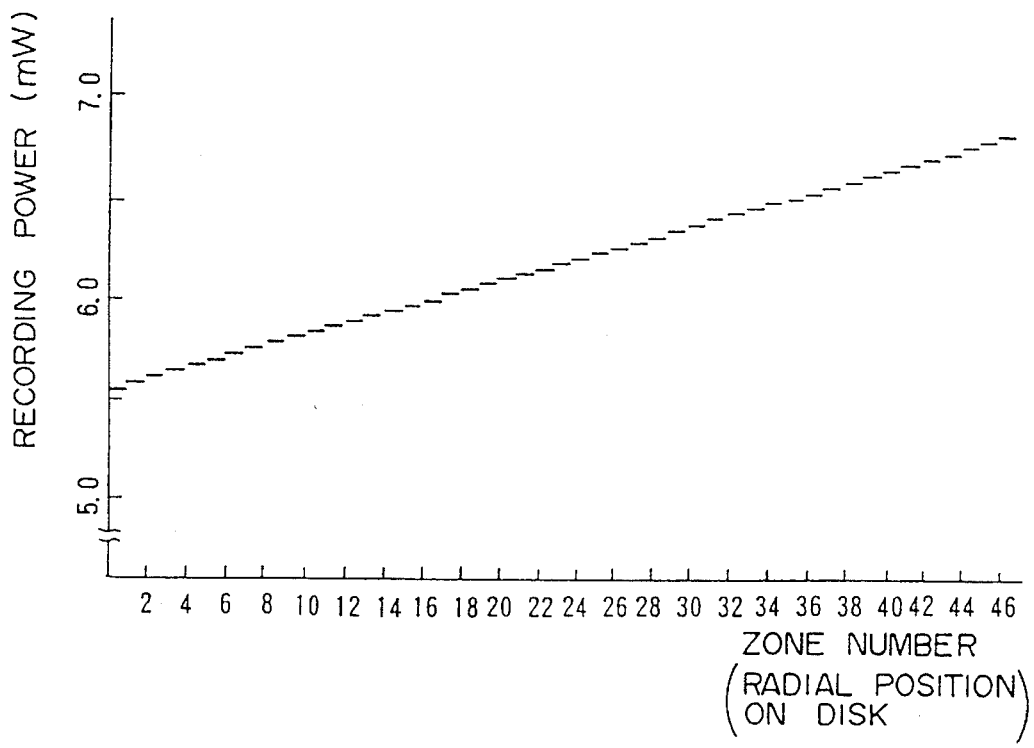
FIG. 33 is a diagram showing a relationship between the zone number and the set value of power.
Figure 34:
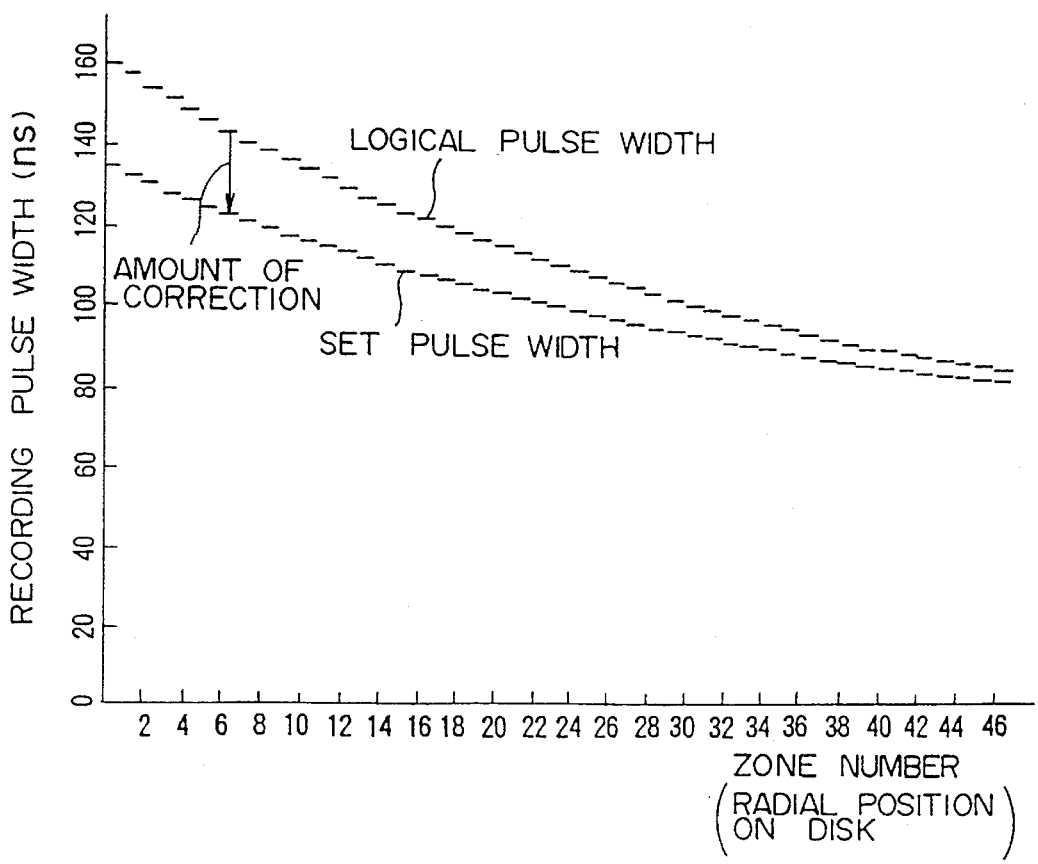
FIG. 34 is a diagram showing a relationship between the zone number and the set value of a 1.5 T pulse width.

Next, explanation will be made of the setting of a recording power and a recording pulse width at a radial position on the disk and each zone. FIG. 33 shows the set values of recording power for zone numbers. In general, a recording power for effecting stable recording is increased with the increase of a linear velocity. FIG. 33 shows an example of the setting of recording powers in the case where 47 zones in total are provided with one zone being composed of 1024 tracks as shown in FIG. 28. These set values of recording power are provided, from the host mechanism controller as digital values to be inputted to the AD converter 208 in the recording power control circuit 22 in FIG. 26. FIG. 34 shows the set values of 1.5 T recording pulse width for zone numbers. In the figure, a logical pulse width corresponds to the 1.5 T pulse width in the NRZ converted data 102. A set pulse width corresponds to the 1.5 T pulse width in the recording data 104. The amount of correction is a difference between the logical pulse width and the set pulse width and corresponds to the amount of delay in the delaying circuit 200 in FIG. 26. The amount of correction is constant in each zone irrespective of data patterns included. The amount of correction is decreased with the progression toward the outer circumference. This is determined from the dependency of the recording characteristic of recording medium being used on the linear velocity.

Figure 35:
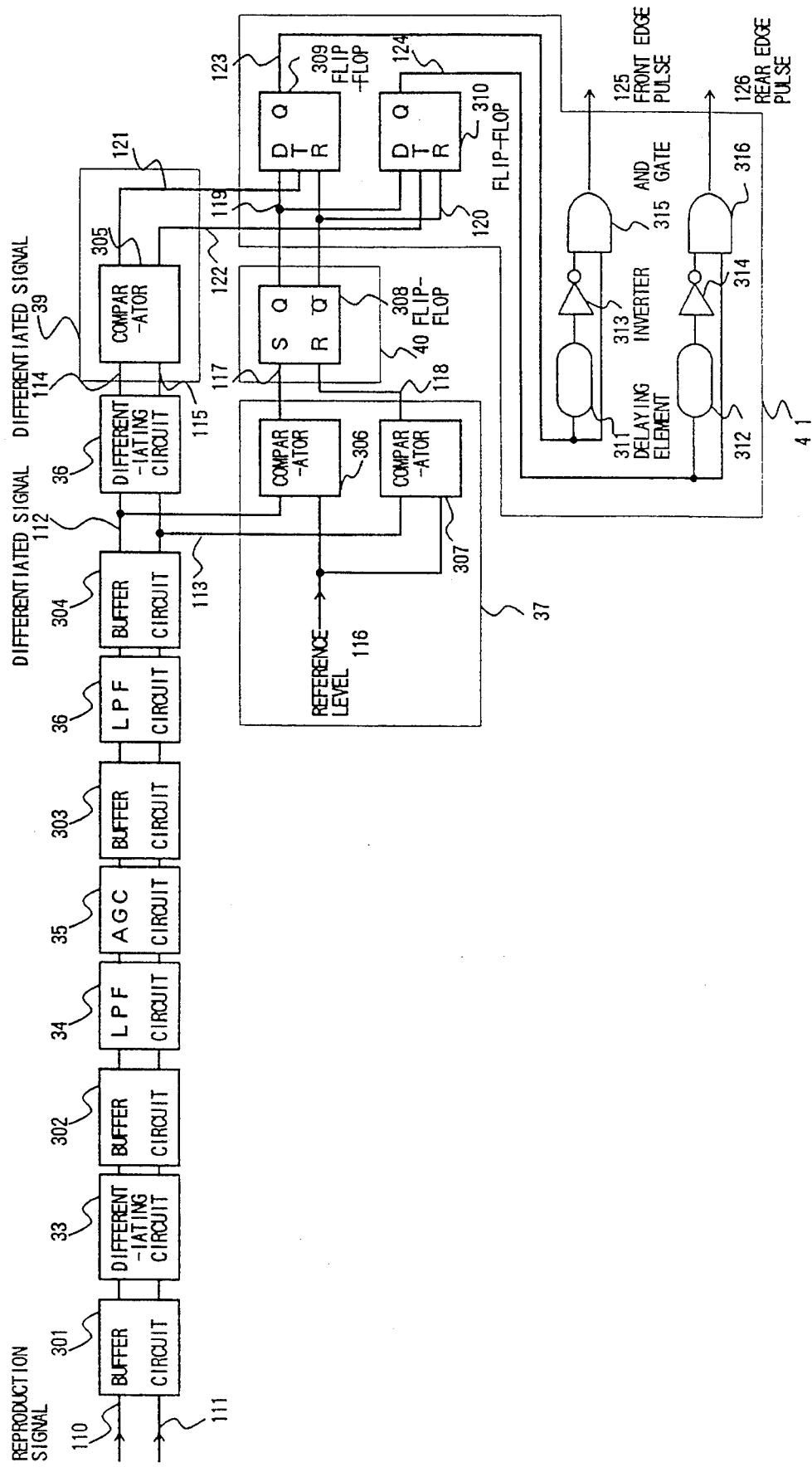
FIG. 35 is a block diagram of a reproducing system.
Figure 36:
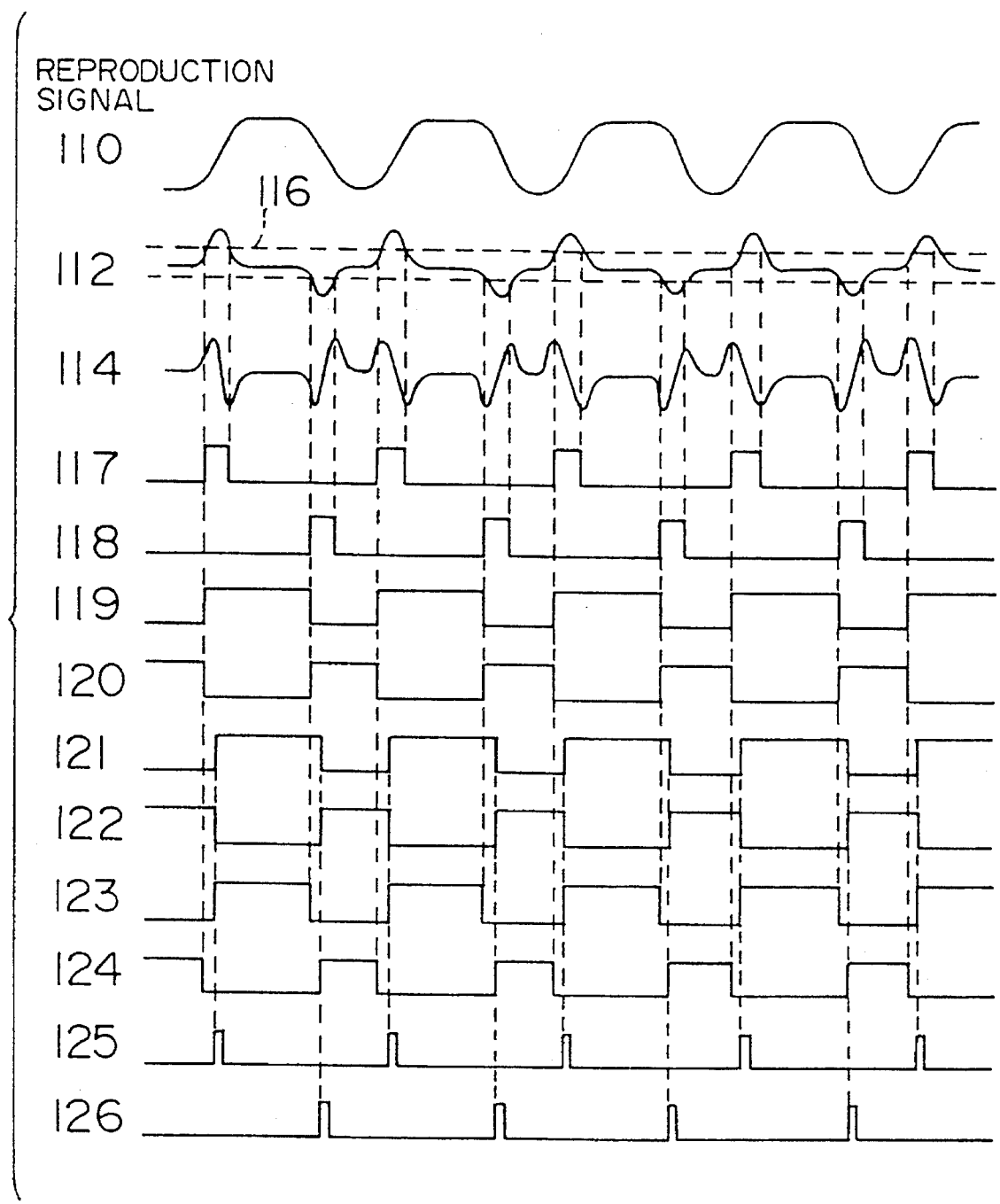
FIG. 36 is a time chart of the reproducing system.

In the following, blocks in a reproducing system relating to the generation of front/rear edge pulses and a time chart of the operation thereof will be shown. FIG. 35 is a block diagram and FIG. 36 is a time chart. Reproduction signals 110 and 111 are inputted as differential signals to a buffer circuit 301 from the preamplifier 32 in FIG. 45. Outputs of the buffer circuit 301 are inputted to a first differentiating circuit 33 to obtain first-order differentiated signals. The differentiated signals develop into differentiated signals 112 and 113 through a buffer circuit 302, a first LPF circuit 34, an AGC circuit 35, a buffer circuit 303, a second LPF circuit 36 and a buffer circuit 304. The differentiated signals 112 and 113 are equivalent in waveform to the outputs of the first differentiating circuit 33. In the edge recording, positive and negative peak positions of the first-order differentiated signal correspond to front and rear edge positions of the reproduction signal, respectively. In order to determine those peak positions, the differentiated signals 112 and 113 are differentiated again by a differentiating circuit 38 to obtain second-order differentiated signals 114 and 115. Zero cross points of the second-order differentiated signals 114 and 115 exactly corresponds to the peak positions of the first-order differentiated signals 112 and 113. The first-order differentiated signals 112 and 113 are respectively inputted to comparators 306 and 307 to obtain gate pulses 117 and 118. A reference level 116 is a threshold level for generation of the gate pulses 117 and 118. The gate pulses 117 and 118 are used in order to prevent erroneous pulses from portions other than the zero cross points of the second-order differentiated signals 117 and 118 from being recognized as data. The gate pulses 117 and 118 are respectively inputted to set (S) and reset (R) terminals of a flip-flop 308 to obtain pulses 119 and 120. On the other hand, the second-order differentiated signals 114 and 115 are inputted to a differential comparator 305 which in turn generates pulses 121 and 122. The pulses 121 and 122 are respectively inputted to trigger (T) terminals of flip-flops 309 and 310 and the gate pulses 119 and 120 are also inputted to the flip-flops 309 and 310. The flip-flop 309 is triggered by the rise of the pulse 121 to take in the pulse 119 and is reset by a "H" level condition of the pulse 120, thereby obtaining a pulse 123. Similarly, a pulse 124 is obtained. In the present embodiment, the rise of the pulse 123 corresponds to the front edge position of the reproduction signal 110 and the rise of the pulse 124 corresponds to the rear edge position of the reproduction signal 111. The pulse 123 is delayed by a delaying element 311 and is polarity-inverted by an inverter 313. The delayed and inverted pulse and the pulse 123 are ANDed by an AND gate 315 to obtain a front edge pulse 125. Similarly, the pulse 124 is delayed by a delaying element 312 and is inverted by an inverter 314. The delayed and inverted pulse and the pulse 124 are ORed by an OR gate 316 to obtain a rear edge pulse 126. The edge pulses 125 and 126 are respectively inputted to the VFO circuits 42 and 43 in FIG. 45 and are thereafter data-synthesized by the regenerative synthesis circuit 44 for data demodulation.

As for the regenerative synthesis circuit and the synthesis processing method, one can refer to the disclosure of JP-A-64-298, JP-A-62-008370, etc. In the method disclosed therein, front edge pulses and rear edge pulses are synthesized by use of known pattern portions existing in recording data so that those pulses take a normal positional relationship.

Figure 37A:
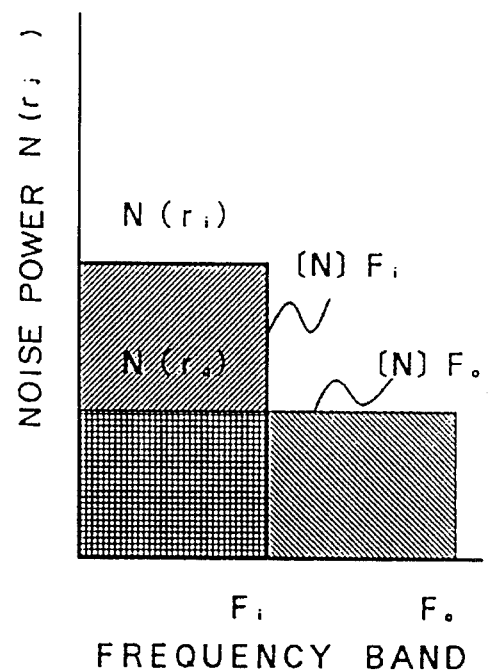
FIGS. 37A and 37B are diagrams showing a relationship between the frequency band and the noise power.
Figure 37B:
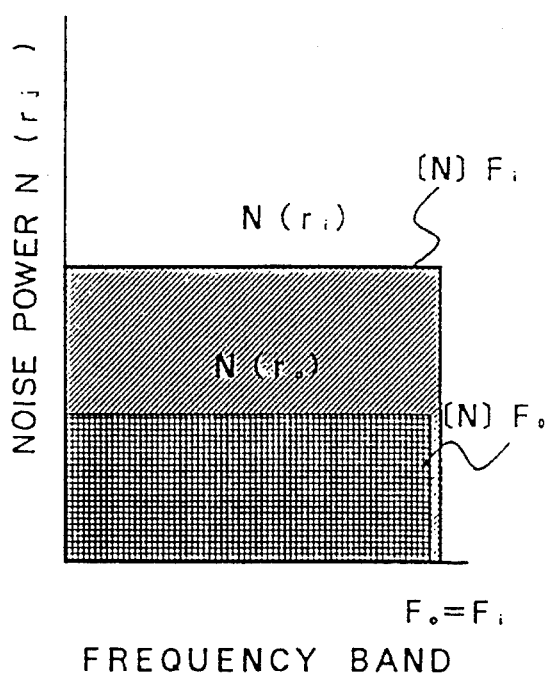

Next, explanation will be made of the setting of the cut-off frequency of the LPF for a radial position on the disk. As has already been mentioned, in the MCAV system, the signal band is increased up to about two times with the progression from an inner circumference of the disk toward an outer circumference thereof. If the cut-off frequency of the LPF is fixed in accordance with a condition at the outer circumference, the signal band on the inner circumference contains an unnecessary band with increased noise. This is disadvantageous in view of the S/N ratio (signal-to-noise ratio). Reversely, if the cut-off frequency is fixed in accordance with a condition at the inner circumference, a difference in delay amount in a necessary band becomes large at the outer circumference, thereby yielding a noticeable edge shift between 2–7 modulation pattern. Since disk noises is the dominant as noise component, the characteristic of the disk noise has been examined with the aim of reducing the number of steps for change-over of the cut-off frequency of the LPF. FIGS. 37A and 37B show the relation of a noise power with a frequency band. As the result of examination of the noise characteristic, the jitter $\delta_j$ is represented by $$\delta_j = k \cdot f_j^{-1} \cdot [N]_{Fj} \tag{1}$$

where Fj is a signal band under consideration, $f_j$ is the highest signal frequency, $[N]_{Fj}$ is a noise power included in the frequency $f_j$, and k is a proportional constant.

Provided that a noise power per one unit frequency at a radial position $r_j$ on the disk is $N(r_j)$, the following expression is obtained:

$$[N]_{Fj} = N(r_j) \cdot F_j. \tag{2}$$

Taking the ratio of the jitter on the radius of the innermost circumference to the jitter on the radius of the outermost circumference, we obtain $$\delta_i/\delta_o = (f_o \cdot [N]_{Fi})/(f_i \cdot [N]_{Fo}). \tag{3}$$

Using $f_o = 2f_i$, $F_o = 2F_i$ and the result of actual measurement of jitters, that is, $\delta_i = 2\delta_o$, we obtain $$[N]_{Fi}/[N]_{Fo} = 1. \tag{4}$$

On the other hand, if the result of actual measurement of jitters when $F_o = F_i$, that is, $\delta_i = 4\delta_o$ is used, we obtain $$[N]_{Fi}/[N]_{Fo} = 2. \tag{5}$$

The relations of the noise power $N(r_j)$ with the frequency band $F_j$ corresponding to equations (4) and (5) are as shown by FIGS. 37A and 37B.

Now, assume that $F_j$ is taken as the cut-off frequency of the LPF and is a proportional function of a radial position on the disk, that is, $$F_j = a \cdot r_j \tag{6}$$

where a is a proportional constant. Further, assume that the noise power $N(r_j)$ is an inversely proportional function of a radial position on the disk, that is, $$N(r_j) = b/r_j \tag{7}$$

where b is a proportional constant. Introducing equation (7) into equation (3) and using the fact that $f_i$ has a proportional relation with the radius position, the jitter $\delta_j$ at any radial position is represented by $$\delta_j = \delta_o \cdot (r_o/r_j)^2 \cdot (F_j/F_o). \tag{8}$$

Figure 38:
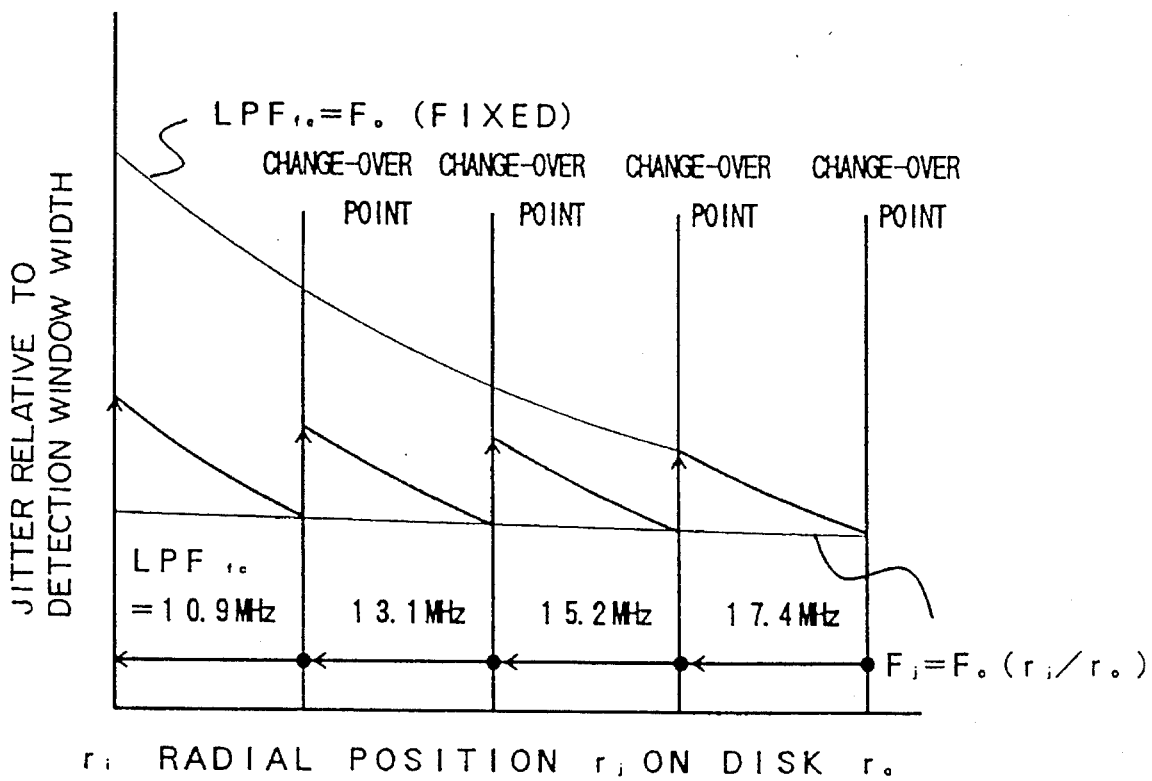
FIG. 38 is a diagram showing a relationship between the radial position and the jitter.

The cut-off frequency of the LPF can be determined from equation (8). FIG. 38 is a graph in which the jitter at a radial position on the disk is shown in terms of the ratio thereof to a detection window width at each radial position (or each zone) on the basis of the above result. The single-weight line sloping upward to the left represents the jitter in the case where the cut-off frequency of the LPF is fixed to a value at the outermost circumference. The jitter abruptly increases with the progression toward the inner circumference. The substantially horizontal single-weight line corresponds to the case where the cut-off frequency of the LPF is continuously changed with respect to each radial position so that the jitter relative to the detection window width is always determined by the disk noise. The cut-off frequency $F_j$ at any radial position is represented by $$F_j = F_o \cdot (r_j/r_o). \tag{9}$$

In other words, the cut-off frequency $F_j$ of the LPF relative to the cut-off frequency $F_o$ at the outermost circumference position is set to the radius ratio $r_j/r_o$.

The bold line represents the jitter in the case where the radius of the disk is equally divided into four parts and the cut-off frequency of the LPF is set in accordance with equation (9) sequentially from the outer circumference side. In the case of the equal division, a difference between the jitters relative to the detection window width at a cut-off frequency change-over portion increases with the progression toward the inner circumference. Actually, if the division into at least four parts is made, the increase of jitter at the change-over point (between divisional zones) offers almost no problem. More strictly speaking, for example, though equally for the four-part division, the difference in jitter at the change-over point can be made substantially the same over all the circumferences if the division is made finer in accordance with the progression toward the inner circumference. Also, as a method of minimizing the difference in jitter at the change-over point, it is also effective to set each cut-off frequency to the optimum value approximately at the center of each block. An example of the set values of the cut-off frequency of the LPF in the present embodiment is shown in FIG. 38.

Figure 39:
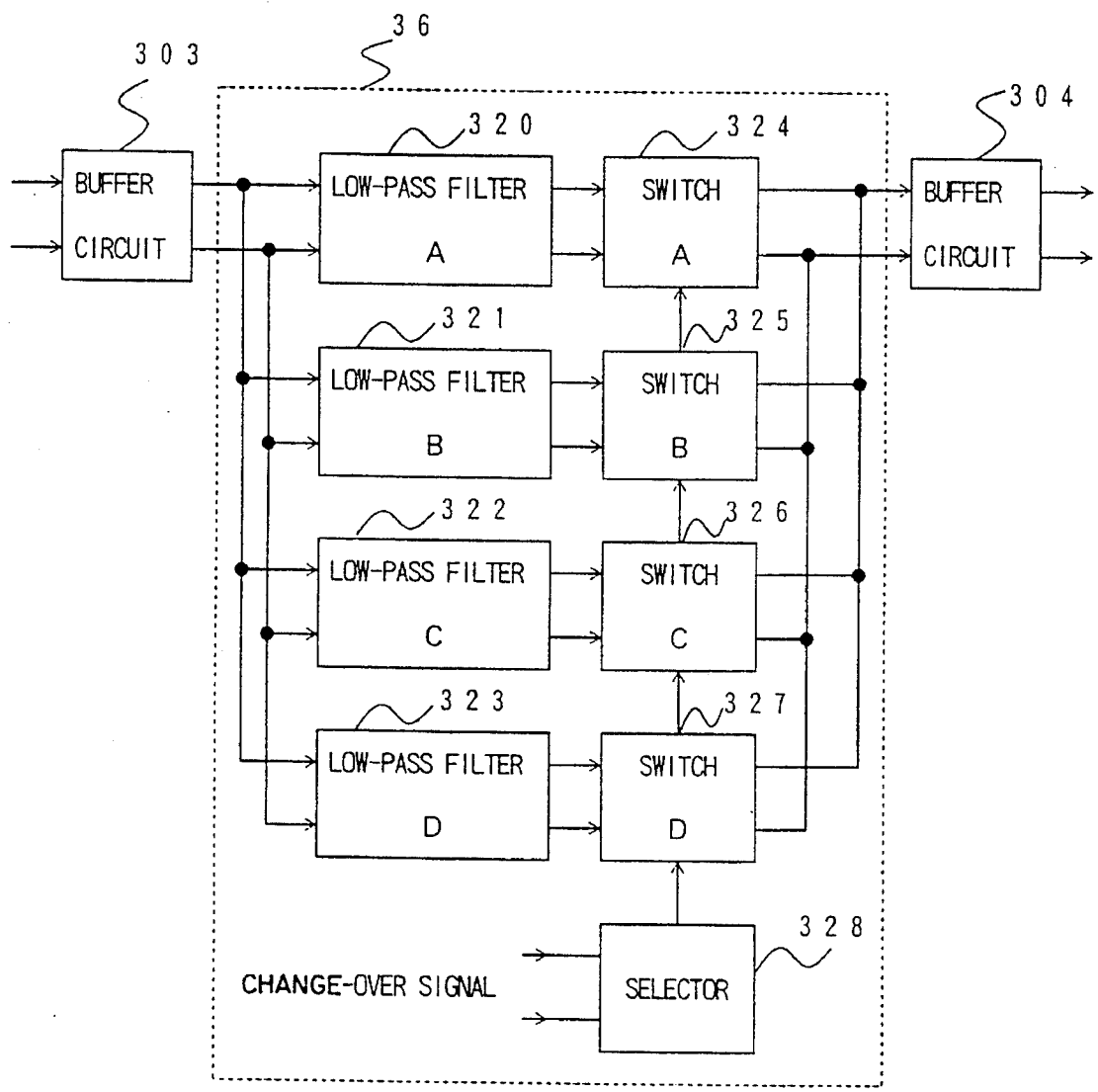
FIG. 39 shows an example of a low-pass filter change-over circuit.

FIG. 39 shows a specific example of a LPF change-over circuit. The shown example concerns the second LPF circuit 36 in FIG. 35. A signal converted by the buffer circuit 303 into low impedance is inputted to four LPF's or low-pass filters A 320 to D 323. Outputs of the low-pass filters 320 to 323 are respectively connected to four switches A 324 to D 327 any one of which is selected and closed by a selector 328. Outputs of the switches 324 to 327 are connected to the buffer circuit 304 and are transmitted therethrough to the next stage. The selector 328 operates in response to a change-over signal from the host controller. In general, if the change-over is made in the course of movement of an optical head to a target track, the change-over to a desired cut-off frequency has already been finished upon arrival at the target track. Namely, there is no substantial increase in a wait time required for the change-over.

Figure 40:
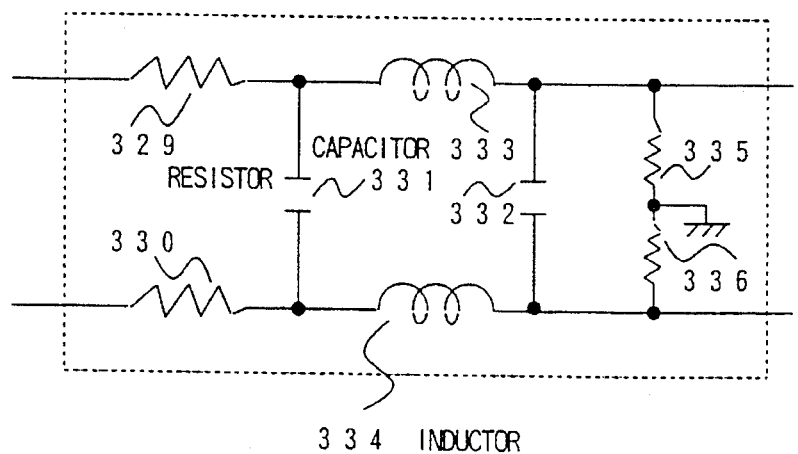
FIG. 40 shows an example of the circuit diagram of a low-pass filter.

FIG. 40 shows an example of the internal circuit construction of the low-pass filters 320 to 323. Resistors 329, 330, 335 and 336 are provided for impedance matching, and the cut-off characteristic is realized by an LC circuit which is composed of inductors 333 and 334 and capacitors 331 and 332. Though there is no specific restriction to the cut-off characteristic (or filter configuration), a delay amount flatness profile (or Gaussian profile) to minimize a difference in delay amount in a frequency band is preferable since the variations of edge positions are suppressed.

Figure 41:
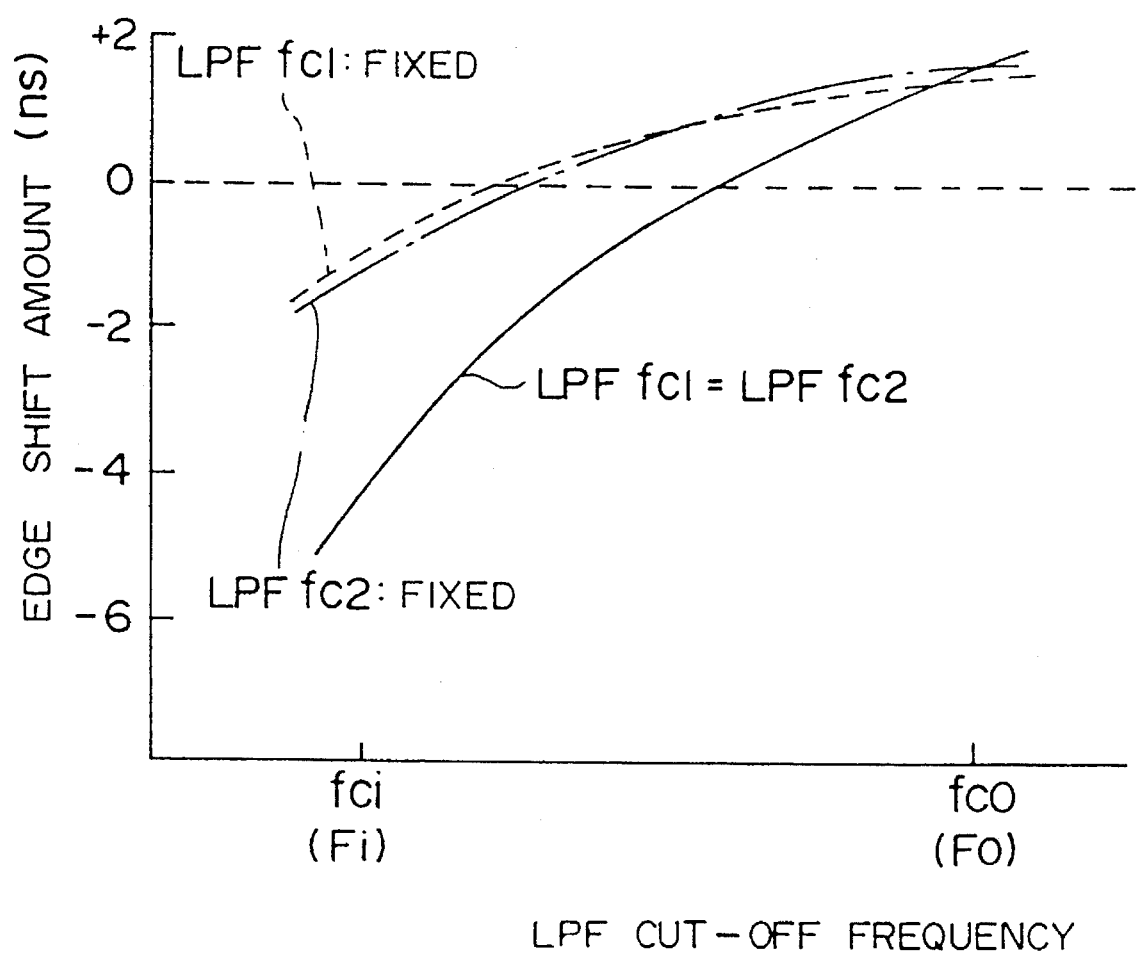
FIG. 41 is a diagram showing a relationship between the low-pass filter cut-off frequency and the amount of edge shift.

The embodiment of FIG. 39 shows the circuit for changing over the second LPF 36 in accordance with the disk radius position. The first LPF 34 can also be changed over in a similar manner. However, when the cut-off frequencies of the first and second LPF's are set to be the same, there may be the case where the amount of edge shift between different modulation patterns increases under the double influence of the amount of delay in the filter. FIG. 41 shows a change of the amount of edge shift when at the disk radius position on the innermost circumference the cut-off frequency of the first and second LPF's are changed from a value $f_{ci}$ at the inner circumference to a value $f_{co}$ at the outer circumference. The edge shift amount is an amount by which the interval between front edges (or rear edges) obtained from a reproduction signal deviates from the interval between front edges (or rear edges) in recording data generated by recording clocks. From FIG. 41, it is seen that the edge shift amount is small when only one of the cut-off frequencies of the first and second LPF's is changed with the other thereof being fixed.

Figure 42:
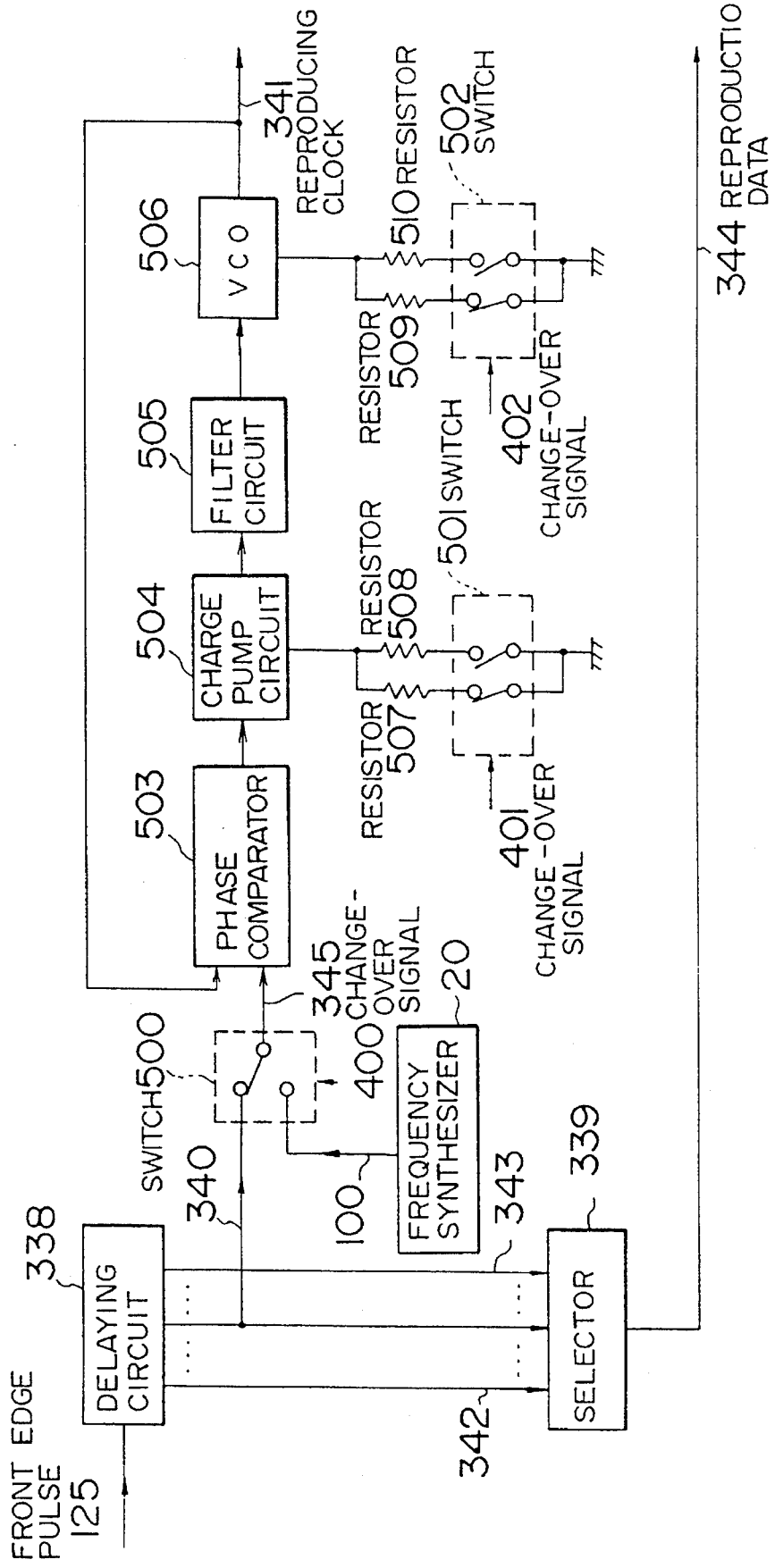
FIG. 42 is a block diagram of a VFO circuit and its peripheral circuits.
Figure 43:
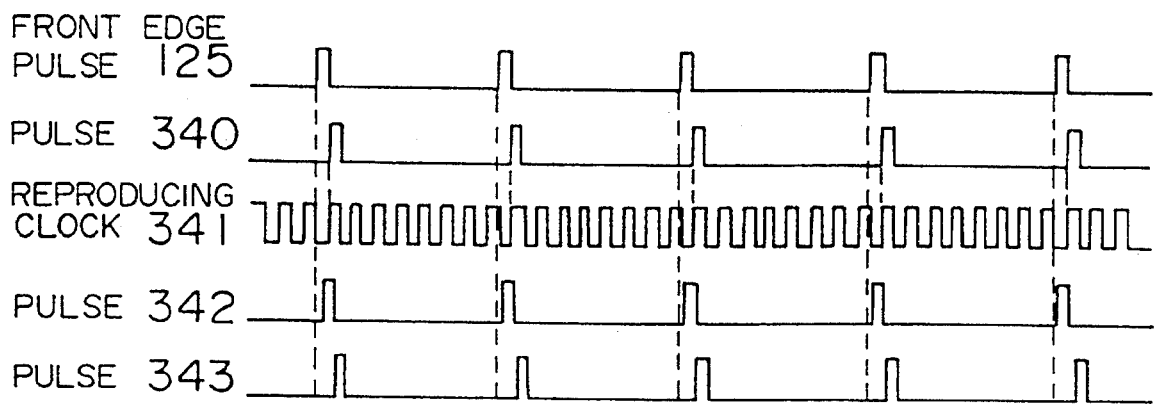
FIG. 43 is a time chart of the circuits shown in FIG. 42.
Figure 44A:
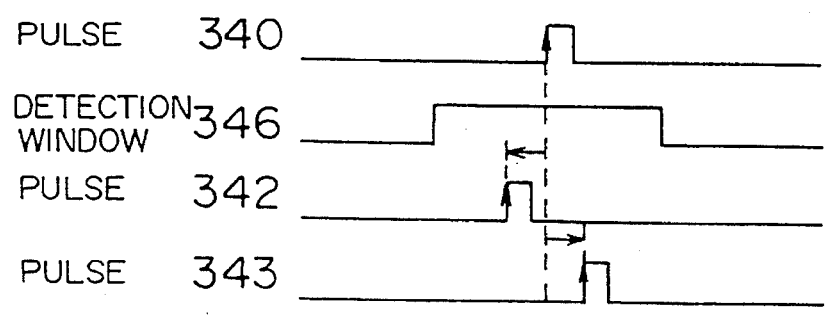
FIGS. 44A and 44B are diagrams showing a relationship between the edge pulse and the detection window.
Figure 44B:
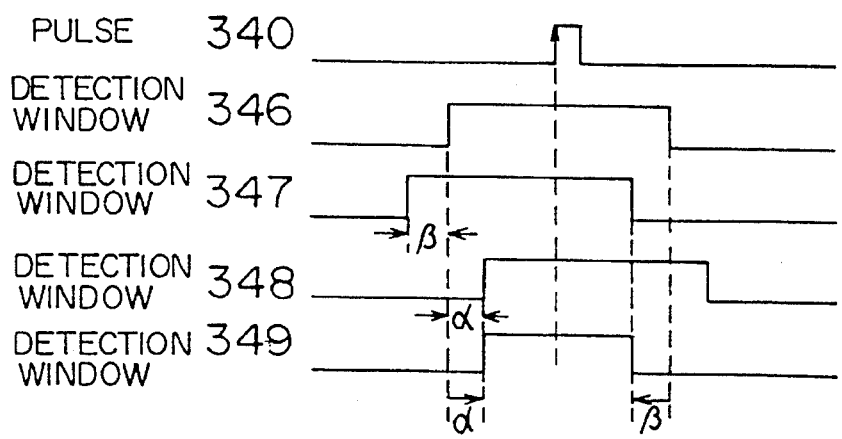
Figure 45:
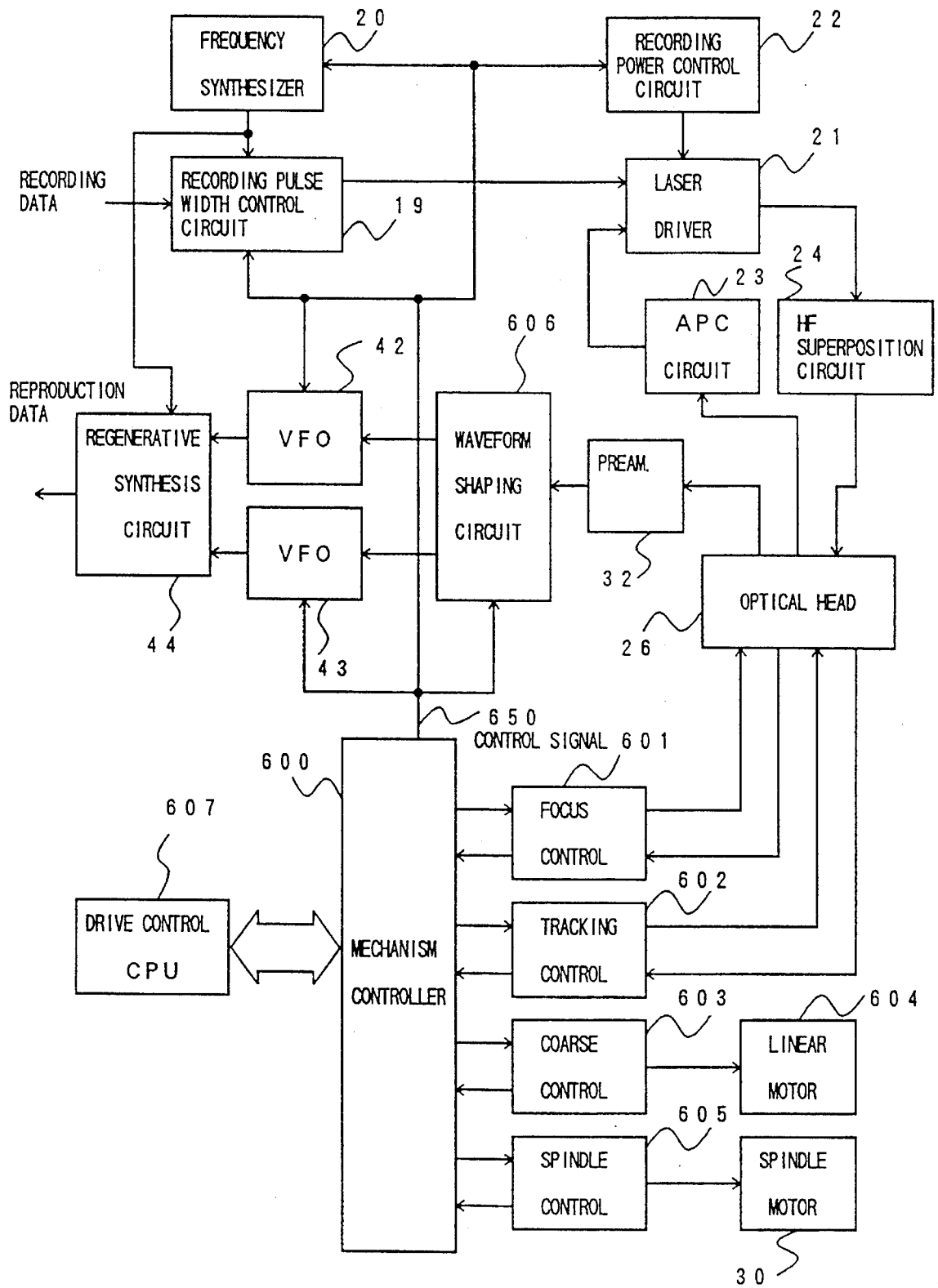
FIG. 45 is a block diagram of a mechanism controller and its peripheral circuits; an FIG. 46 is a diagram for explaining an example of the construction of a change-over control register.

FIG. 42 is a block diagram of the VFO circuit 42 or 43 in FIG. 45 and its peripheral circuits and FIG. 43 is a time chart of the operation of the circuits. The front edge pulse 125 is inputted to a delaying circuit 338 to produce an intermediate delayed pulse 340, a delayed pulse 342 having a shorter delay time than the pulse 340 and a delayed pulse 343 having a longer delay time than the pulse 340. Though only the three kinds of delayed pulses are shown, a multiplicity of kinds of delayed pulses may be provided. The delayed pulse 340 is selected by a switch 500 and is then inputted as an input pulse 345 to a phase comparator 503. During a period of time when the reproduction data string is not inputted, for example, during movement of the optical head or in a gap period on the sector format, the switch 500 selects a recording clock 100 from a frequency synthesizer 20 as the input pulse 345 to the phase comparator 503. This is made for pulling the self-running oscillation frequency of a VCO 506 approximately into a value at a target zone. The phase comparator 503 detects a difference in phase between a reproducing clock 341 generated by the VCO 506 and the input pulse 345, and a frequency control signal is produced by a charge pump circuit 504. The gain of the charge pump circuit 504 can be changed by selecting a resistor 507 or 508 by a switch 501 in accordance with a change-over signal 401. The oscillation frequency of the VCO 506 is changed by a control signal band-limited by a filter circuit 505 so that the above-mentioned phase difference becomes zero. The center value of the self-running oscillation frequency of the VCO 506 can be changed by selecting a resistor 509 or 510 by a switch 502 in accordance with a change-over signal 402. Though the illustration is omitted from FIG. 42, the characteristic of the filter circuit 505 can also be changed at every zone or at every block. Usually, the delayed pulse 340 is selected by a selector 339 so that it is used as reproduction data 344. Generally, in order to ensure data reproduction by a device other than the device by which recording was made, there is a mode for confirming, at the rotation immediately after data recording, that the reproduction of data is possible under a condition severer than a normal reproducing condition. This mode is called an RAW (read after write) mode. In the RAW mode, data reproduction in a state in which the detection window width is effectively narrowed, can be realized by using the delayed pulse 342 or 343. A detection window for data reproduction is generated by dividing the reproducing clocks 341 by two and resynchronizing them with the reproduction data. FIG. 44A shows a method in which the pulses 342 and 343 delayed and advanced relative to the pulse 340 are used for a detection window 346, and FIG. 44B shows a method in which detection windows 347 and 348 delayed and advanced relative to the detection window 346 are used for the pulse 340. In the method in FIG. 44B, the detection window 347 is delayed by $\beta$ relative to the detection window 346 and the detection window 348 is advanced by $\alpha$ relative to the detection window 346. Therefore, a detection window 349 obtained by producing a logical product of the detection windows 347 and 348 results in a detection window which is narrowed by $\alpha$ from the front and by $\beta$ from the rear. In either the method of FIG. 44A of the method of FIG. 44B, a substantially equivalent operation can be realized. A similar circuit construction may be used also for the rear edge pulse 126. Though the amount of correction for the detection window width can be set arbitrarily, it is generally set so that the ratio of a detection window width in the RAW mode to a detection window width in a normal data reproduction mode is made substantially constant in each zone.

In the following, explanation will be made of an MCAV-adapted change-over system centering around the mechanism controller. Though the blocks needing change-over and the method of change-over have already been mentioned, they will be summarized herein again. FIG. 45 is a block diagram of the apparatus organized for control signals from the mechanism controller 600. The mechanism controller 600 sends control or change-over signals to a frequency synthesizer 20, a recording pulse width control circuit 19, a recording power control circuit 22, a waveform shaping circuit 606, a VFO 42, a VFO 43, and so on at every zone or at every block. The waveform shaping circuit 606 is a portion for producing a binary digitalized signal from a reproduction signal and includes a portion from the differentiating circuit 33 to the edge separation circuit 41 in FIG. 35. The mechanism controller 600 is interposed between a drive control CPU 607 and various circuits. The mechanism controller 600 not only sends the change-over signals but also performs controls including a focus control 601 and a tracking control 602 for accurately positioning a light spot on a recording film, a coarse control 603 for controlling a linear motor 604 to move an optical head 26, and a spindle control 605 for controlling the rotation of a spindle motor 30.

FIG. 46 shows an example of the construction of a change-over control register allotted in the mechanism controller 600 or the drive control CPU 607. The setting of recording power, the setting of recording pulse width, the setting of recording clocks, the setting of filter/VFO frequency, and the setting of advanced/delayed detection window width and VFO1 (42)/VFO2 (43) detection window width are made through change-over processings of sending a laser drive current command value to the AD converter 208, a correction amount selection value to the selector 201, and a division ratio selection value to the frequency divider 214 in FIG. 26, a selection value to the selector 328 in FIG. 39, selection values to the switches 500, 501, and 502 and the selector 339 in FIG. 42, etc.

The self-running oscillation frequency of the VFO can be changed at every zone. Alternatively, the range of frequencies of the VFO capable of being pulled-in is extended to a group including a plurality of zones centering around a certain zone and the self-running oscillation frequency is changed at every group. Further, if the range of frequencies capable of being pulled-in is defined in an overlapping manner so as to cover not only the corresponding group but also parts of inner and outer groups adjacent to the corresponding group, address information can be recognized surely even in the case where a track being sought by the optical head is one which belongs not to a target group but to the adjacent group.

Next, explanation will be made of the correspondence between the command data of the change-over control register shown in FIG. 46 and each MCAV zone shown in FIG. 28. As for the setting of recording power (laser current selection value), the setting of recording pulse width (correction amount selection value) and the setting of recording clocks, the change-over is made at every zone. As for the setting of filter/VFO frequency, the entire zone (or all zones) is divided into four blocks, for example, #0–#9 zones (10 zones/block), #10–#20 zones (11 zones/block), #21–#33 zones (13 zones/block) and #34–#47 zones (14 zones/block), and the setting is made at every block. The setting of advanced detection window width, the setting of delayed detection window width, the setting of VFO1 detection window width and the setting of VFO2 detection window width are made at every zone.

INDUSTRIAL APPLICABILITY

The embodiments have been explained making mainly the write once read many type optical disk an object of application. However, the present invention is similarly applicable to optical disks using the other type of recording mediums.

We claim:

1. An optical recording method comprising the steps of:

dividing an optical disk constituting a recording medium into a plurality of zones each including a plurality of concentric tracks;

rotating the optical disk at a constant angular velocity;

selecting one of the tracks onto which information is to be recorded;

generating a recording clock having a frequency which depends on the zone in which the selected track is located, the frequency of the recording clock being different for each of the zones;

setting one of
  (1) a light pulse power which depends on the zone in which the selected track is located, the light pulse power being different for each of the zones, and
  (2) a light pulse waveform which depends on the zone in which the selected track is located, the light pulse waveform being different for each of the zones;

modulating light in accordance with the information to be recorded, the recording clock, and the set one of a light pulse power and a light pulse waveform to produce light pulses indicative of the information to be recorded and having the set one of a light pulse power and a light pulse waveform; and irradiating the selected track with the light pulses to record elongated recording marks along the selected track, the elongated recording marks having edges corresponding to the information to be recorded.

2. An optical recording method comprising the steps of:

dividing an optical disk constituting a recording medium into a plurality of zones each including a plurality of concentric tracks;

rotating the optical disk at a constant angular velocity;

selecting one of the tracks onto which information is to be recorded;

generating a recording clock having a frequency which depends on the zone in which the selected track is located, the frequency of the recording clock being different for each of the zones;

setting a light pulse width correction amount $\Delta T_W$ which depends on the zone in which the selected track is located, the light pulse width correction amount $\Delta T_W$ being different for each of the zones;

setting a light pulse width $T_W$ which depends on the zone in which the selected track is located by correcting a predetermined light pulse width by the light pulse width correction amount $\Delta T_W$ to obtain the light pulse width $T_W$, the light pulse width $T_W$ being different for each of the zones;

modulating light in accordance with the information to be recorded, the recording clock, and the set light pulse width $T_W$ to produce light pulses indicative of the information to be recorded and having the set light pulse width $T_W$; and irradiating the selected track with the light pulses to record elongated recording marks along the selected track, the elongated recording marks having edges corresponding to the information to be recorded.

3. An optical recording method comprising the steps of:

dividing an optical disk constituting a recording medium into a plurality of zones each including a plurality of concentric tracks;

rotating the optical disk at a constant angular velocity;

selecting one of the tracks onto which information is to be recorded;

setting a light pulse power which depends on the zone in which the selected track is located, the light pulse power being different for each of the zones and increasing from zone to zone from an innermost zone to an outermost zone;

setting a light pulse width which depends on the zone in which the selected track is located, the light pulse width being different for each of the zones and decreasing from zone to zone from an innermost zone to an outermost zone;

modulating light in accordance with the information to be recorded, the set light pulse power, and the set light pulse width to produce light pulses indicative of the information to be recorded and having the set light pulse power and the set light pulse width; and irradiating the selected track with the light pulses to record elongated recording marks along the selected track, the elongated recording marks having edges corresponding to the information to be recorded.

4. A method according to claim 1, wherein the light pulse power and the light pulse waveform are constant in each of the zones.

5. A method according to claim 2, wherein the light pulse width correction amount $\Delta T_W$ and the light pulse width $T_W$ are constant in each of the zones.

6. A method according to claim 3, wherein the light pulse power and the light pulse width are constant in each of the zones.

* * * * *